(12) United States Patent
Christie et al.

(10) Patent No.: US 10,820,462 B2
(45) Date of Patent: Nov. 3, 2020

(54) VARIABLE TOOTH COULTER BLADE WITH SIZED INSERTS

(71) Applicant: Prescription Tillage Technology, LLC, Red Oak, IA (US)

(72) Inventors: Richard L. Christie, Clarinda, IA (US); Ryan J. K. Christie, Clarinda, IA (US); John D. Nance, Ringoes, NJ (US)

(73) Assignee: Prescription Tillage Technologies, LLC, Red Oak, IA (US)

( * ) Notice: Subject to any disclaimer, the term of this patent is extended or adjusted under 35 U.S.C. 154(b) by 267 days.

(21) Appl. No.: 16/115,061

(22) Filed: Aug. 28, 2018

(65) Prior Publication Data

US 2019/0008087 A1    Jan. 10, 2019

Related U.S. Application Data

(63) Continuation-in-part of application No. 14/998,442, filed on Jan. 4, 2016, now Pat. No. 10,506,754, which is a continuation-in-part of application No. 14/961,849, filed on Dec. 7, 2015, now Pat. No. 10,159,171, which is a continuation-in-part of application No. 14/590,855, filed on Jan. 6, 2015, (Continued)

(51) Int. Cl.
*A01B 15/18* (2006.01)
*A01B 23/06* (2006.01)

(52) U.S. Cl.
CPC .................................. *A01B 15/18* (2013.01)

(58) Field of Classification Search
CPC ......... A01B 15/16; A01B 15/18; A01B 23/06; A01B 35/28
USPC ................... 172/514, 555, 601, 604, 765
See application file for complete search history.

(56) References Cited

U.S. PATENT DOCUMENTS

| 615,005 A | 11/1898 | Walquist | 83/676 |
| 814,716 A | 3/1906 | MacDonell | 111/33 |

(Continued)

FOREIGN PATENT DOCUMENTS

| DE | 4404654 | 8/1995 |
| SU | 736897 | 5/1980 |

OTHER PUBLICATIONS

"Notification of Transmittal of International Search Report and the Written Opinion of the International Searching Authority, or the Declaration", for PCT/US16/00004, dated Apr. 11, 2016, Issued by the International Searching Authority of the Patent Cooperation Treaty.

*Primary Examiner* — Robert E Pezzuto
(74) *Attorney, Agent, or Firm* — Ernest D. Buff & Associates, LLC; Ernest D. Buff

(57) ABSTRACT

A system and method cuts and increases surface area of surface stubble material while contemporaneously mulching, tiling and aerating the soil. A discoidal coulter blade is configured with sharpened areas at the circumference for cutting the surface stubble as well as reducing the downward pressure required for the blade to enter the type and depth of soil desired. The sharpened areas include a first long bevel, a second shorter bevel and an optional opposite counter bevel. The first and second bevels aid in coulter blade lifespan ensuring a self-sharpened blade while the counter-bevel allows mating with a second coulter blade at a sharpened point.

20 Claims, 59 Drawing Sheets

Related U.S. Application Data now Pat. No. 9,204,588, which is a continuation-in-part of application No. 14/162,259, filed on Jan. 23, 2014, now abandoned.

(60) Provisional application No. 61/756,841, filed on Jan. 25, 2013.

(56) References Cited

U.S. PATENT DOCUMENTS

| | | | |
|---|---|---|---|
| 994,707 A | 6/1911 | Meissner | 111/84 |
| 1,186,880 A | 6/1916 | Canda | 172/555 |
| 2,084,055 A | 6/1937 | Cascadden | 172/144 |
| 2,357,528 A | 9/1944 | Lutes | 172/144 |
| 2,596,574 A | 5/1952 | Lutes | 172/555 |
| 3,559,748 A | 2/1971 | Shelton | 172/604 |
| 4,891,885 A * | 1/1990 | Fischer | B21D 53/64 30/355 |
| 5,197,453 A | 3/1993 | Messina | 125/15 |
| 5,285,768 A | 2/1994 | Messina | 125/15 |
| 7,055,515 B2 | 1/2006 | Bishop | 125/13.01 |
| 7,361,702 B2 * | 4/2008 | Schwalm | C08K 5/3435 427/385.5 |
| 7,575,066 B2 | 8/2009 | Bauer | 172/540 |
| 7,856,913 B2 * | 12/2010 | Matzunsky | B26D 1/0006 83/676 |
| 8,186,450 B2 | 5/2012 | Bauer | 172/540 |
| 8,627,898 B2 | 1/2014 | Nance | 172/146 |
| 2008/0173220 A1 | 7/2008 | Wertz | 111/22 |
| 2008/0245440 A1 | 10/2008 | Paumier | 144/235 |
| 2011/0240319 A1 | 10/2011 | Sanderson | 172/604 |
| 2014/0345893 A1 | 11/2014 | Christie et al. | 172/599 |

\* cited by examiner

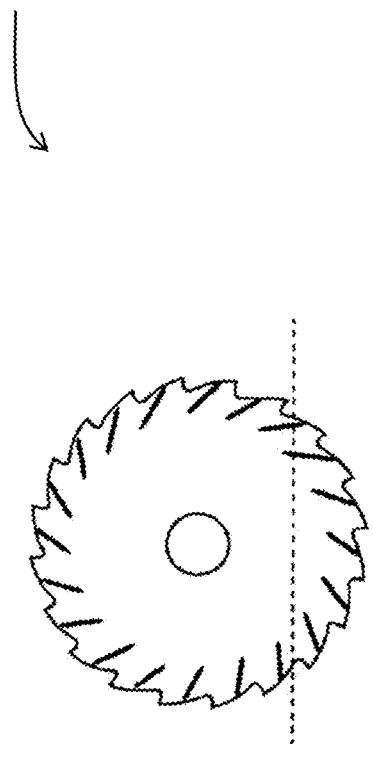
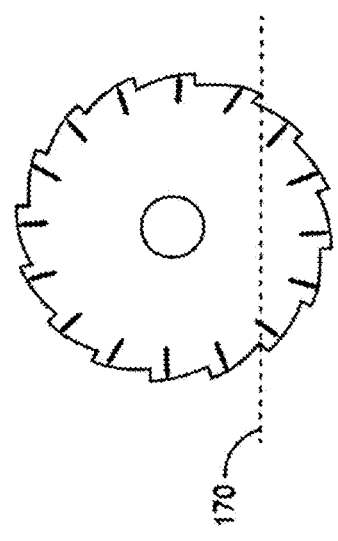
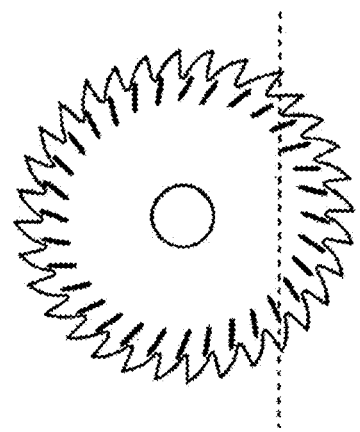
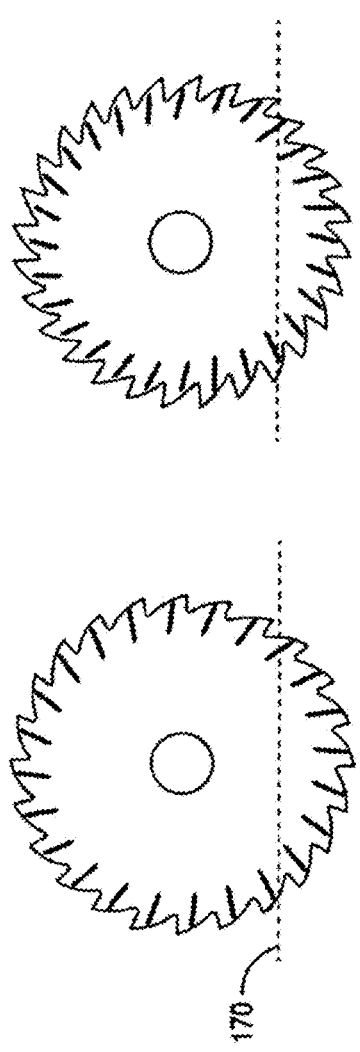
FIG. 13

1500
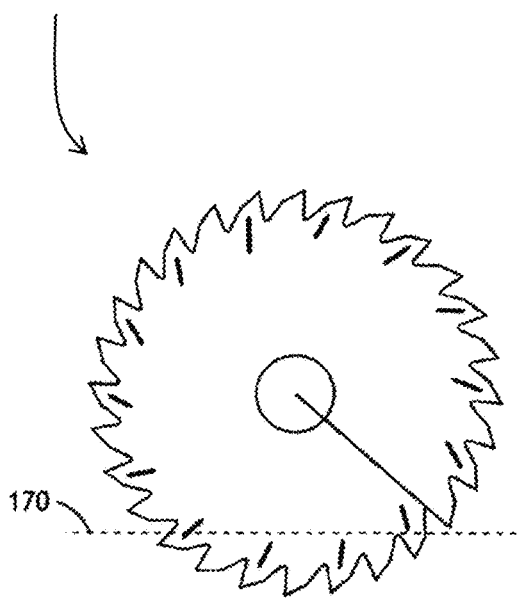
FIG.15A
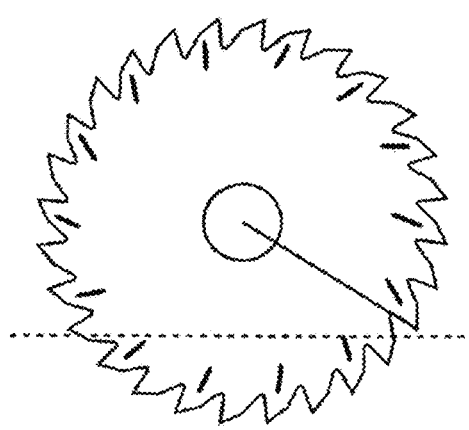
FIG.15B
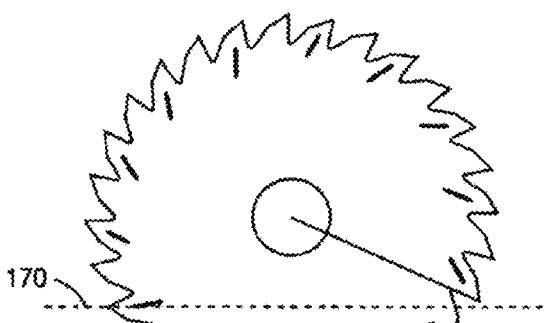
FIG.15C
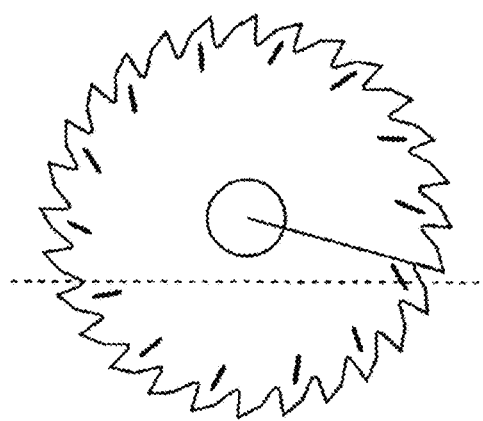
FIG.15D
FIG. 15

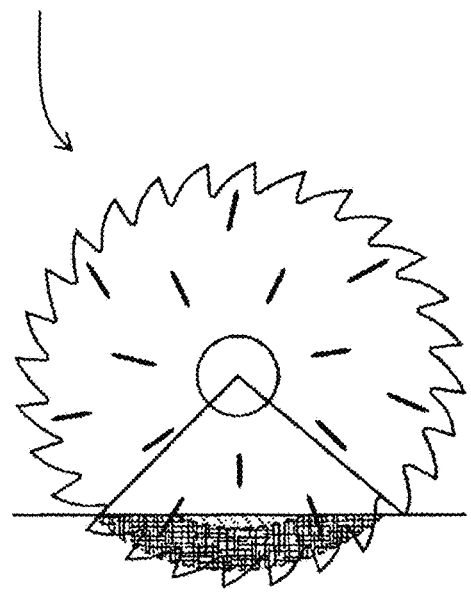
FIG.16A
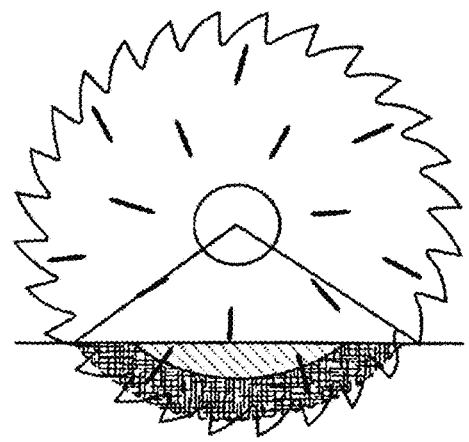
FIG.16B
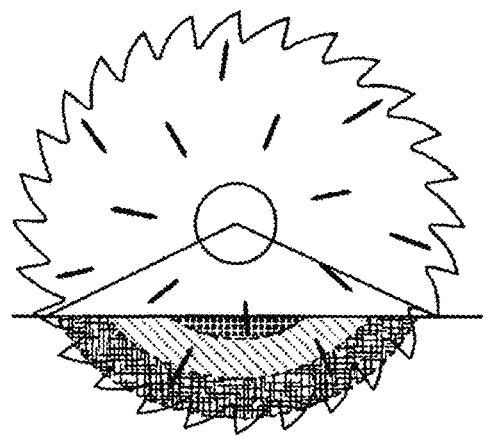
FIG.16C
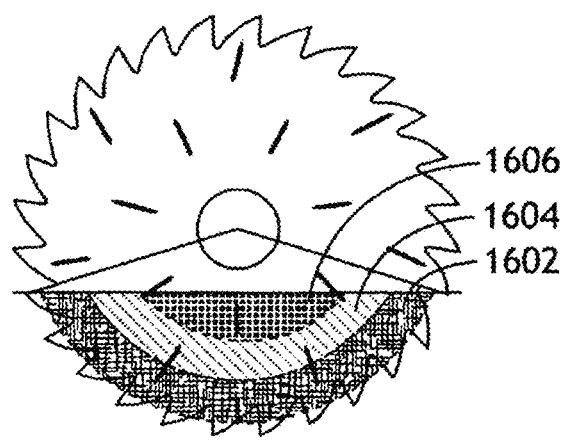
FIG.16D
FIG. 16

1700
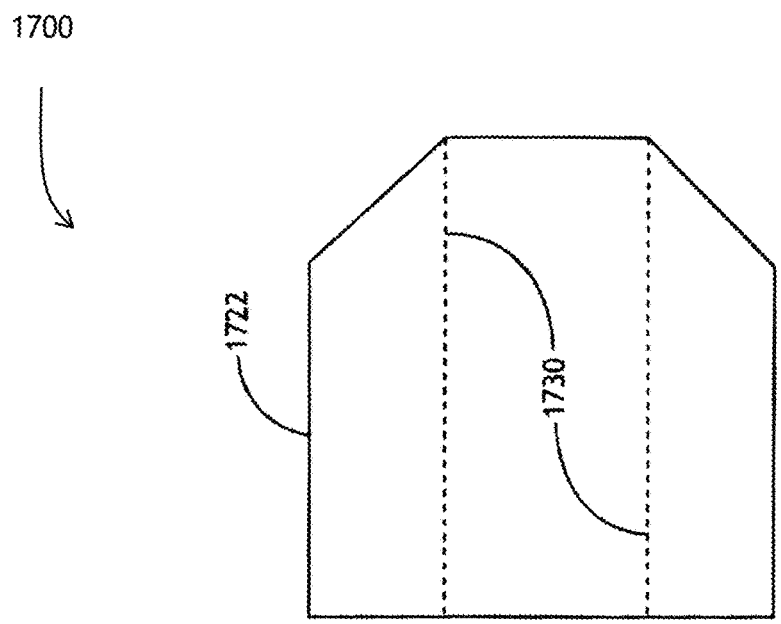
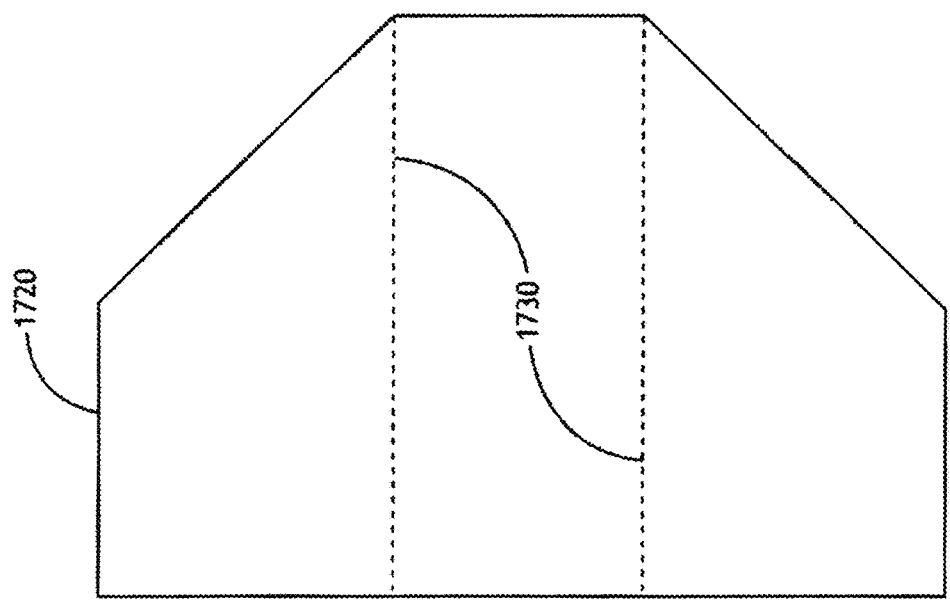
FIG. 17

1800

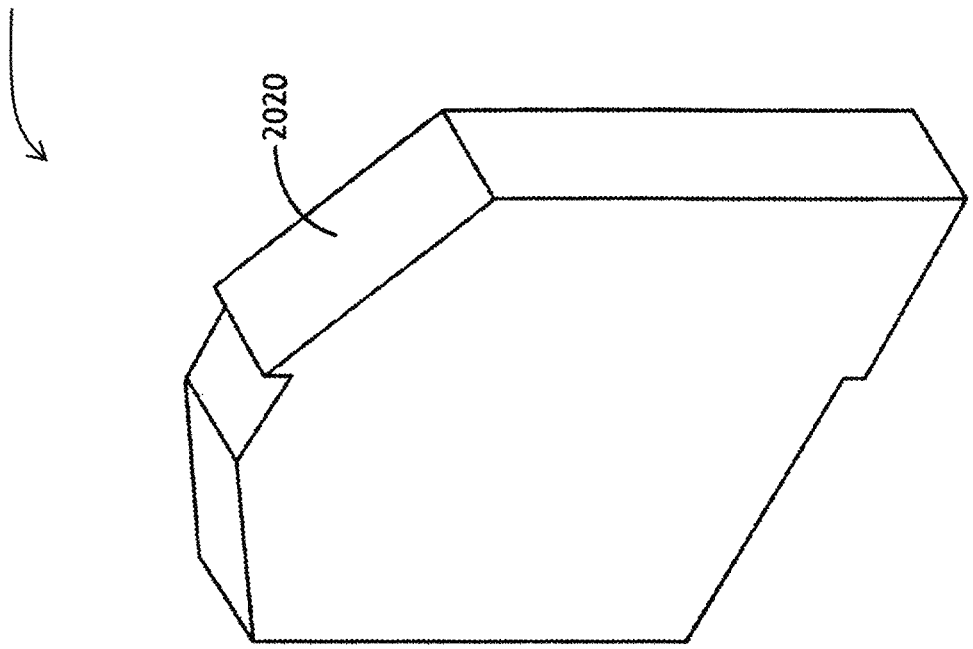
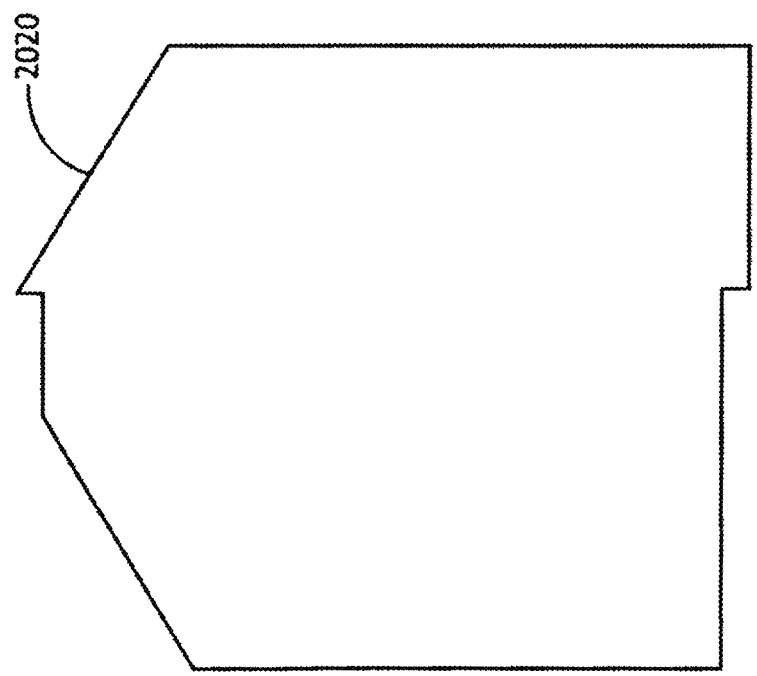

2100

2102 — embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement 2104 — translating the discoidal coulter blade through the soil at a depth via the implement 2106 — cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge 2108 — aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil

FIG. 21

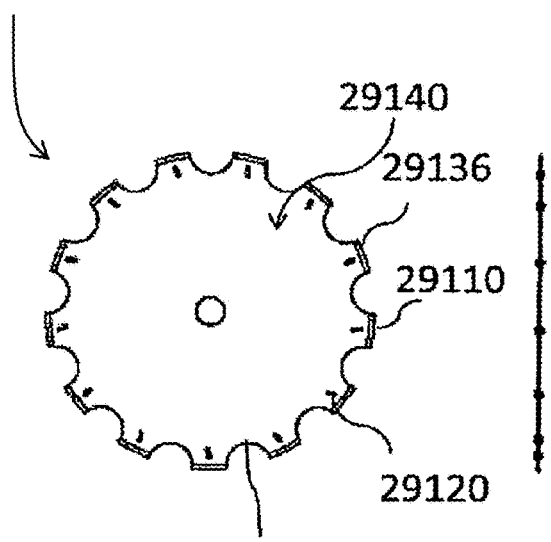
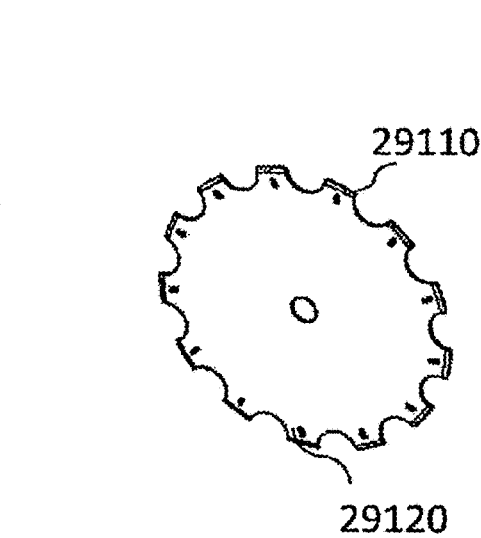
FIG. 29A  FIG. 29B  FIG. 29C
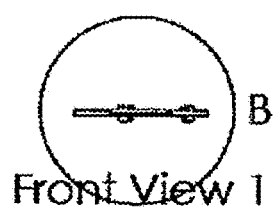
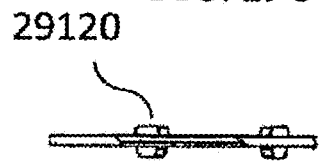
FIG. 29D  FIG. 29E  FIG. 29F
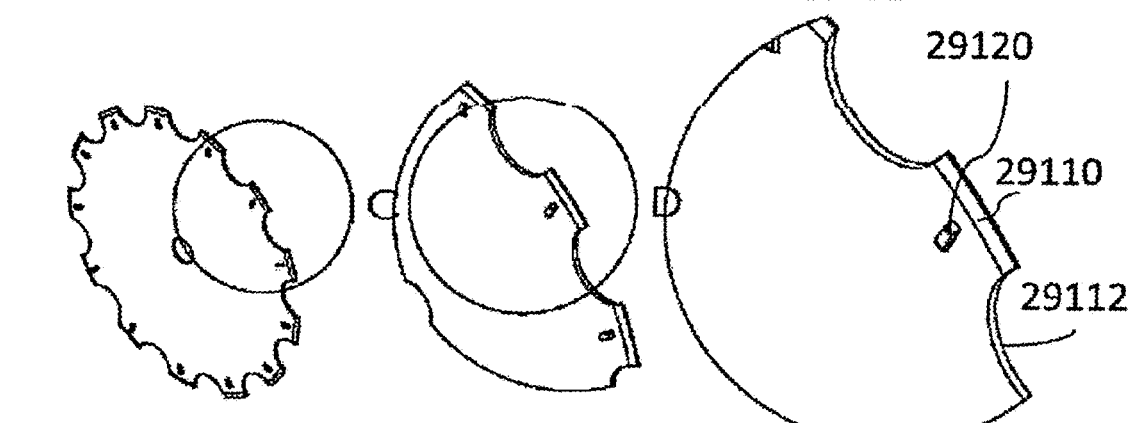
FIG. 29G  FIG. 29H  FIG. 29I 3000
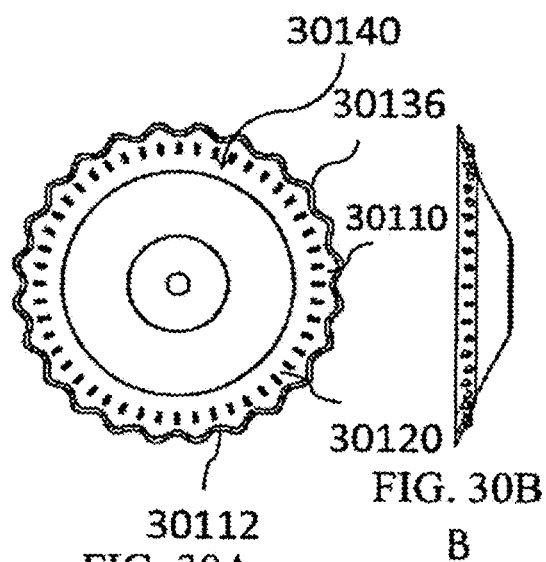
30140
30136
30110
30120
30112
FIG. 30A
FIG. 30B
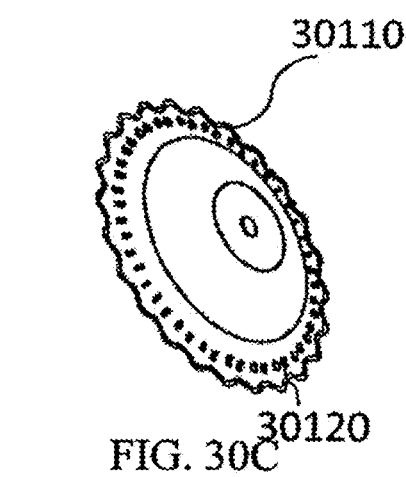
30110
30120
FIG. 30C
FIG. 30D
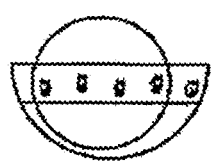
B
Front View 1
FIG. 30E
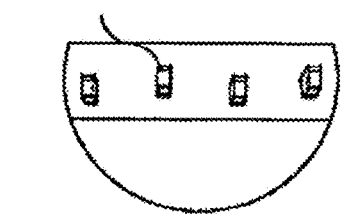
30120
Front View 2
FIG. 30F
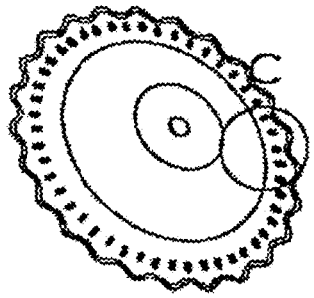
FIG. 30G
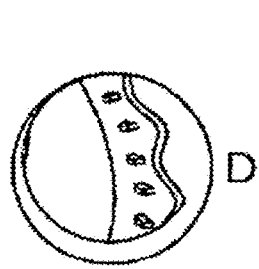
D
Side View 1
FIG. 30H
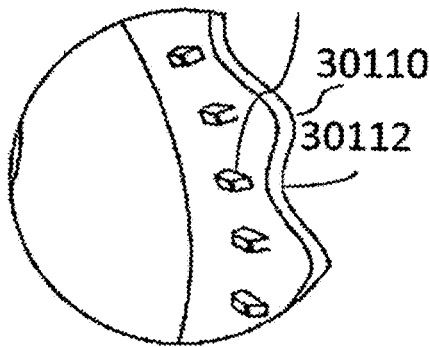
30120
30110
30112
Side View 2
FIG. 30I Side View 1

Side View 2

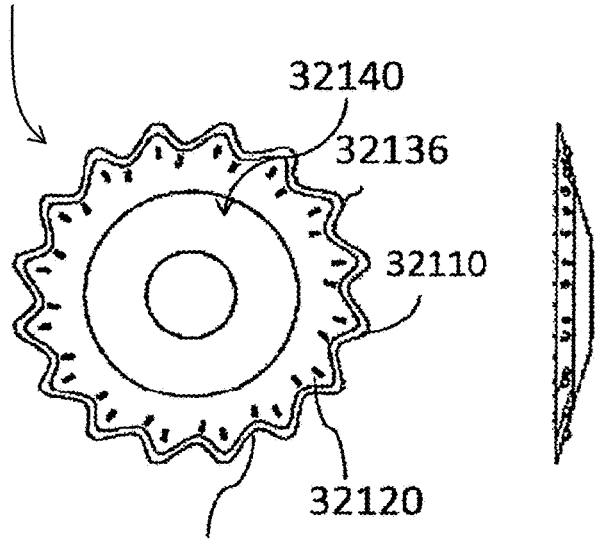
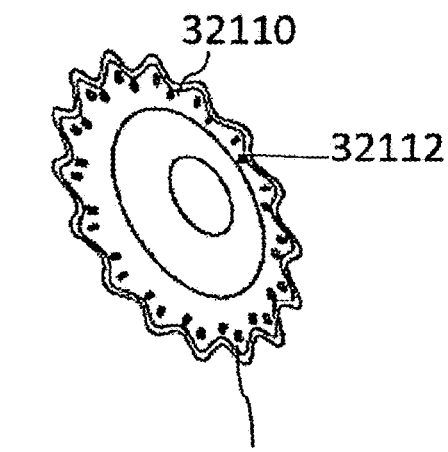
FIG. 32A  FIG. 32B  FIG. 32C
FIG. 32D  FIG. 32E  FIG. 32F
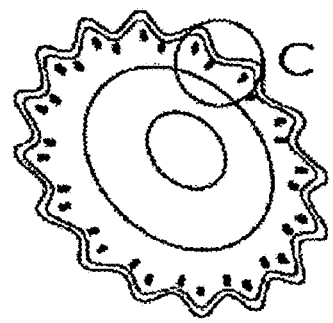
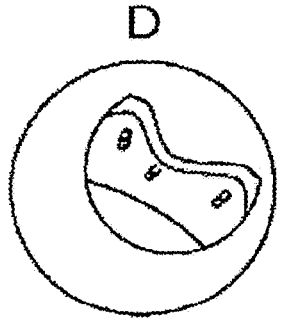
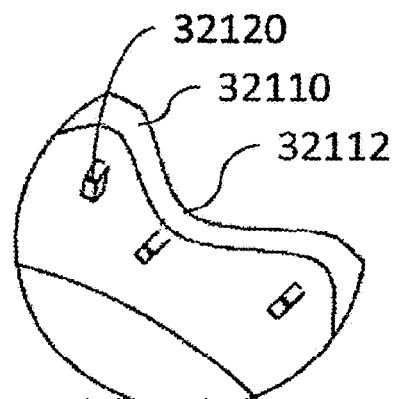
FIG. 32G  Side View 1  Side View 2
         FIG. 32H    FIG. 32I FIG. 33
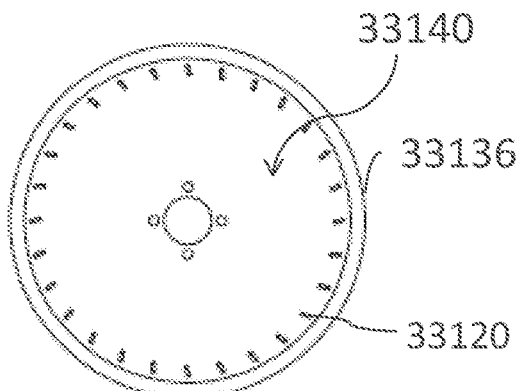
FIG. 33A
FIG. 33B
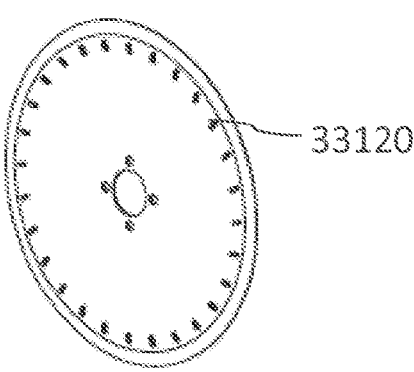
FIG. 33C
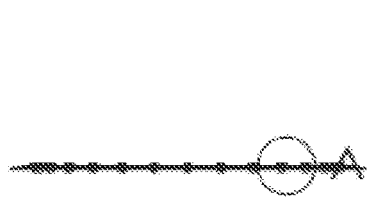
FIG. 33D
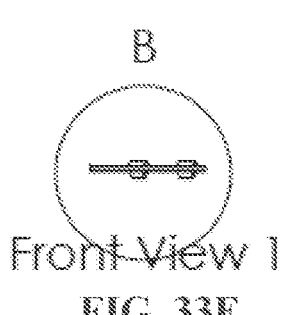
Front View 1
FIG. 33E
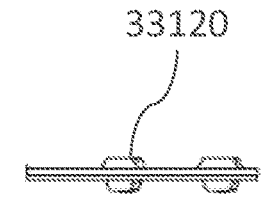
Front View 2
FIG. 33F
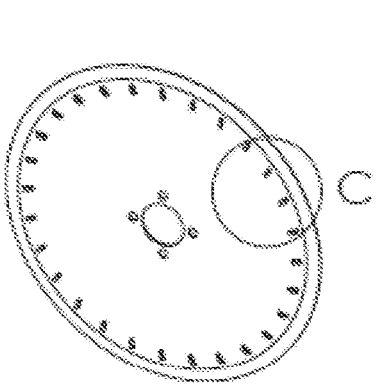
FIG. 33G
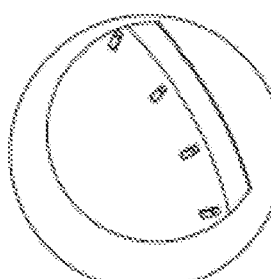
Side View 1
FIG. 33H
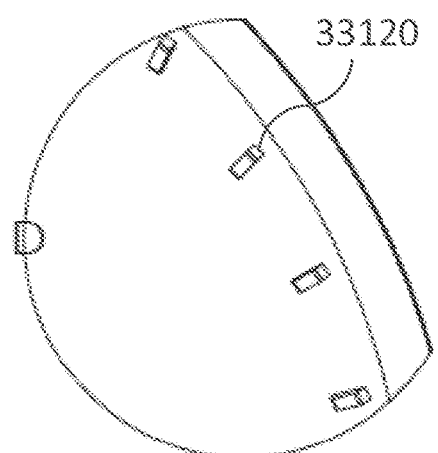
Side View 2
FIG. 33I

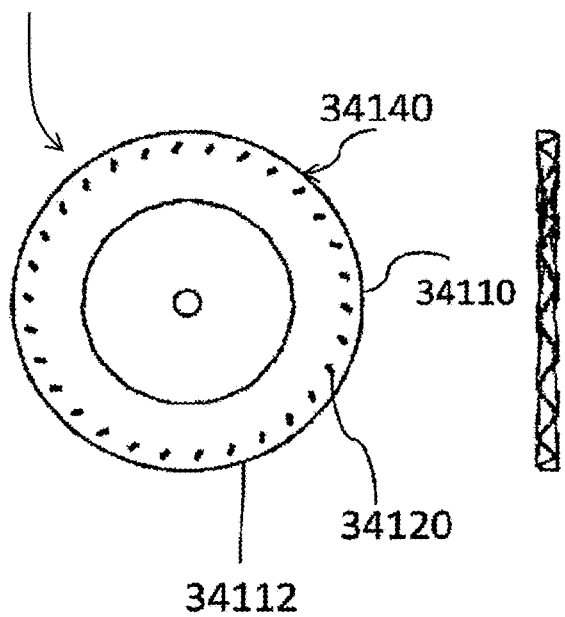
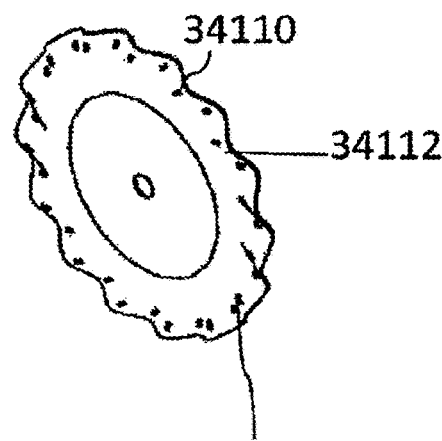
FIG. 34A    FIG. 34B    FIG. 34C
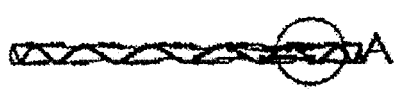
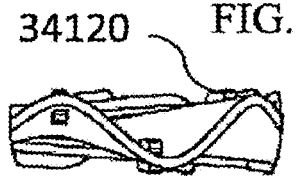
FIG. 34D    FIG. 34E    FIG. 34F
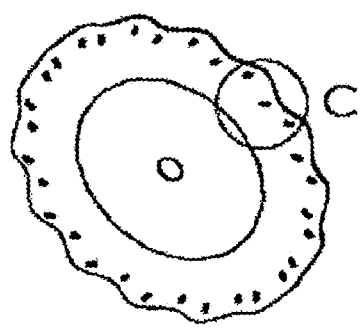
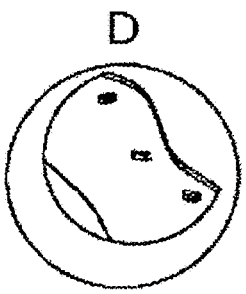
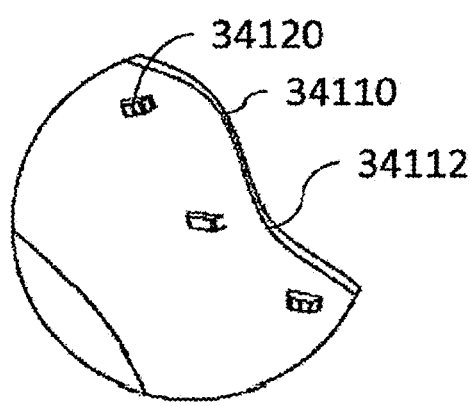
FIG. 34G
Side View 1
FIG. 34H
Side View 2
FIG. 34I 3500
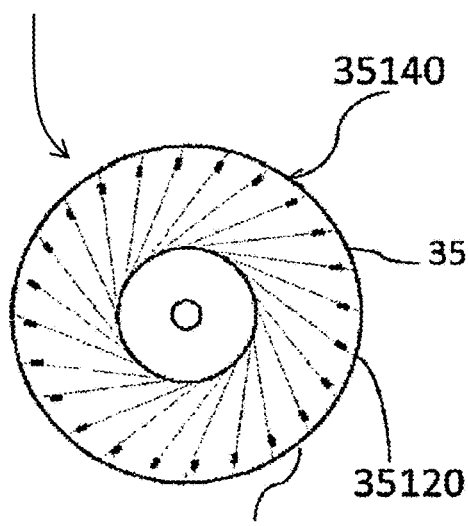  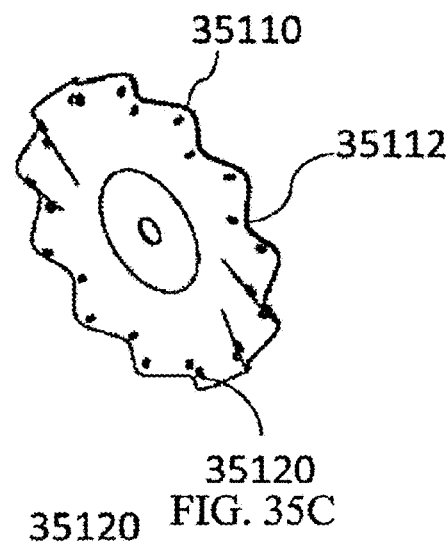
FIG. 35A     FIG. 35B     FIG. 35C
  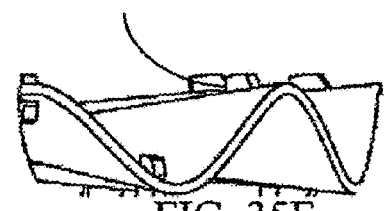
FIG. 35D     FIG. 35E     FIG. 35F
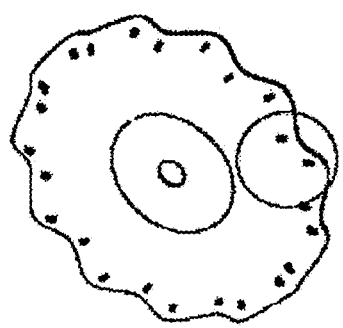 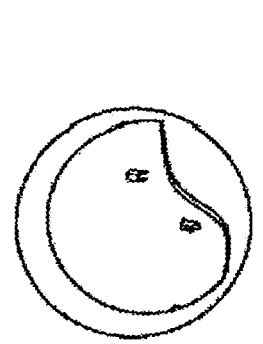 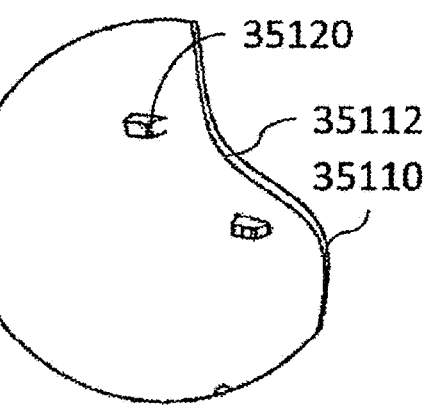
FIG. 35G     Side View 1 FIG. 35H     Side View 2 FIG. 35I

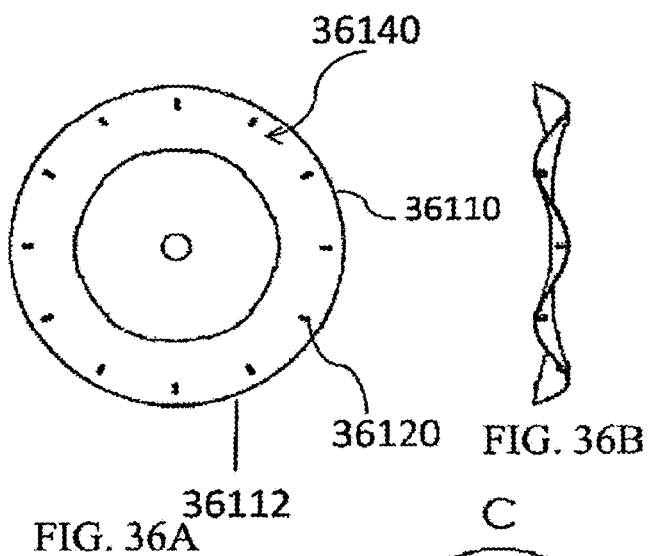
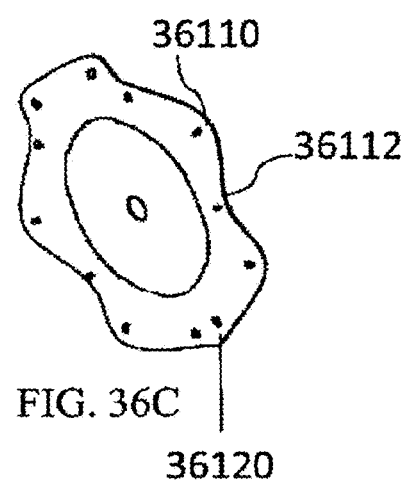
FIG. 36A  FIG. 36B  FIG. 36C
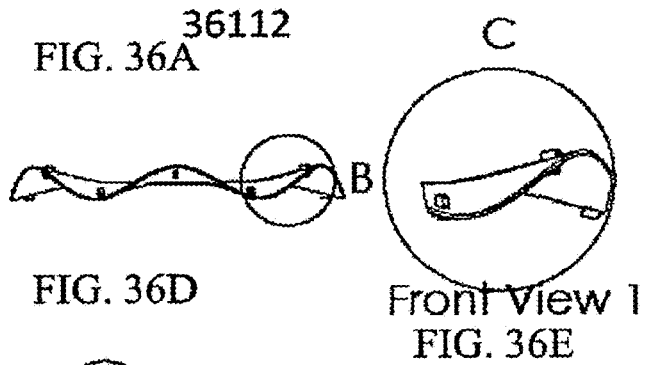
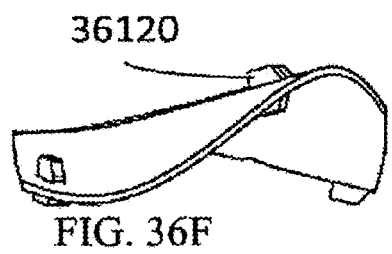
FIG. 36D  FIG. 36E (Front View 1)  FIG. 36F
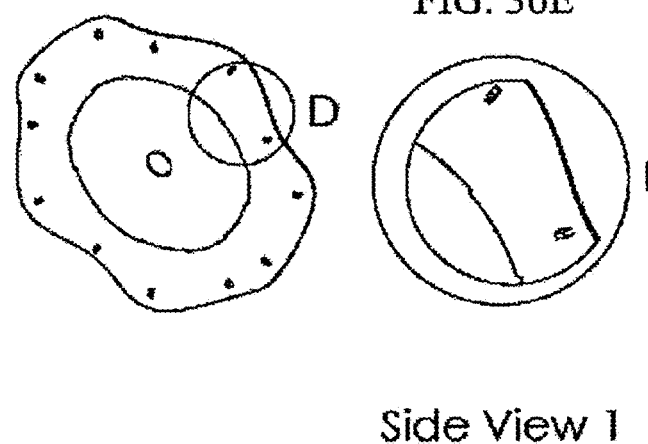
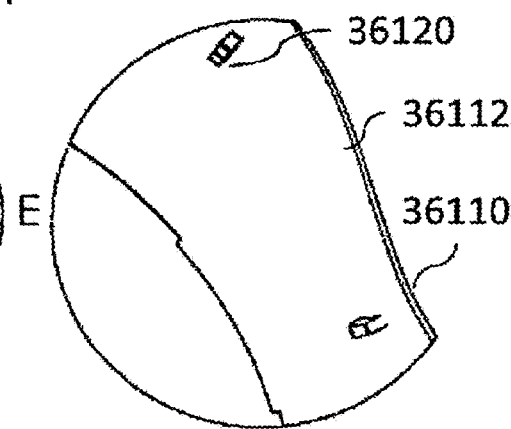
FIG. 36G  FIG. 36H (Side View 1)  FIG. 36I (Side View 2)

3700
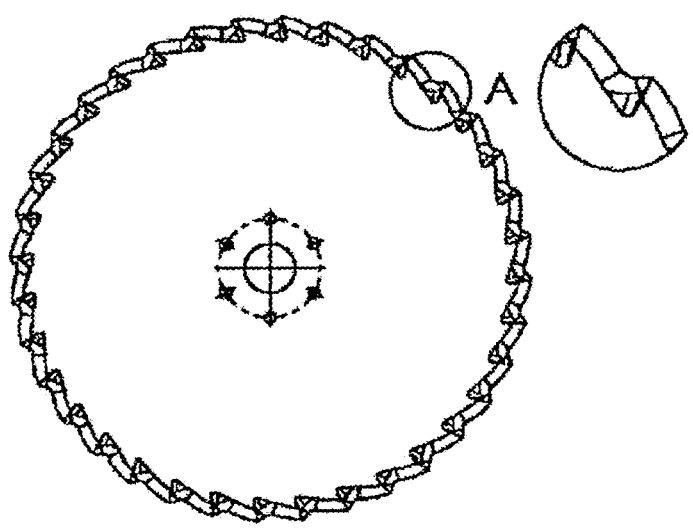
FIG. 37A  FIG. 37B
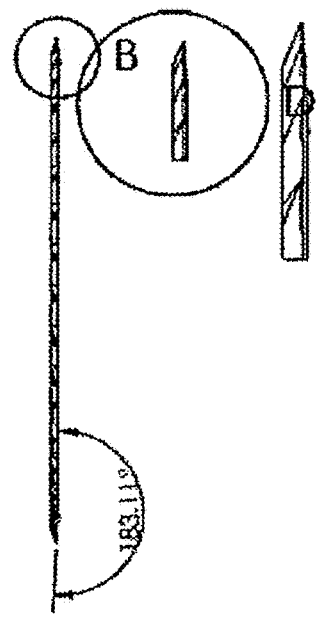
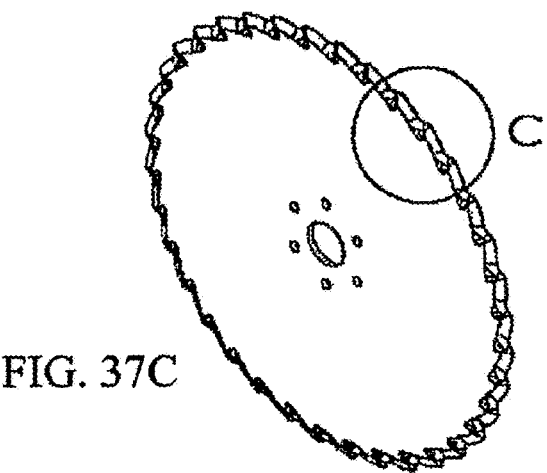
FIG. 37C
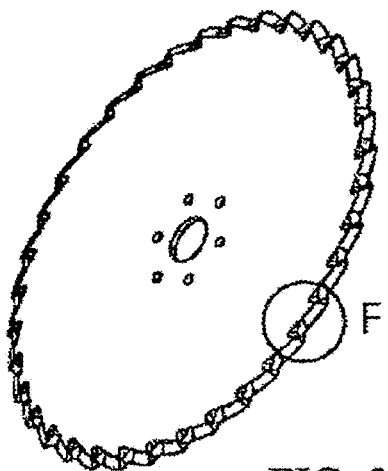
FIG. 37D
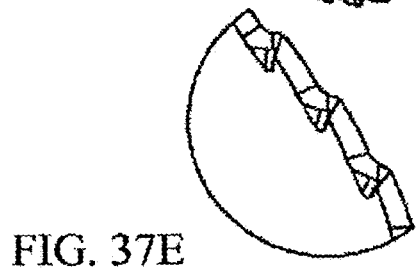
FIG. 37E
FIG. 37F 3800
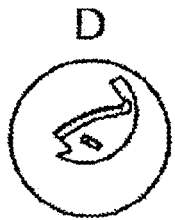
FIG. 38A
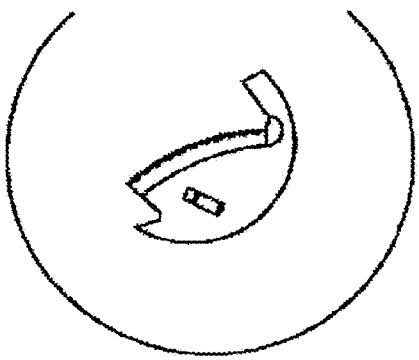
FIG. 38B
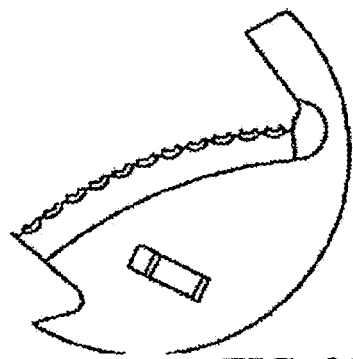
FIG. 38C
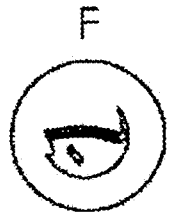
FIG. 38D
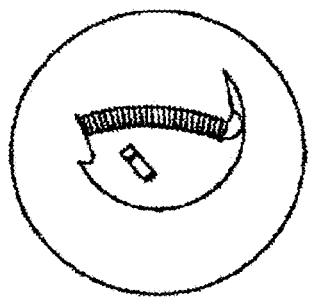
FIG. 38E
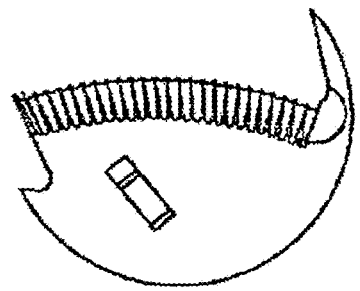
FIG. 38F
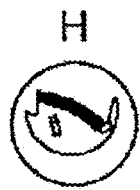
FIG. 38G
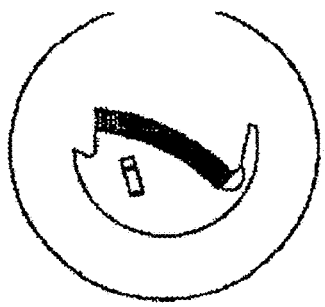
FIG. 38H
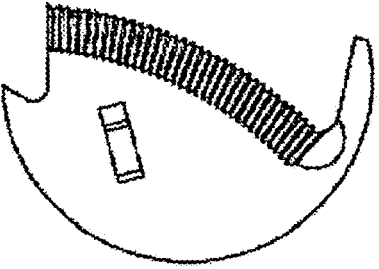
FIG. 38I

3900

4000
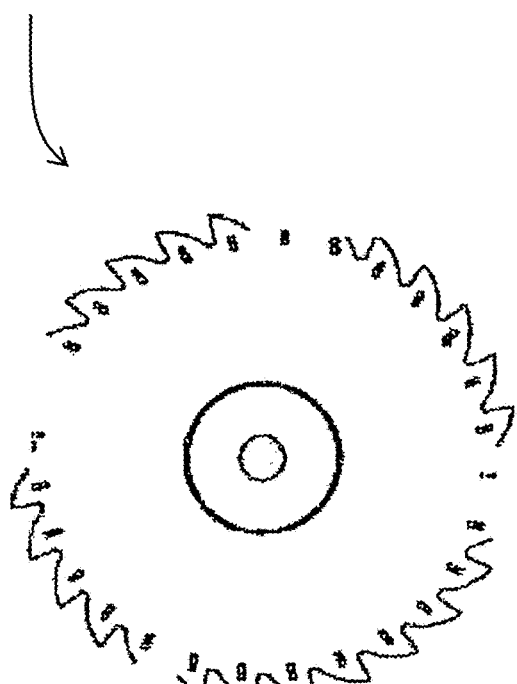
FIG. 40A
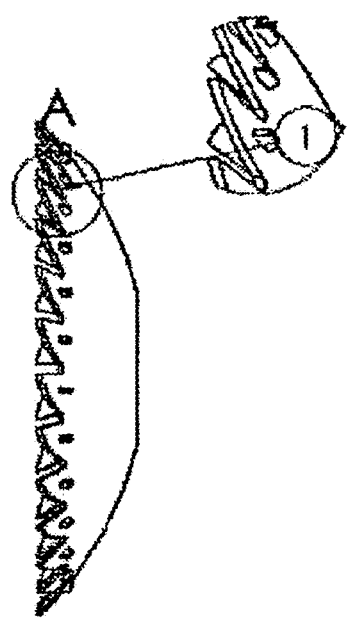
FIG. 40B
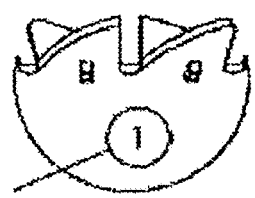
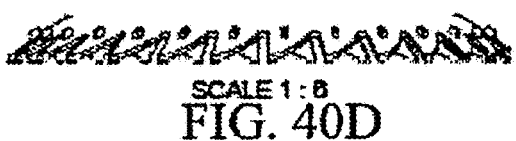
FIG. 40C  FIG. 40D
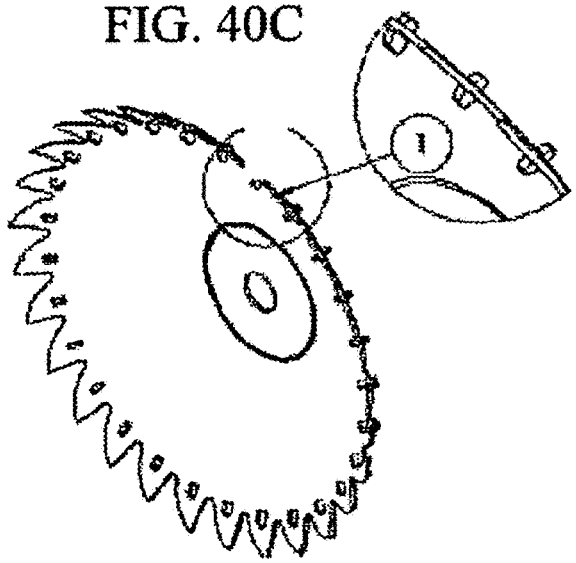
FIG. 40E
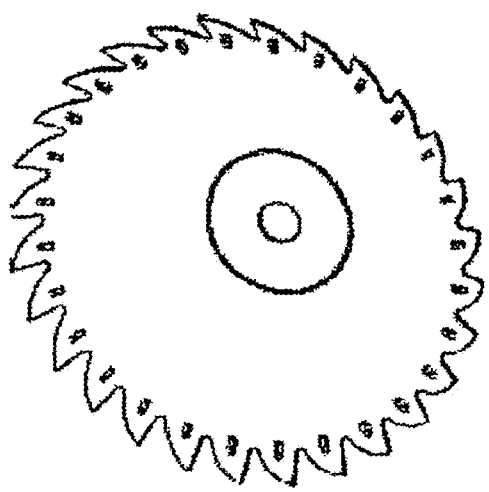
FIG. 40F

4300

5300

5500

5700
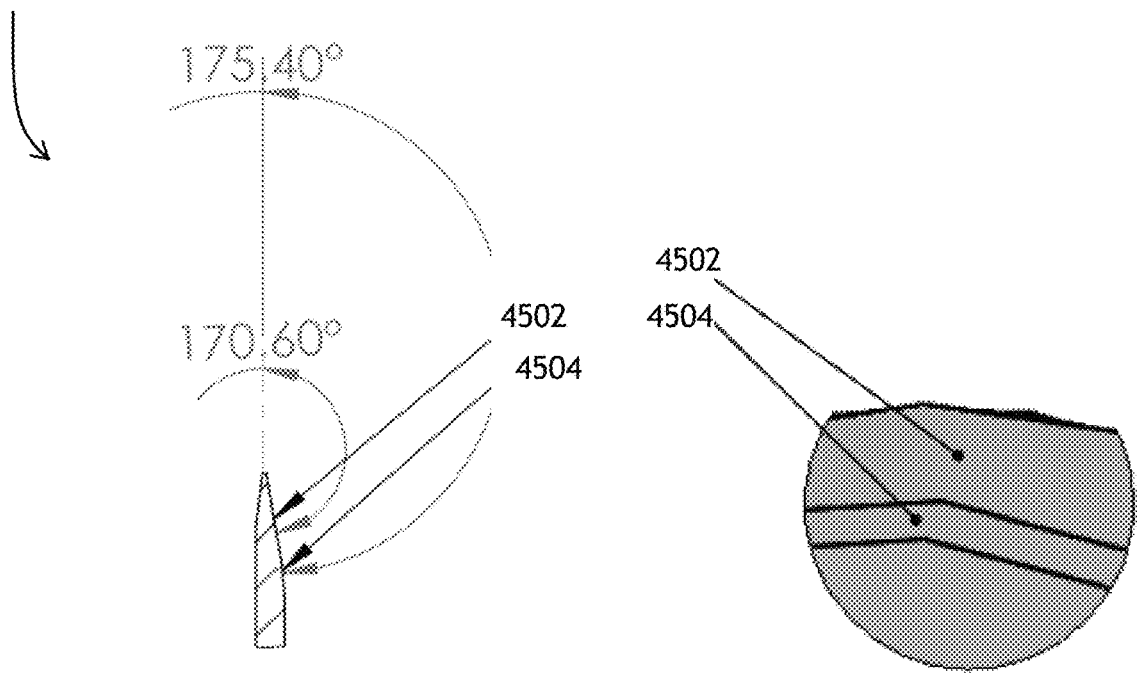
FIG. 57A
FIG. 57B
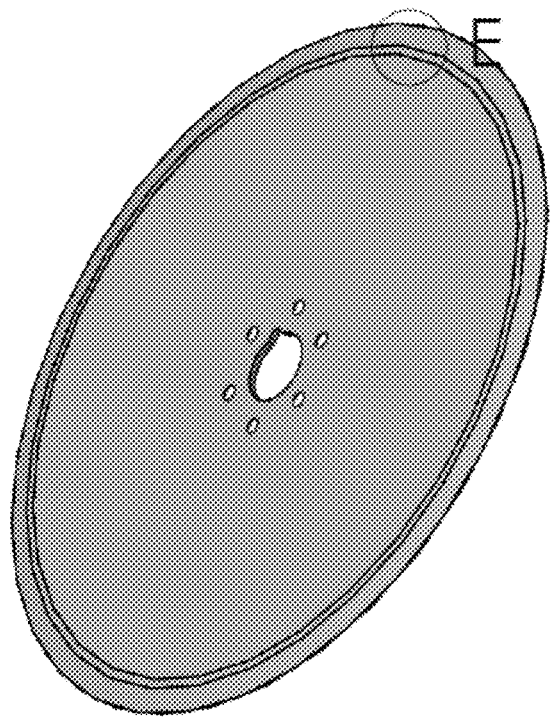
FIG. 57C

5800

5900

| STP 15" | | STP 14.75" |
|---|---|---|
| 15 | Diamter (inches) | 14.75 |
| 47.12385 | Circumference (inches) | 46.33845 |
| 25.46481 | Revolutions per 100 ft | 25.89642 |
| 51.40" (8.3%) | Cutting Circumference | 50.156" (7.6%) |
| 35 | Tooth count | 30 |
| 1.346" | Tooth Length | 1.545" |
| 1.469" | Tooth cutting length | 1.672" |

VARIABLE TOOTH COULTER BLADE WITH SIZED INSERTS

CROSS-REFERENCE TO RELATED APPLICATIONS

The present application is a continuation in part of U.S. patent application Ser. No. 14/998,442 filed Jan. 4, 2016 entitled "Variable Tooth Counter Blade with Sized Inserts" which, in turn, is a continuation in part of U.S. patent application Ser. No. 14/961,849 filed Dec. 7, 2015 entitled "Variable Tooth Counter Blade with Sized Inserts" which, in turn, is a continuation of U.S. patent application Ser. No. 14/590,855 filed Jan. 6, 2015, entitled "Variable Tooth Counter Blade with Sized Inserts," now U.S. Pat. No. 9,204,588 which, in turn, is a continuation of U.S. patent application Ser. No. 14/162,259 filed Jan. 23, 2014, entitled "Variable Tooth Counter Blade with Sized Inserts" which claims the benefit under 35 U.S.C. § 119(e) of U.S. Provisional Application 61/756,841 filed Jan. 25, 2013 entitled "Variable Tooth Counter Blade with Sized Inserts", the disclosures of which are hereby incorporated in their entirety by reference thereto.

BACKGROUND OF THE INVENTION

Field of the Invention

The present invention relates generally to agriculture tillage equipment. More particularly, embodiments of the present invention relate to an efficient device for cutting surface stubble while simultaneously mulching, tilling and aerating the soil.

Description of the Prior Art

Traditional agriculture requires turning of the soil to effectively bury desirable stubble to create needed composted material. With the advent of reduced tillage and minimum tillage farming techniques, coulter blades may be used to increase surface area by cutting and reducing the stubble to a manageable enabling compost and reuse of the desirable stubble.

Soil compression is an undesirable effect of tillage equipment interaction with the soil. Vehicle wheels and traditional coulter blades may compress the soil with which they may interact. Soil compression may multiply over time leading to less root enhancement, less root travel, and a lesser amount of air in the soil. These continued effects may result in an eventual reduction of product available to an operator.

A Genetically Modified Organism (GMO) stubble may be more substantial than traditional cellulose or stubble. Such GMO stubble is difficult for existing tillage devices to cut. A desired outcome of tillage equipment is GMO stubble cut into smaller segments for ease of compost and eventual GMO breakdown.

Traditional coulter blades may be unable to effectively cut GMO stubble and create a "wave" of stubble in front of the blade causing an eventual plug. This plug requires the operator to stop work and physically remove the plug before continuing operation.

Traditional coulter blades may flex as they enter the soil causing increased blade wear as the blade mating point may flex to an undesirable angle. Also, blade flex may cause undesirably increased sidewall compaction and decreased furrow width.

Therefore, a need exists for a blade designed to effectively cut regular stubble, the more substantial GMO stubble, green crop and cover crop while aerating, mulching and tilling the soil with a minimum amount of contact with the least amount of time.

SUMMARY OF THE INVENTION

Accordingly, an embodiment of the present invention is directed to a coulter blade for altering soil and surface stubble, comprising a discoidal coulter blade configured with a blade hub, a blade width, and a blade circumference, the discoidal coulter blade having a plane parallel to each diameter line of the discoidal coulter blade, the blade hub configured for detachably mounting the discoidal coulter blade to an implement. The discoidal coulter blade is further configured with a proximal side and a distal side, the proximal side being proximal to an implement attachment point, the distal side being distal from the implement attachment point.

The distal side of the discoidal coulter blade is configured with a first bevel sharpened at a first bevel angle and a second bevel sharpened at a second bevel angle, the first bevel being proximal with the blade circumference and the second bevel being distal from the blade circumference, the first bevel angle, as measured from the plane at the blade circumference, being less than the second bevel angle. The proximal side of the discoidal coulter blade configured with a counter bevel sharpened at a counter bevel angle, the counter-bevel being proximal with the blade sharpened point. The first bevel having a first bevel length, the second bevel having a second bevel length, and the counter bevel having a counter bevel length. The first bevel length is greater than the second bevel length and the counter-bevel length is less than the first bevel length.

In one embodiment of the present invention, a difference between the first bevel angle and the second bevel angle is less than 17 degrees. In another embodiment, the first bevel angle is 164+/−10 degrees and the second bevel is 174+/−10 degrees.

In an additional embodiment of the present invention, the first bevel length is substantially greater than the second bevel length and the first bevel length is substantially one-fourth of the blade width.

It is further embodiment contemplated herein, the second bevel length may be substantially one-fourth of the first bevel length and the counter-bevel angle is within 10 degrees of an implement attachment angle.

In one embodiment of the present invention, a first discoidal coulter blade is mated with a second discoidal coulter blade at a blade mating point, each of the first and second discoidal coulter blades is mounted to the implement and another embodiment may include a circumference of the first discoidal coulter blade dissimilar to the circumference of the second discoidal coulter blade.

Additionally, the circumference of the first discoidal coulter blade may be within 10 inches of the circumference of the second discoidal coulter blade and the first bevel length is at least approximately three times longer than the second bevel length.

In one embodiment of the present invention, the discoidal coulter blade is further configured with a plurality of insert openings and the discoidal coulter blade is further configured with a plurality of securably mountable inserts, each of the plurality of securably mountable inserts being configured to extend from the discoidal coulter blade a lateral distance normal to the plane on the distal side of the discoidal coulter blade and/or both the distal side and proximal side of the discoidal coulter blade.

In addition, embodiments herein may include the discoidal coulter blade having a concave shape and a substantially flat shape.

A method for altering surface stubble and altering soil may comprise sharpening a discoidal coulter blade on a proximal side and on a distal side, the proximal side being proximal to an implement attachment point, the distal side distal from the implement attachment point. The discoidal coulter blade configured with a blade hub, a blade width, and a blade circumference, the discoidal coulter blade having a plane parallel to each diameter line of the discoidal coulter blade.

The method may include sharpening the distal side of the discoidal coulter blade with a first bevel, the first bevel sharpened at a first bevel angle, the first bevel having a first bevel length, sharpening the distal side of the discoidal coulter blade with a second bevel, the second bevel being sharpened at a second bevel angle, and the second bevel having a second bevel length.

The first bevel proximal with the blade circumference and the second bevel being distal from the blade circumference, the first bevel angle, as measured from the plane at the blade circumference, is less than the second bevel angle, the first bevel length is greater than the second bevel length. Sharpening the proximal side of the discoidal coulter blade with a counter bevel sharpened at a counter bevel angle, the counter bevel being proximal with the blade sharpened point.

The method may include detachably mounting at least two discoidal coulter blades to an implement via the implement attachment point, the at least two discoidal coulter blades being configured to mate at a blade mating point, the blade mating point being substantially equal with each blade's counter bevel, embedding the discoidal coulter blade within the soil and translating the discoidal coulter blade through the soil at a depth via the implement.

BRIEF DESCRIPTION OF THE DRAWINGS

The invention will be more fully understood and further advantages will become apparent when reference is had to the following detailed description of the preferred embodiments of the invention and the accompanying drawing, in which:

FIGS. 13A-13E are diagrams of exemplary coulter blades with variable tooth number, tooth size, insert number and size, and gullet depth in accordance with embodiments of the present invention;

FIGS. 15A-15D are diagrams of insert effect on the soil at various blade depths in accordance with embodiments of the present invention;

FIGS. 16A-16D are diagrams of sidewall pressure the insert effect on the soil at various blade depths in accordance with embodiments of the present invention;

FIGS. 17A and 17B are diagrams of exemplary inserts in accordance with an embodiment of the present invention;

FIGS. 20A and 20B are diagrams of one insert exemplary of an embodiment of the present invention;

FIG. 21 is a flowchart for a method for altering surface stubble while simultaneously mulching, tilling and aerating the soil exemplary of an embodiment of the present invention;

FIGS. 29A-I are diagrams of exemplary inserts in accordance with an embodiment of the present invention, particularly showing a notch blade insert;

FIGS. 30A-I are diagrams of exemplary inserts in accordance with an embodiment of the present invention, particularly showing a razor blade insert;

FIGS. 32A-I are diagrams of exemplary inserts in accordance with an embodiment of the present invention, particularly showing a Sameri blade insert;

FIGS. 33A-I are diagrams of exemplary inserts in accordance with an embodiment of the present invention, particularly showing a straight blade insert;

FIGS. 34A-I are diagrams of exemplary inserts in accordance with an embodiment of the present invention, particularly showing a turbo blade insert;

FIGS. 35A-I are diagrams of exemplary inserts in accordance with an embodiment of the present invention, particularly showing a vortec blade insert;

FIGS. 36A-I are diagrams of exemplary inserts in accordance with an embodiment of the present invention, particularly showing a wavy blade insert;

FIGS. 37A-F are diagrams of exemplary fillets, True V Extended Fillet and True V Mate Taper, in accordance with an embodiment of the present invention;

FIGS. 38A-I are diagrams of exemplary serrated cutting edges, serrate 1 (FIG. 38A-38C), serrate 2 (38D-38F), and serrate 3 (38G-38I), in accordance with an embodiment of the present invention;

FIGS. 40A-F are diagrams of exemplary inserts in accordance with an embodiment of the present invention, particularly showing curved/concave multiple insert blade;

FIGS. 56 and 57A-57C are images of a notch coulter blade exemplary of an embodiment of the present invention;

DESCRIPTION OF THE PREFERRED EMBODIMENTS

Figure 1:
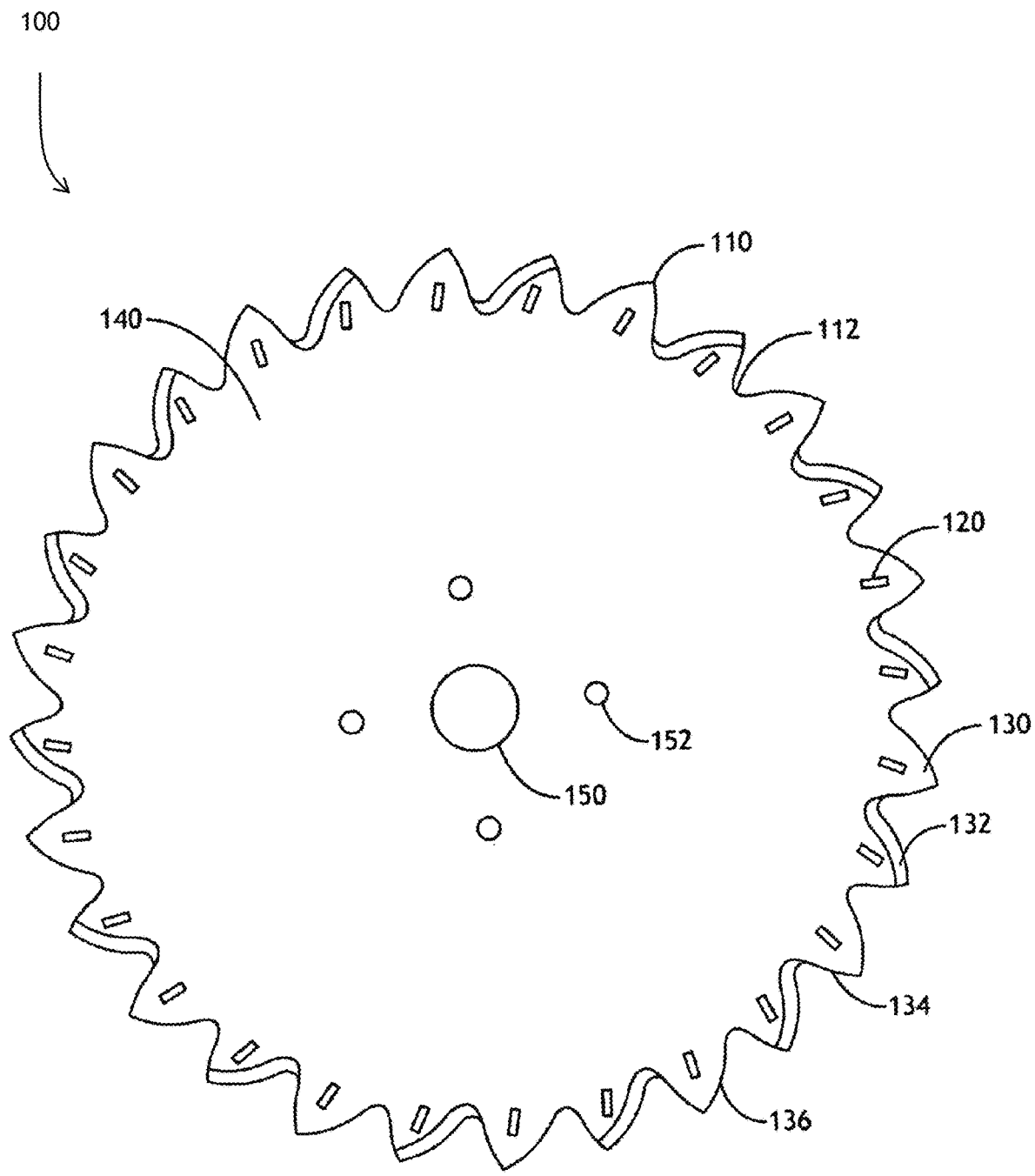
FIG. 1 is a diagram of a coulter blade with sized inserts exemplary of an embodiment of the present invention.

Reference will now be made in detail to the presently preferred embodiments of the invention, examples of which are illustrated in the accompanying drawings. The subject Variable Tooth Coulter Blade With Sized Inserts shall be referred to throughout as the STI Series blade, or the subject coulter blade, generally.

The following description presents certain specific embodiments of the present invention. However, the present invention may be embodied in a multitude of different ways as defined and covered by the claims. In this description, reference is made to the drawings wherein like parts are designated with like numerals throughout.

One goal of the present invention may include a device capable of cutting the soil with a minimum required Downward Pressure (DP). DP on tillage equipment may be directly proportional to force required to pull the tillage equipment through the field. A reduction in DP equals a corresponding reduction in force and thus, reduced fuel used to pull the equipment.

An additional goal of the present invention may include a coulter blade with a plurality of sharpened teeth, the teeth shaped to efficiently cut a substantial portion of stubble. The teeth may be of uniform shape or variable with angular position around the circumference of the blade.

An additional goal of embodiments of the present invention may be to mulch, till and aerate the soil with which the inserts of the blade may interact. Such mulching, tillage and aeration may prove beneficial to annual root growth as well as long term health of the soil.

An additional goal of the embodiments is to uniquely provide a blade that functions in wet and dry soil, while providing a large degree of blade angle rotation.

Another goal of the embodiments of the present invention is to provide a coulter blade with sized inserts that is driven by tooth and insert geometry. Geometrically, the unique structural combination of the tooth has been surprisingly and unexpectedly found to operate to not only provide optimal soil preparation, but to drive the coulter blade.

Applications

The subject STI series blade is contemplated having various configurations for optimizing soil engagement, including single side, opposing side, coned, curved, waffle, straight, notched tooth, ripple, turbo, vortex, or multiple blade configurations. Other configurations contemplated include rotating knife, multiple-sided, geometrical or tillage apparatus or blade high-pressure tube injection coulter system, and inserted covering finger, multiple teeth at multiple angles, multiple inserts at multiple angles and designs including serrated teeth at multiple angles and configurations. Blades with multiple attachments or devices as to insert, inject or placement are also contemplated.

Further contemplated by the subject STI series blade are applications in seeding; planters, seeders, or seeding systems using ground engagement or attached multiple use placement systems SDS [Seed Delivery Systems]-FDS [Fertilizer Delivery Systems]-MDS [Manure Delivery Systems]-LDS [Insecticide Delivery Systems]-BDS [Biological Delivery Systems]-CEDS [Carbon Exhaust Delivery Systems]-TRPDS [Transplant Delivery Systems]-ETRDS [Electronic Delivery systems].

Other contemplated applications of the subject STI series blade or coulter blade with inserts include use with: 1. tillage tools and soil excavation; vertical tillage, disk, fertilizer eq, manure eq, waste eq, mulching eq, plow, sub soil compaction eq, step till, road construction, excavation eq, tiling, multiple cable laying machine', lawn aeration and fertilization, roto-tillers, insecticide or multiple element placement or injection from gas-solutions-granular and utilizing moist granulated soil sealing capabilities [example—NH3 or carbon exhaust]; 2. plant and cellulose processing, cutting and harvesting; silage choppers, corn heads, grain heads, pea harvesting heads, hay or cellulose harvesting, hay and cellulose processing [for example, tub grinders-bio-mulching eq, carbon shredding eq, aluminum shredding or cutting eq, poly shredding or cutting eq, low density elements processing], sickle sections, sugar cane harvesting eq, row crop header, disk bine, detasselers, food and carbon product processing; 3. Cutting-shredding; mowers, shredders, brush cutters, tree trimming, stump grinding, woody and plastic processing, polymer processing; and 4. hand tools and power driven devices; machetes, axes, hatchets, knives, kitchen utensils, meat grinders and processors, bone grinders, surgical instruments, and military defense.

Blade Size and Shape

An exemplary embodiment chosen for illustrative purposes may include a coulter blade of circular shape with a plurality of teeth configured to interact with chaff on the surface of the soil as well as the soil itself. This exemplary embodiment employs at least one circular row of inserts oriented normal to the surface of the blade and able to interact with the soil as the blade traverses the soil.

Blade Rotation as to the Linear Distance Traveled. The subject STI Series blade rotates up to 96% of linear distance traveled at hub depth or shallow depth. The subject STI series blade utilizes blade rotation as to the Linear Distance Traveled, Cutting, Self Sharpening, Soil Granulation and least amount of Contact in the least amount of time. STI series blade rotates 85-96% of linear distance traveled hub deep. A good number of heretofore disclosed and utilized blades slip up to 50% of the travel distance at hub depth and most current blades slip 20-30% of linear distance traveled. On the other hand, the subject STI series blade substantially avoids slippage and as a result, yields optimal soil treatment and crop growth while saving time and lessening carbon footprint. Typical heretofore and utilized blades require substantial surface contact to rotate, for example—on each side of blade ~200 inches of contact to turn; conversely, the subject STI series blade only needs ~40 inches of contact to turn.

Forward Motion

When an object is pushed or moved forward, at certain geometrical angles, engagement angles engaged downward or certain lateral downward movement, the object utilizes forward rotation, forward forces, forward energy and forward angles to engage, thereby lessening energy, force required [down pressure] and lessening soil or product compaction. For example, a circular object engaged in soil generally pinches and/or rolls upward and out [i.e., a wheel], which requires more down pressure and energy to maintain depth control. By utilizing certain geometrical objects at certain geometrical angles, objects may utilize soil or product density as to pull, anchor, leverage or engage.

Objects: Fillet or Gullet, Insert, Backside of tooth of the subject STI series blade—without being bound by theory, rotation during forward motion maximizes friction and concentrated friction. Forward rotation at certain geometrical angles with certain geometrical objects flow product outward, lessening soil or product area and volume. Forward rotation at a 3:30-6:00 angle is a push force of which reverses to a pull force at or after the 6:00 angle [insert ratchet point] is rotated forward and upward toward the hub center point in forward motion and soil or product exit point in forward motion. Thereby utilizing the pull and lift force to lessen the push force by maximizing the object geometrical designs and at certain geometrical angles.

Forward tooth rotation of the subject coulter blade with an upward point, upward multiple angles or upward sabers, utilize concentrated friction and force in forward rotation and forward motion, verses downward angles, chopping actions or of common blade geometry. Soil compaction is lessened in forward rotation of the subject blade by the previous tooth removing soil compaction of the present tooth, in a crossing and or forward lifting pattern.

The subject STI series blade is driven via forward motion by tooth geometry with or without inserts. Geometrically, in combination the backside of the tooth [preferably, a Vertical Blunt edge], tooth fillet or gullet, opposing or single tooth bevel pattern, tooth bevel angle, and inserts structurally result in a blade that exhibits the least amount of contact in the least amount of time theory. This means that the subject blade predominately only has soil contact on the outer circumference of 1-2.5", for example, thereby lessening Friction by Soil contact while other blades have a much greater soil contact.

Structurally, in preferred embodiments, the backside of the tooth has a vertical blunt edge, while between each tooth there is a fillet or gullet, and an opposing tooth bevel pattern is provided. Combined, each of these structural features operate in concert to optimally drive the coulter blade via forward driving force. Alternating soil contact pressure utilizing a forward driving force drives the blade forward while also keeping the blade in a straight linear motion, as opposed to a side driven motion which causes massive contact and friction.

Conversely, current coulter blades use the pinch/wedge, notch or down pressure theory, typically moving forward by way of side driven motion as the soil presses onto large surface area sides of each blade, causing compaction of the soil. As a result, the soil does not aerate, maintain moisture or drain properly and therefore it leads to crop failure. On the other hand, the subject invention provides a coulter blade with or without sized inserts that uniquely functions to lessen sidewall compaction and pressure, thereby lessening blade friction and allowing easier rotation. At the same time, the subject blade results in a granulation of the soil which leads to optimal aeration, drainage and capillary moisture action for optimal crop yields. Least amount of contact in the least amount of time results with use of the subject coulter blade as the blade predominately only has soil contact on the outer circumference, lessening friction by soil contact.

The subject STI series blade uses a concentrated saber tooth shaped—beveled or curved bevel, using friction and force in forward motion to produce actual consistent rotation that results in least amount of contact—least amount of time in line with soil treatment theory. The subject STI series blade can be variable Geometrical Angled and Configured with serrations for forward motion, or not.

Self Sharpening

By utilizing Soil or product flow in certain Geometrical Angles and Flow [the fillet and tooth design] the subject STI series blade may increase or decrease wear, as soil or product flow is directed so as to maintain tooth geometry in one or more designated areas. Utilizing the Friction Flow Theory, Tooth integrity and Tooth profile throughout the wear cycle of the blade may be maintained. This can be achieved a number of ways. Firstly, by changing the fillet (size, angle, position and geometrical shape). Or by adjusting a concentrated soil flow across the tooth bevel side and controlled concentrated flow through the fillet at the back edge of the tooth profile, thereby causing normal wear forces to maintain tooth geometry and a sharpening action.

Soil Granulation, Subsoil Fracture, Sidewall Fracture

Soil Granulation, Subsoil Fracture, Sidewall Fracture of soil is achieved through use of the subject STI series blade with or without inserts. Tooth geometry of the subject blade in conjunction with insert angle, insert geometrical design, insert size, insert plurality and insert placement on blade, results in piercing of the soil at a geometrical angle in forward motion utilizing the least amount of contact and least amount of time.

By piercing the soil at certain insert angles and certain hub to insert angle ratios in forward motion, the insert of the subject blade pierces the soil and rotates generally to a 6:00 position, lifting soil at a geometrical angle towards the hub center point, thereby causing subsoil fracturing at the base of the tooth, sidewall fracturing and a soil granulating effect. This is due to lessening soil compaction in forward motion, which is the cause of Soil clodding.

Sealing: By Granulating and Fracturing Soil through use of the subject coulter blade/STI series blade versus clodding (as with typical blades), this allows Products to be placed under and in the existing soil profile fractures in a horizontal position, thereby the existing soil seals and holds or stores Product. Conversely, in a compact, sealed and vertical position products may not be able to proliferate into or through the Soil Profile. This soil action makes the subject STI series both Environmental Protection Act (EPA) and Department of Natural Resources (DNR) friendly.

Cutting, Sizing, Slicing, Shredding, Mowing and Processing

The subject coulter blade with or without inserts, in one embodiment, uses a concentrated saber tooth shape and a beveled or cupped bevel tooth. Using friction and force in forward motion and actual consistent rotation the least amount of contact—least amount of time results. Variable geometrical angled teeth and configured serrations or multiple tooth fillets or gullets may be implemented according to angle or angles in forward motion based on the crop intended for planting/treatment or the soil type. Tooth shape and insert size, shape and angled arrangement helps alleviate hair pinning during operation. Attributes of the tooth allows a slicing motion as well as a chopping motion. Cupped or curved tooth lessens down pressure requirements and allows for increased and a more aggressive cutting action.

The coulter blade with or without sized inserts have an increased or longer linear tooth area versus the blade circumference area, thereby allowing up to 50% more shearing and cutting action per revolution of the blade—versus—linear distance travelled. By increasing shearing and cutting action per revolution, a smaller diameter blade may be used to increase tip speed and maintain depth with less down pressure requirements, thereby lessening equipment maintenance by stress and a decreased carbon foot print.

Single or altering beveled tooth patterns can be used by the coulter blade with or without sized inserts for a variation of soil types, multiple application and cutting conditions or blade applications. All coulter blades with sized inserts can be configured and reconfigured with replaceable teeth and inserts. Additionally, the coulter blade with sized inserts may be used in a shaft driven application [for example—mowing, hay cutting or processing]. The coulter blades with sized inserts are typically run at a higher rotational speed than linear travel in a mowing application; thus the tooth may be pitched in an upward angle to allow for lift of products to be mowed.

The subject coulter blade with or without sized inserts preferably utilizes a curved tooth or fillet that lessens soil contact and friction by utilizing an undercut curvature along the length of each individual tooth [undercut curved or fillet, along bevel area], while maintaining a sharper cutting edge. This construction allows increased cutting, less down pressure requirements and a self-sharpening action.

Tooth Seriation or Tooth Fillets

In an exemplary embodiment of the subject coulter blade with or without sized inserts, a seriated tooth is geometrically aligned with respect to the insert angle, utilizing a fillet, curved or non-curved, flat, wedge or other geometrical protrusions, against the beveled side of the tooth with a plurality of angles and sizes. With or without inserts or single and or double-sided tooth configurations at multiple geometrical angles, increased cutting, lower down pressure requirements and less surface tension on cutting-edge results; designed granulation of the soil [soil particle size] or amount of soil granulation can be controlled. Additionally, self-sharpening can be effectuated by controlled, concentrated soil flow. Lessoned soil sidewall pressure [compaction] and subsoil compaction are also enhanced by way of the tooth seriation or tooth fillets. Such constructs of the subject coulter blade result in uses for various soils, products, processing and other applications. Insert seriation or fillet at multiple configurations and geometrical angles of the subject coulter blade maximize soil flow, particle size and granulation.

Inserts

The subject coulter blade may utilize or not utilize Inserts according to the applications. Inserts may be of multiple geometrical configurations, sizes, length, depth, width, number of rows and angles [as to the hub or tooth angle, according to embodiments associated with outer and inner or multiple rows. Inserts may be applied, glued, fused, sweated, heat treated, coated or welded, inset [glued, fused, sweated, heat treated, coated, or welded], multiple stamped protrusions, snapped on or twist-locked, pressure fitted or slide locked. Inserts may be utilized on a single side, double side, offset from side to side or multiple geometrical shapes from side to side according to application. Inserts may be used on the subject STI series blades as well as on present and future commercial production blades. The inserts may be comprised of a number of suitable materials, including but not limited to, Hardox, Boron, Tool Steel, Cast, Carbides, Glass, Polymers and multiple metal alloys/compositions.

STI Series Fillet or Gullet

The Fillet may cut material previously cut or uncut by the tooth and releases material in an upward forward motion. The Fillet is a final cutting assurance device. The Fillet may be used in a shallow tooth application and Shallow depth applications [Ex STIP Blade series, Seeding, Planting, Shallow tillage or Tillage]. Final cut or fine cut [Ex Wheat, Green Peas, etc.] applications also contemplate use of the fillet or gullet. Moreover, in high-speed shaft driven applications, the fillet increases cutting processes in a reverse rotation. During rotation, the circumference position or positions of the fillet add area as to the soil lodging effect against the circular or multiple geometrical designs and or multiple angles, thereby generating a rotational force.

Granulation: The Fillet allows soil placement within the fillet area upon entry, and releases stored or placed soil in an upward exiting motion, thereby causing and increasing a soil granulating effect or granulated soil particle size. Granulated soil may be increased or decreased according to fillet geometrical design, plurality and size.

Lessons Soil, Subsoil and Sidewall Compaction: The fillet lessons soil, subsoil and sidewall compaction by allowing soil particle placement in the fillet area less force is exerted on the soil profile, lessening subsoil and sidewall compaction and soil smearing. Displacement of soil from the leading edge upon tooth entry and blade rotation lessons soil area or volume, thereby lessening applied soil pressure threw continued flow of soil from the cutting edge away from the blade and in a wedge flow, V flow or upward motion.

Lessons Down Pressure Requirements: By allowing Soil particle placement in the fillet area, less force is exerted on the soil profile. Displacement of soil from the leading edge upon tooth entry and blade rotation, lessons soil area or volume. Applied soil pressure is thereby lessened through continued flow of soil from the cutting edge away from the blade and in a wedged flow or V flow, outward flow and upward motion; thereby down pressure requirements are lessened.

Tooth Profile Maintenance

By utilizing the friction flow effect, tooth integrity and tooth profile throughout the wear cycle of the blade may be maintained by changing the fillet size, angle, position and geometrical shape. By adjusting soil flow across the tooth profile and controlled concentrated flow through the fillet at the back edge of the tooth profile, normal wear forces operate to maintain tooth geometry and create a sharpening action.

The Insert and Tooth Geometry

As in Soil Granulation-Subsoil Fracture Sidewall Fracture. The tooth geometry [sabre or multiple sabre angles or lengths or geometrical designs, bevel angles, widths or lengths, curved or fillet or gullet bevels, multiple geometrical fillet or gullet designs on backside of tooth, seriation, multiple geometrical designs of fillets or gullets against tooth bevel in forward motion, multiple depths of tooth backside, plurality of teeth] in conjunction with multiple insert angles, multiple insert geometrical designs, insert sizes, widths, lengths, insert plurality, and insert placements on blade, pierce the soil at a geometrical angle in forward motion utilizing the least amount of contact and least amount of time and create a soil shattering and soil lifting effect at multiple angles.

By wedge flow, V flow, the subject coulter blade effectively forces soil away from the front of the blade and uses insert piercing action. This results in soil prefractioning at 3:30-5:30 in clock position in soil or certain multiple angles in forward motion and certain multiple hub to tooth angles, multiple fillet or gullet geometrical designs, insert angles and ratios in forward motion. The insert prefractures the soil; then rotates forward and downward to a rotating 6:00 position, at which time the soil pulls or lifts in a forward, upward geometrical angle towards the hub center point. This causes subsoil fracturing at the base or tip of the tooth, sidewall fracturing and soil lifting from 0.5" to desired application and soil granulation. Soil compaction is lessened in forward motion by geometrical angles, positions and designs, least amount of contact and least amount of time. This decreases undesired soil clodding, soil ribbons and blade roll [i.e. soil being attached to the blade by soil compaction or force whereby, as the blade roles forward, there is a massive soil lifting effect, resulting in a void, hole or debit lift in the soil profile which is not desired].

Sealing: By granulating and fracturing soil-vs-clodding, the subject coulter blade allows products [for example, NH3, manure, liquid nitrogen, phosphates, volatile products or biological products] to be placed in and under the existing soil profile fractures, in or at horizontal positions without destroying preexisting soil structure, passages or fractures. As a result, the existing soil absorbs, seals, holds and stores products. This avoids creation of subsoil and vertical sidewall compaction and a sealed environment, wherein products may not be able to proliferate into or through the soil profile and volatilize into the atmosphere or runoff into undesirable areas. This concept makes the subject STI series blade EPA and DNR friendly. Granulated soil increases fertilizer and or product efficiency, increases soil to seed contact for better seed germination, increases application options of no-till, minimum till, cover crop inter-seeding and reduces moisture losses.

Least Amount of Contact—Least Amount of Time

The subject STI series blade predominately only has soil contact on the outer circumference of the blade, which includes the tooth geometry and or inserts with or without. This lessens friction and time of friction by soil contact or amount. By limiting blade pinch [soil contact and side force or side forces of the blade], surface contact area is lessened substantially. Alternating beveled teeth cause a wedge flow, V flow, or outward flow of soil or soil displacement in the front edge of the blade, thereby lessening soil area, amount of soil contact, amount of compacted soils and amount of time. Soil flow from the tooth to the insert in a wedge motion, relieves contact against blade side surface or side surfaces and duration of soil/blade contact.

Seeding Blades: STIR-STIP-Multiple Geometrical Tooth Configurations

Seeding Blades: Maximize Blade Rotation by means of fillet and tooth design and lessen sidewall blow out and sidewall smearing and blade roll, preventing soil push and plug of seeding devices. Seeding blades configured in accordance with the present invention can cut light or heavy residue, wet or dry residue [GMO materials], multiple massive root systems green or dry, cover crops green or dry and double cropping. They can allow multiple seed types, multiple seed placements at multiple depths, multiple applications and multiple geometrical configurations at slow or high speed in multiple soils and multiple soil challenging conditions, eliminating the need for extra tillage passes, forward coulters [i.e., no till coulters]. multiple geometrical configurations for present and future planting, trans planting or seeding units are contemplated [for example, planters, drills, air seeders, inline planting, vertical planting designs, trans planters and the like]. Seeding Blades are also contemplated by the subject coulter blade invention to maximize a moist granulated soil-seed covering effect for early germination. Fracturing sidewalls lessen subsoil compaction and soil profile preservation, maximize early and late root development, nutrient uptake and moisture management through soil granulation and soil sealing, eliminating the need for spike, finger or aftermarket closing devices. The variable tooth coulter blade described herein may also be configured as a seeding blade.

Inline Seeding and Inline Product Placement

The STI series uses a concentrated Sabre Tooth shape in an exemplary embodiment. Beveled or cupped bevel tooth configurations may also be utilized. Using friction and force in forward motion, actual consistent rotation, the least amount of contact and least amount of contact time results.

Variable geometrical angled teeth and configured seriation or multiple tooth fillets or gullets according to angle or angles in forward motion may be used. The attributes of the tooth allow a slicing motion as well as a chopping motion. The cupped or curved tooth lessens down pressure requirements and allows for increased and more aggressive cutting action. The STI series have an increased or longer tooth area-vs-the blade circumference area, thereby allowing up to 50% more shearing and cutting action per revolution of the blade-vs-linear distance traveled. The subject coulter blade maximizes blade rotation via fillet and tooth design and lessens sidewall blow out and sidewall smearing and blade roll, preventing soil push and plug of seeding devices. The variable tooth coulters described herein can be used to cut light or heavy residue, wet or dry residue [GMO materials], multiple massive root systems green or dry, cover crops green or dry and double cropping. They can allow multiple seed types, multiple seed placements, at multiple depths, multiple applications and multiple geometrical configurations at slow or high speed in multiple soils and multiple soil challenging conditions, thereby eliminating the need for extra tillage passes, forward coulters [no-till coulters]. Multiple geometrical configurations for present and future planting are contemplated, including transplanting or seeding units. [Examples include planters, drills, air seeders, inline planting, vertical planting designs, Trans planters and the like].

The subject STI series blade allows for seed placement directly behind the blade, via seed tube devices or apparatus, along with conventional closing devices or geometrical designed closing devices. The STI series maximize or enhance inline seeding placement and product placement by maximizing soil granulation, decreasing sidewall compaction and sidewall fracturing, moisture retention, decreasing subsoil compaction, enhancing furrow forming at low and high speeds. Maximizing moisture and granulating moist soil on or around seeds, enhances seed germination. The STI series blade allows product storage, sealing, and enhanced proliferation through the soil profile.

Single or bidirectional bevel tooth and fillet or gullet flows soil upon entry in a wedge flow, V-flow, outward flow away from the blade, thereby lessening soil area, soil contact, compacted soil contact and subsoil compaction in forward motion. The inserts pierce the soil at a geometrical angle in forward motion of the coulter blade; this results in the least amount of contact—least amount of time and decreased friction. By soil lifting and fracturing the subsoil and soil sidewalls, the seed or product zone is composed of fine or moist granulated soil, allowing enhanced seed germination and placement or product placement and/or the application of conventional or geometrically designed closing devices.

Soil Prefracture

The variable tooth concave coulter blade's teeth and/or inserts, granulate and prefracture, lessening normal slabbing and normal clodding caused by normal soil compaction in forward motion, normal down pressure and normal lateral movement. As the soil exits off the concave blade, the inserts further lift and granulate the ribbon effect. Whereas, on the opposite lateral side, the soil is normally compacted by down pressure and lateral forces, the inserts are used to pierce the soil in forward motion, fracture soil, lift soil and granulate soil, thereby lessening undesired compaction left in the soil.

Referring to FIG. 1, a diagram of a coulter blade with sized inserts exemplary of an embodiment of the present invention is shown. A circular coulter blade 140 exemplary of the present invention may include a plurality of teeth 110 each tooth 110 having a tooth cutting edge 136 and tooth back 134. Between each tooth 110, a gullet 112 may retain specific qualities for tooth effectiveness. In embodiments, each tooth 110 is sharpened on opposite and alternate lateral sides 132, 130 to effectively eliminate lateral sidewall pressure as the circular coulter blade cuts the soil. In embodiments, the circular coulter blade 140 may be configured with a plurality of inserts 120. Preferably, the subject coulter blade with sized inserts uses a concentrated saber tooth shape as shown generally at 130. A beveled or cupped bevel tooth construct, as shown at 132, may be provided for cutting, sizing, slicing, shredding, mowing and processing soil and stubble.

In one embodiment, the circular coulter blade 140 is detachably mountable to a tillage machine capable of mounting and operating many coulter blades 140. Coulter blade 140 may be detachably mountable to the machine via blade hub 150 and drive holes 152. It is contemplated herein; a bearing or other well-known rotatable device may allow for free rotation of the coulter blade 140.

Rotation of the blade is preferably from right to left with the sabre shape of the blade cutting edge 136 impacting and cutting the stubble on the surface of the soil. As inserts 120 enter the soil, the rotational action of the inserts 120 may fracture and bring to the surface an amount of soil with which the insert 120 may interact. Additionally, soil proximal to the insert 120 may also be fractured and brought to the surface due to energy transferred from the insert 120 to the adjacent soil.

Figure 2:
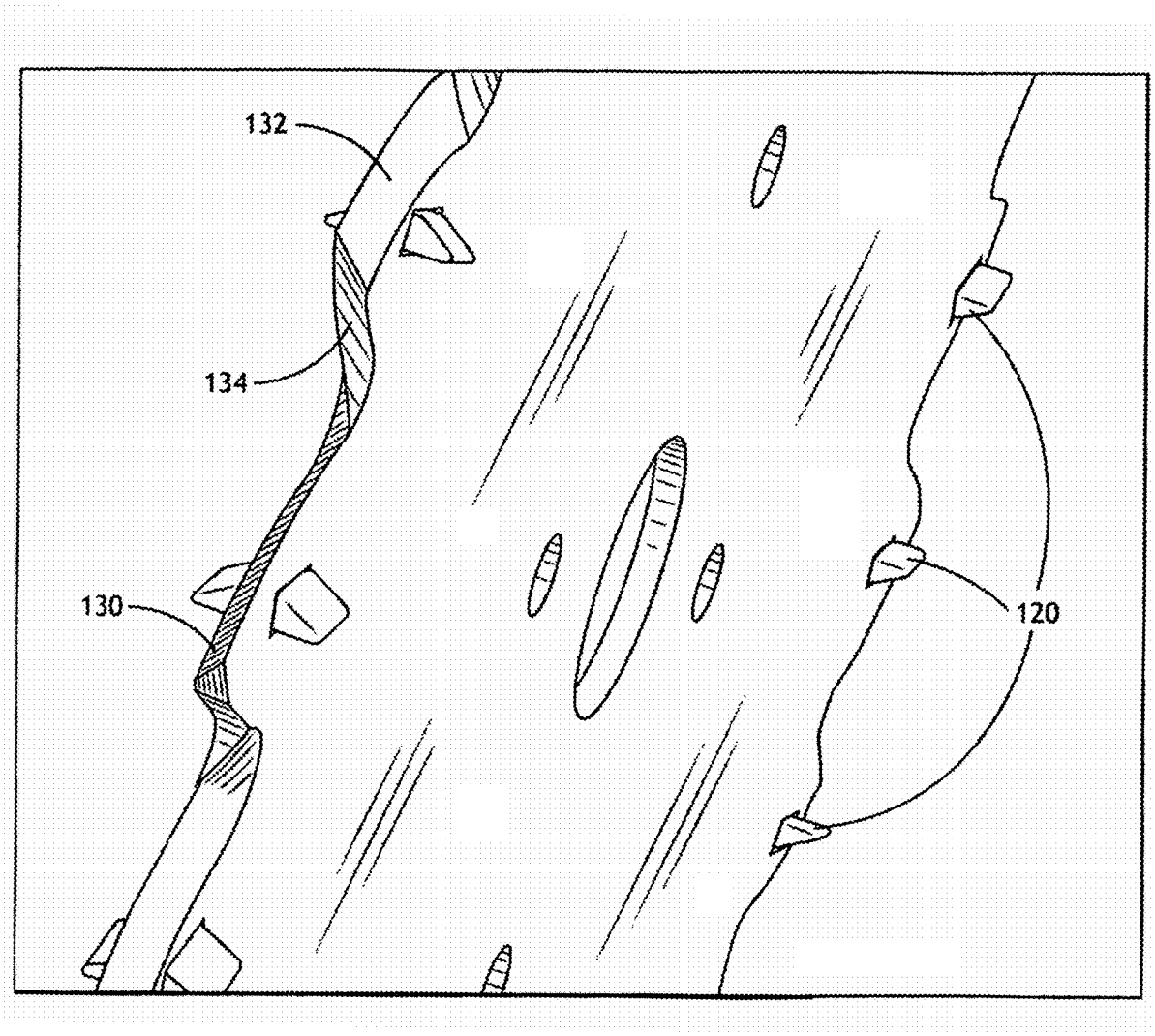
FIG. 2 is a detailed diagram of a coulter blade with sized inserts exemplary of an embodiment of the present invention.

Referring to FIG. 2, a detail diagram of a coulter blade with sized inserts exemplary of an embodiment of the present invention is shown. Sized inserts 120 may be clearly shown extending laterally from the circular coulter blade. Teeth 110 sharpened on a first lateral side 132 are adjacent to teeth 110 sharpened on a second lateral side 130. Tooth back 134 may help drive rotation of the coulter blade 140 as it interacts with the soil.

Figure 3:
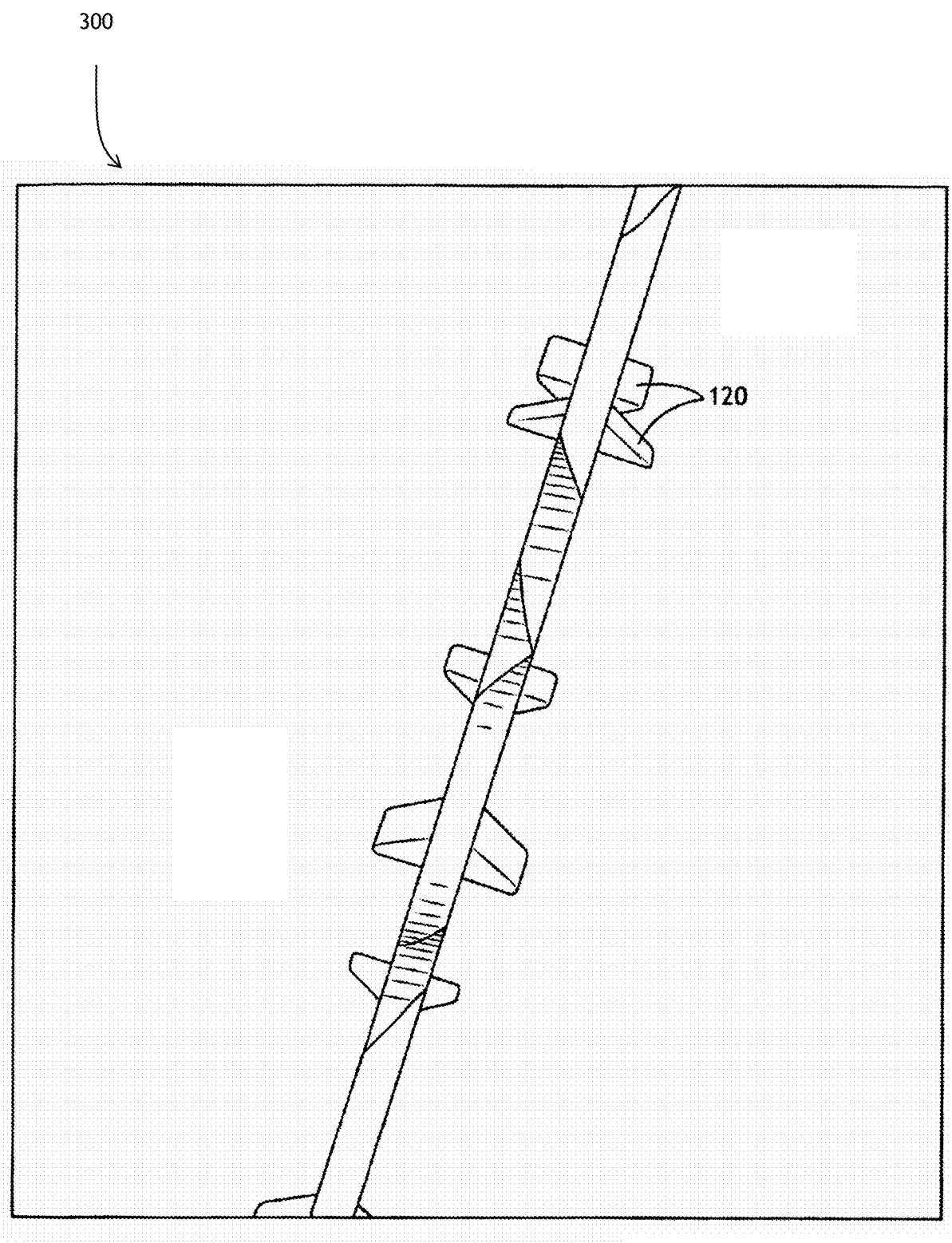
FIG. 3 is a detail side view diagram of a coulter blade with sized inserts exemplary of an embodiment of the present invention.

Referring to FIG. 3, a detail side view diagram of a coulter blade with sized inserts exemplary of an embodiment of the present invention is shown. Inserts 120 may extend laterally from the coulter blade 140. The shape of inserts 120 may depend upon the compaction and moisture level associated with the soil type of intended interaction. Shaped inserts 120 may be seen protruding from opposite sides of the coulter blade 140. Preferably, tapered inserts 120 of variable size may be incorporated to manipulate a desired amount of soil.

Within the scope of the present invention, coulter blade 140 may be constructed of a variety of material suitable for structural integrity while embedded in the earth providing earth aeration. In one embodiment, a coulter blade 140 of the present invention may be constructed of hardened steel such as that manufactured as "Boron".

Skilled artisans will recognize embodiments of the present invention may be manufactured from a variety of materials capable of abrasion resistance, long wear under stress, and able to be formed to the shapes required herein.

Variable sized inserts 120 placed proximal to the teeth 110 of the coulter blade 140 interact with the soil allowing the coulter blade 140 sidewall to remain nearly free from soil contact. As the coulter blade 140 rotates, each tooth 110 cuts into the soil and each insert 120 enters the soil at the desired angle. As the coulter blade 140 rotates, the insert 120 also rotates about the blade hub 150 and penetrates the soil. This insert 120 rotation and translation causes the soil with which the insert is in contact to become fractured and moved. As the blade hub 150 translates in a forward direction, the teeth and inserts 120 rotate about the hub causing the inserts 120 to lift soil to the surface. Depending on the depth of the coulter blade 140, the insert 120 rotational interaction with the soil may be increased (greater depth) or decreased (lesser depth).

An additional goal of the present invention may include leveling of the soil surface for optimal planting of a crop. In embodiments, the variable tooth coulter blade 140 may interact with the soil where tire tracks have compacted the soil over time. As the teeth 110 cut the stubble and soil, the inserts 120 interact with, aerate and loosen the compacted soil.

A further goal of the present invention may include aeration of the soil with or without removing large quantities of subsoil to the surface. For example, conventional blades may remove large clods or clumps of soil to the surface and may cause an unrecoverable moisture loss as well as undesirable large cavities below the surface. In addition, large clumps or clods of soil may remain unusable for over one growing season. Embodiments of the present invention may be configured to sufficiently aerate the soil with minimum void creation while leaving soil and root systems intact.

Embodiments of the present invention may enable tillage and aeration of the soil without removal of a previous root system. A previous root system may allow for organisms to breakdown and deposit the remnants usable for the next crop. Embodiments of the present invention may cut the root system without removing the root system from below the surface. This clean cut may allow for temperature movement, for water movement and increased aerobic flow to allow for organic organisms to thrive.

Tooth Size and Shape

Figure 4:
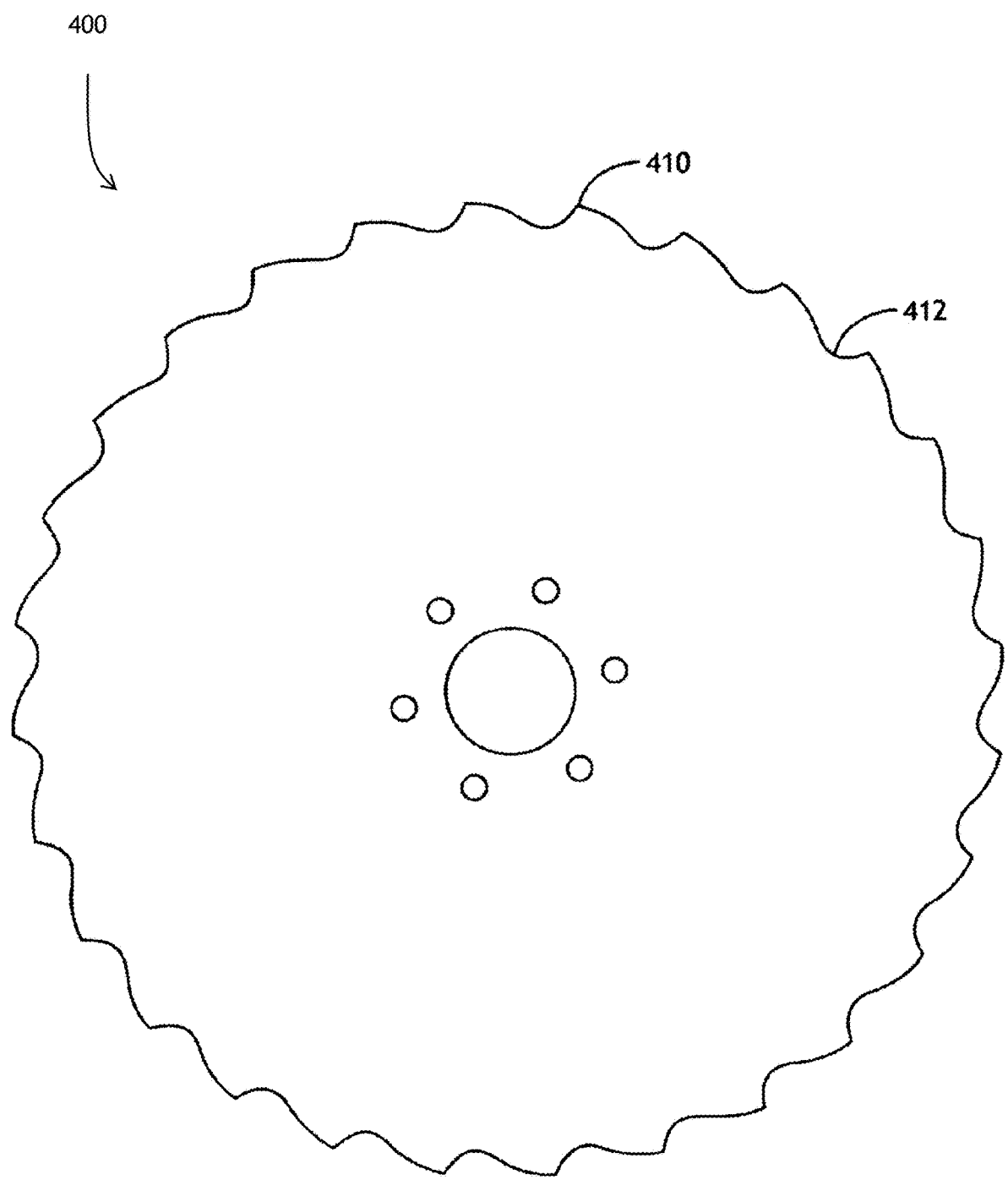
FIG. 4 is a diagram of a 28 tooth embodiment configured for rocky soil exemplary of an embodiment of the present invention.

Referring to FIG. 4, a diagram of a 28 tooth embodiment configured for rocky soil exemplary of an embodiment of the present invention is shown.

It is contemplated herein; the size and shape of each tooth may be altered for optimal performance for a particular type of soil. For example, in rocky soil, an operator may desire a shorter backside of tooth 410 enabling the teeth to withstand a rock impact whereas in sandy soil, an operator may prefer a longer backside on tooth 410 to enable greater stubble cutting while offering optimal soil aeration. The tooth 410 may enable a push of the rock to one side of the coulter blade 140 (see FIG. 1) resisting breakage due to rock impact.

It is further contemplated herein; tooth size and shape may be optimally configured for each of a plurality of soil types encountered by an operator. For example, a coulter blade 140 for rocky soil may possess a specific size and shape of tooth, a coulter blade 140 for non-rocky soil will possess a variant of the size and shape of tooth. While a coulter blade 140 for peat type soil may be optimally sized for penetration, a tooth for red clay or gumbo may be sized differently. Similarly, a coulter blade 140 designed for wet or dry soil may be optimally sized for proper aeration of the specific type of soil.

Figure 5:
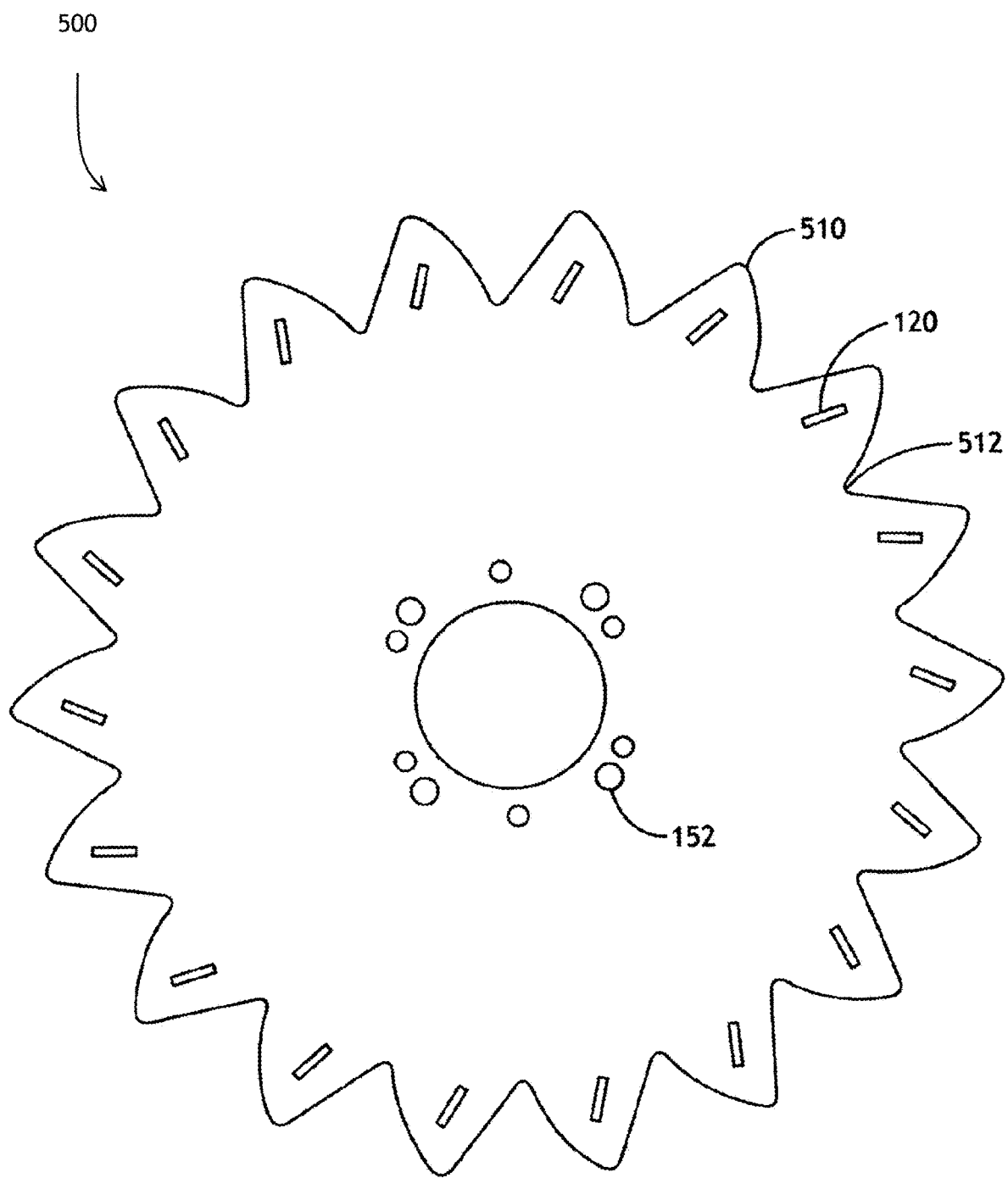
FIG. 5 is a diagram of an exemplary coulter showing 18 long teeth and an insert a variable angle exemplary of an embodiment of the present invention.

Referring to FIG. 5, a diagram of an exemplary coulter showing 18 long teeth and an insert a variable angle exemplary of an embodiment of the present invention is shown. An 18 tooth 510 design with inserts 120 may enable specific application in soft soil types. Tooth gullet 512 may be slightly rounded to continue a cut began by the cutting edge 136.

Figure 22:
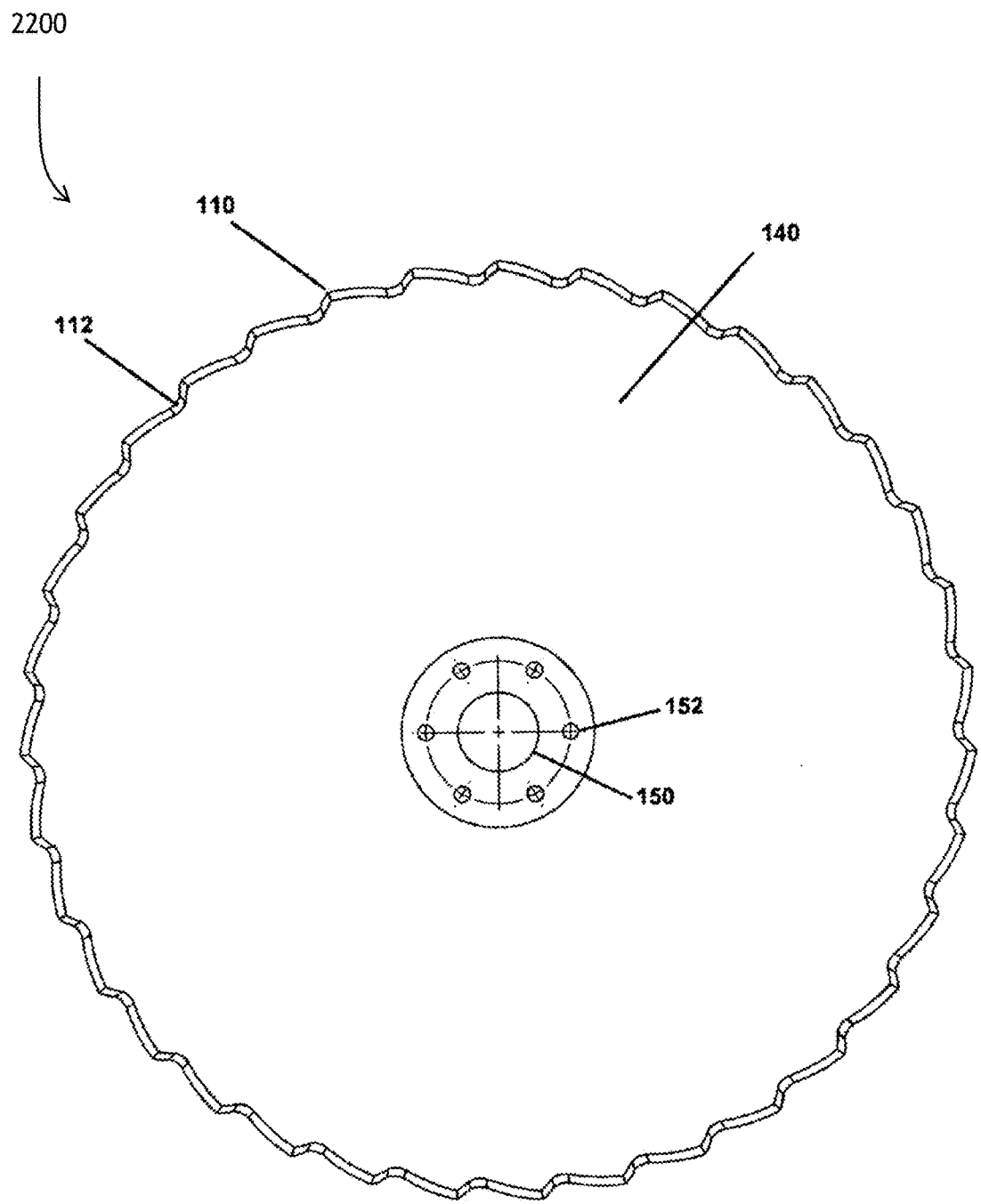
FIG. 22 is a detailed diagram of exemplary insert location and size in accordance with an embodiment of the present invention.
Figure 23:
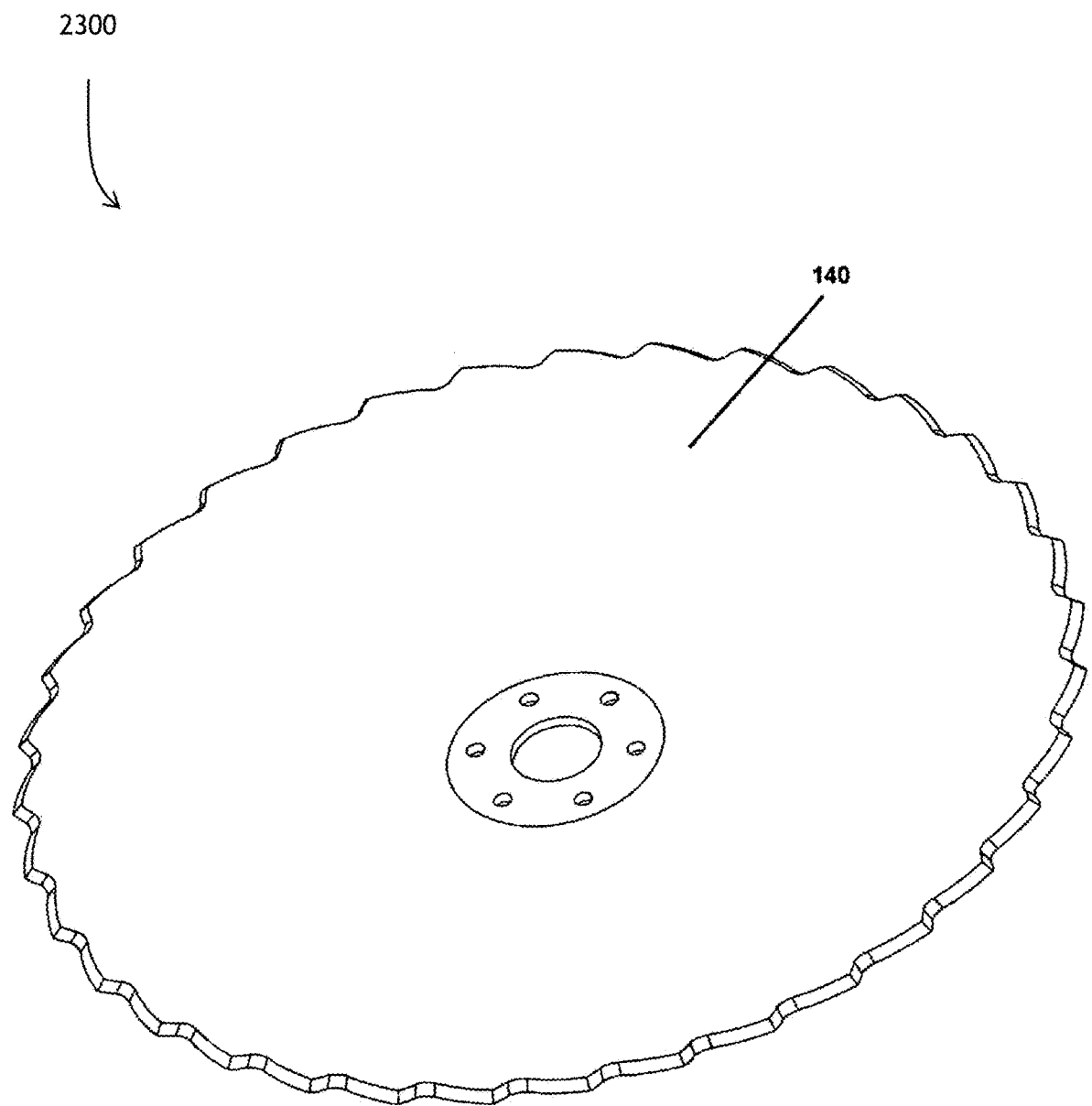
FIG. 23 is a detailed diagram of exemplary insert location and size in accordance with an embodiment of the present invention.
Figure 24:
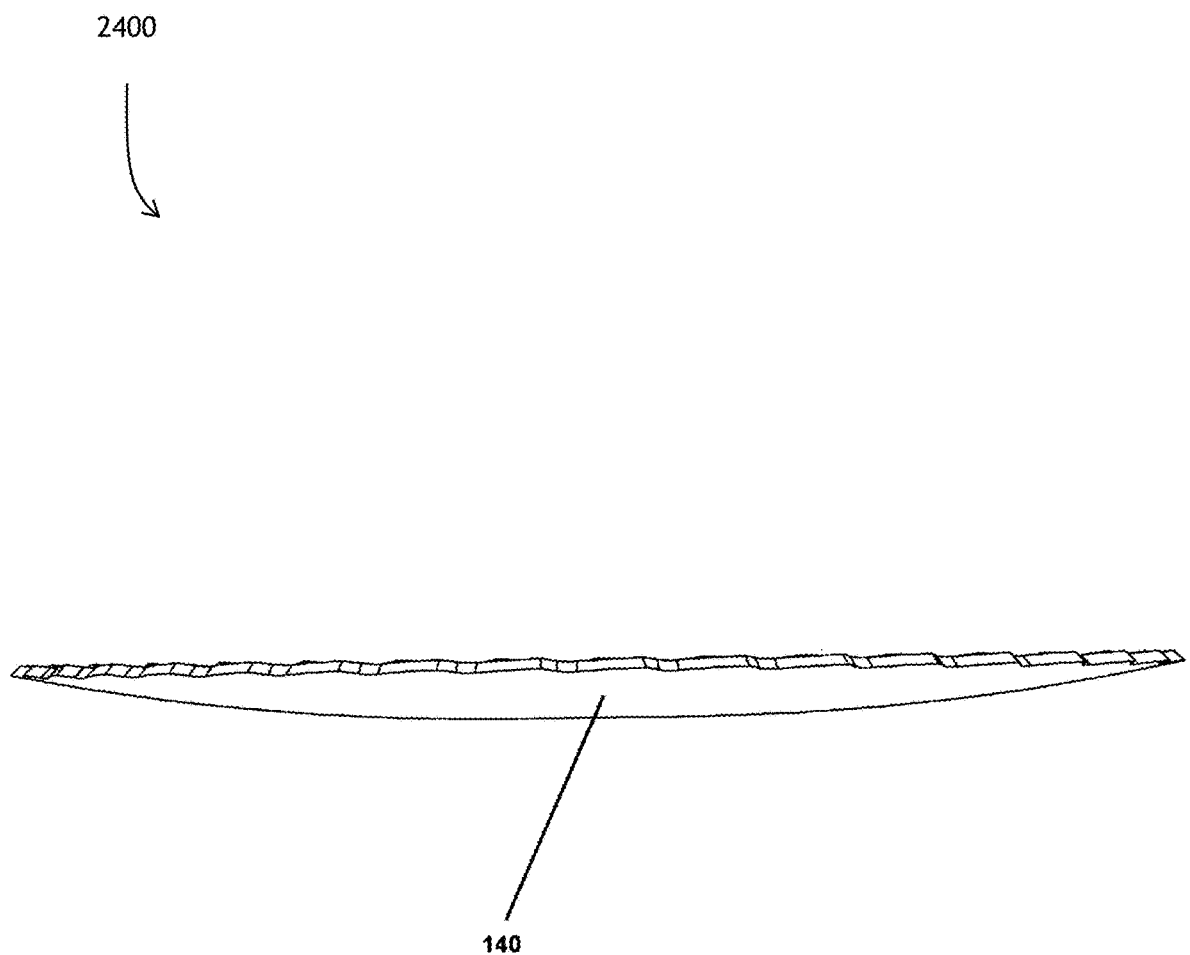
FIG. 24 is a detailed diagram of exemplary insert location and size in accordance with an embodiment of the present invention.
Figure 25:
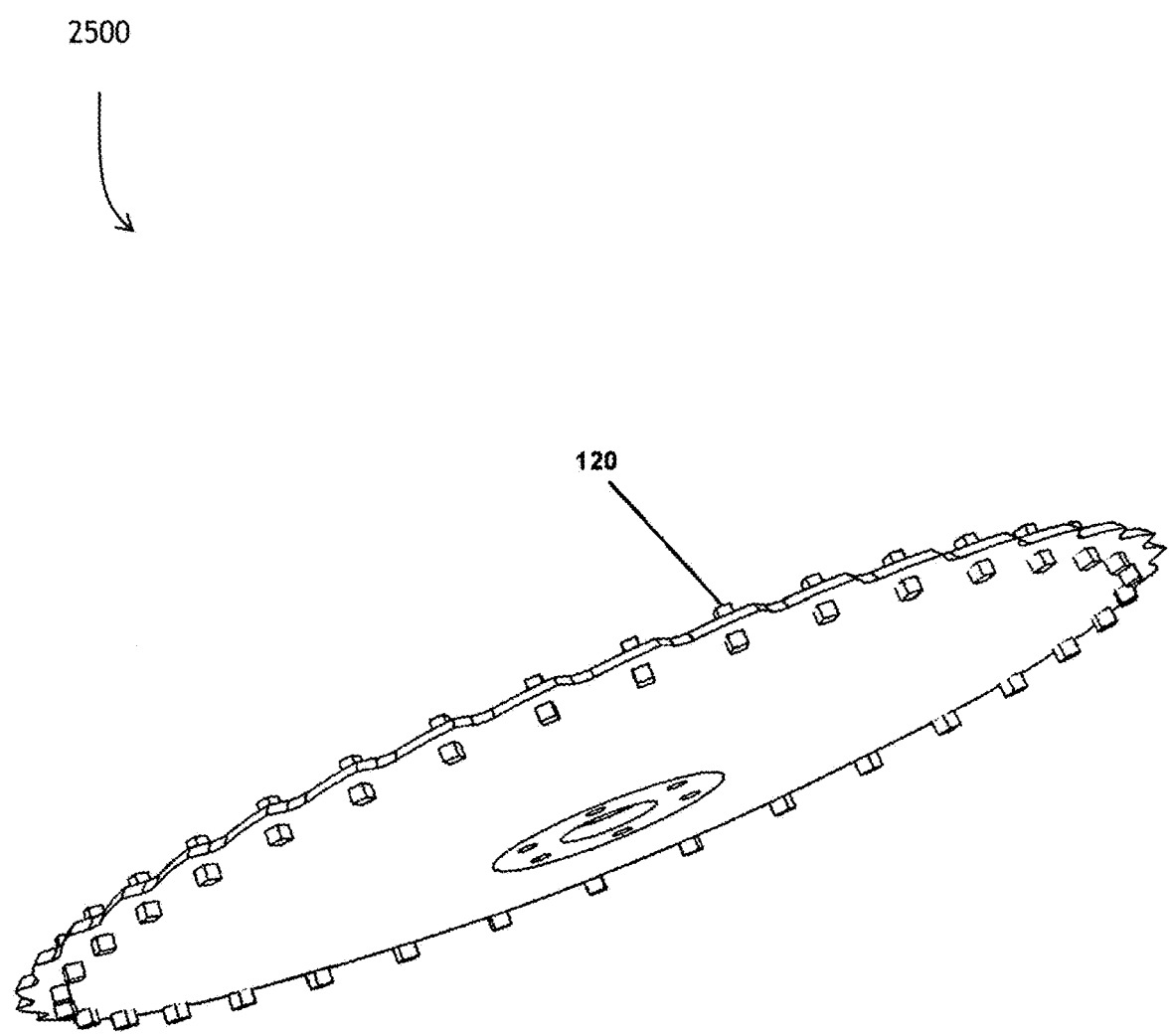
FIG. 25 is a detailed diagram of exemplary insert location and size in accordance with an embodiment of the present invention.
Figure 26:
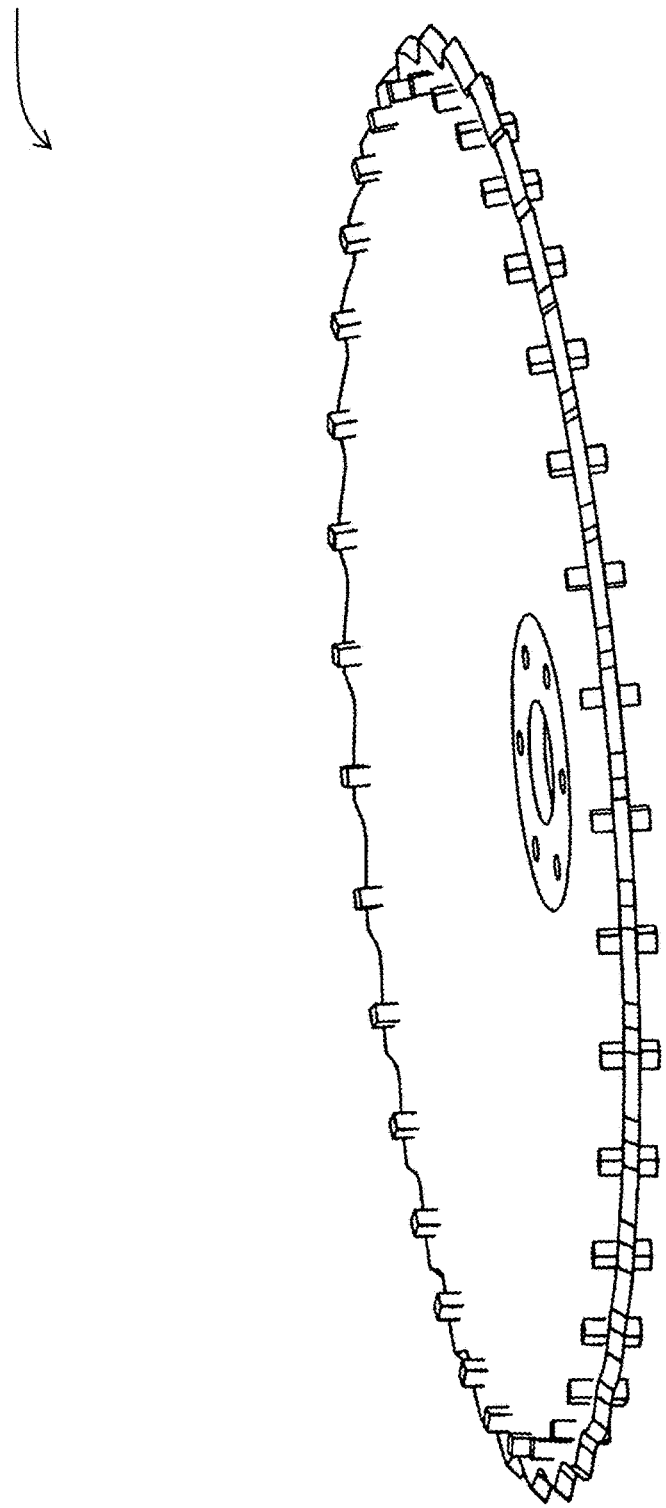
FIG. 26 is a detailed diagram of exemplary insert location and size in accordance with an embodiment of the present invention.
Figure 27:
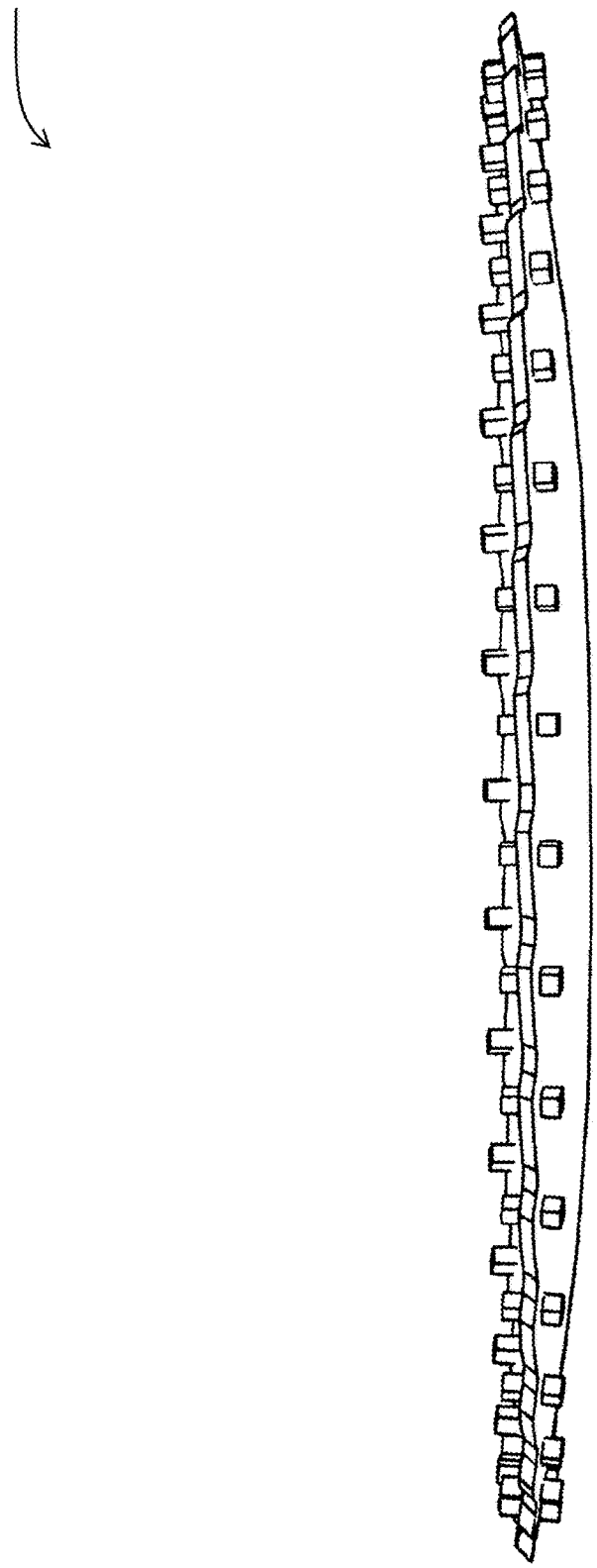
FIG. 27 is a detailed diagram of exemplary insert location and size in accordance with an embodiment of the present invention.

Referring to FIG. 22, drive openings 152 may enable a plurality of applications including detachably mounting to an existing implement. For example, one embodiment of the present invention may replace a pair of disc elements operating on a planter implement to open a planting trench. Embodiments herein may be specifically sized to replace elements currently used in operation.

Tooth Number

Referring to FIG. 1, the number of teeth 110 is sufficient to ensure a cutting edge 136 may impact the soil without leaving surface stubble untouched. More specifically, each tooth begins cutting where the previous tooth enters the soil.

Referring to FIG. 1, the tooth back 134 may be specifically shaped to pull the coulter blade 140 into the soil and maintain the rotation of the coulter blade 140. Much like a water wheel, each individual tooth back 134 provides the drive for the coulter blade 140 to rotate and minimize coulter blade 140 slippage. For example, a flat tooth back 134 may enable the desired drive force to cut the stubble and the soil while a flared or tooth back of increased surface area may enable a greater drive force if required.

In embodiments, the angle of tooth cutting surface may be altered for specific types of soil. For example, in heavy residue soil, the cutting edge 136 of each tooth may be lengthened to enable a pushing action as the cutting edge 136 of the tooth impacts the soil. In embodiments, a longer tooth may efficiently cut GMO stubble more effectively than a shorter tooth. A tooth measuring approximately three inches in length may allow for an efficient cut.

Figure 6:
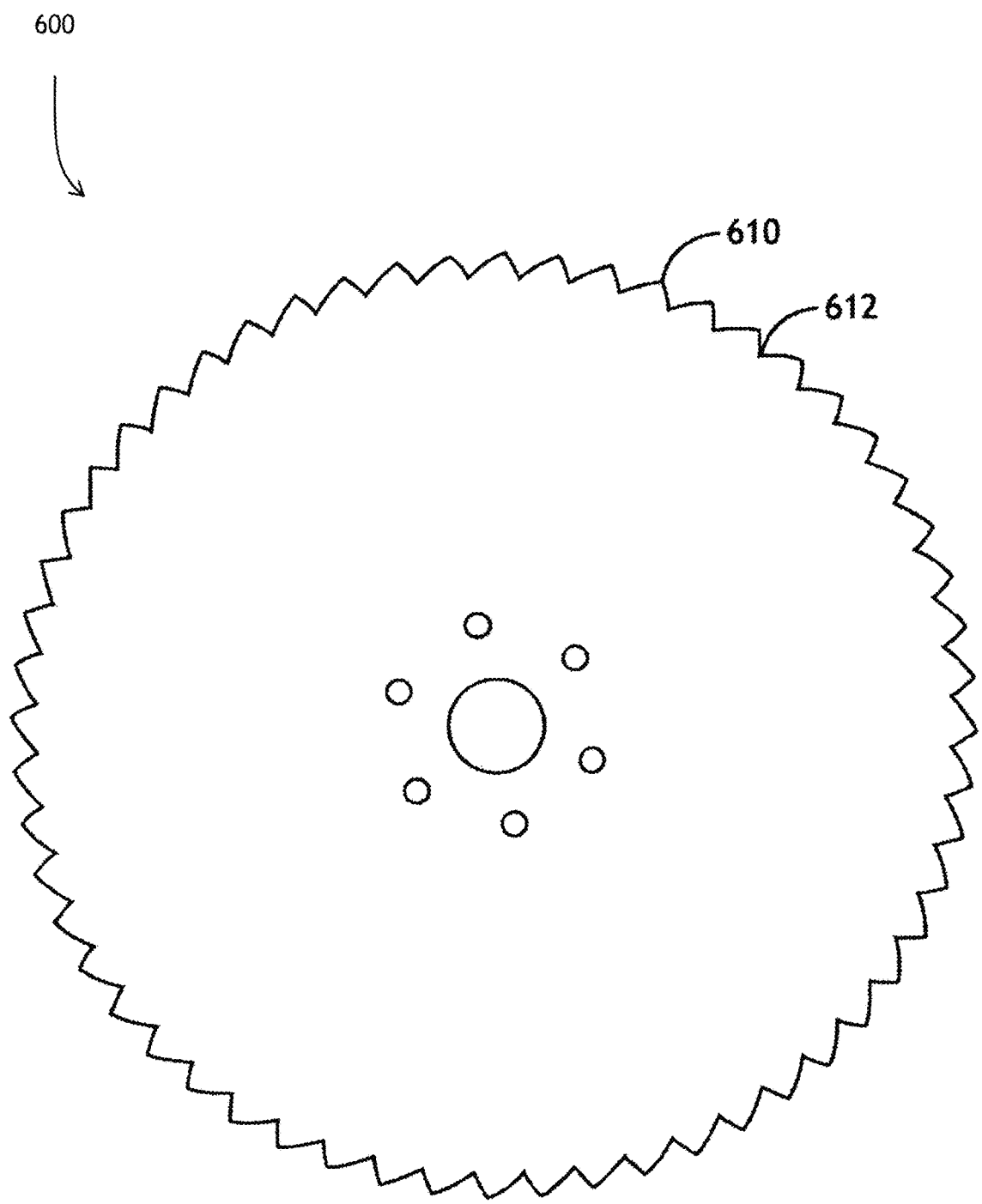
FIG. 6 is a diagram of a 56 tooth embodiment showing a sharp gullet exemplary of an embodiment of the present invention.

Referring to FIG. 6, a diagram of a 56 tooth embodiment showing a sharp gullet exemplary of an embodiment of the present invention is shown. In embodiments, a shorter tooth length with increased tooth numbers may enable an operator to achieve the desired tillage effect. For example, a short tooth 610 with a sharpened tooth gullet 612 may enable an accurate cut of a smaller gauge stubble such as oat stubble or wheat stubble.

Figure 7:
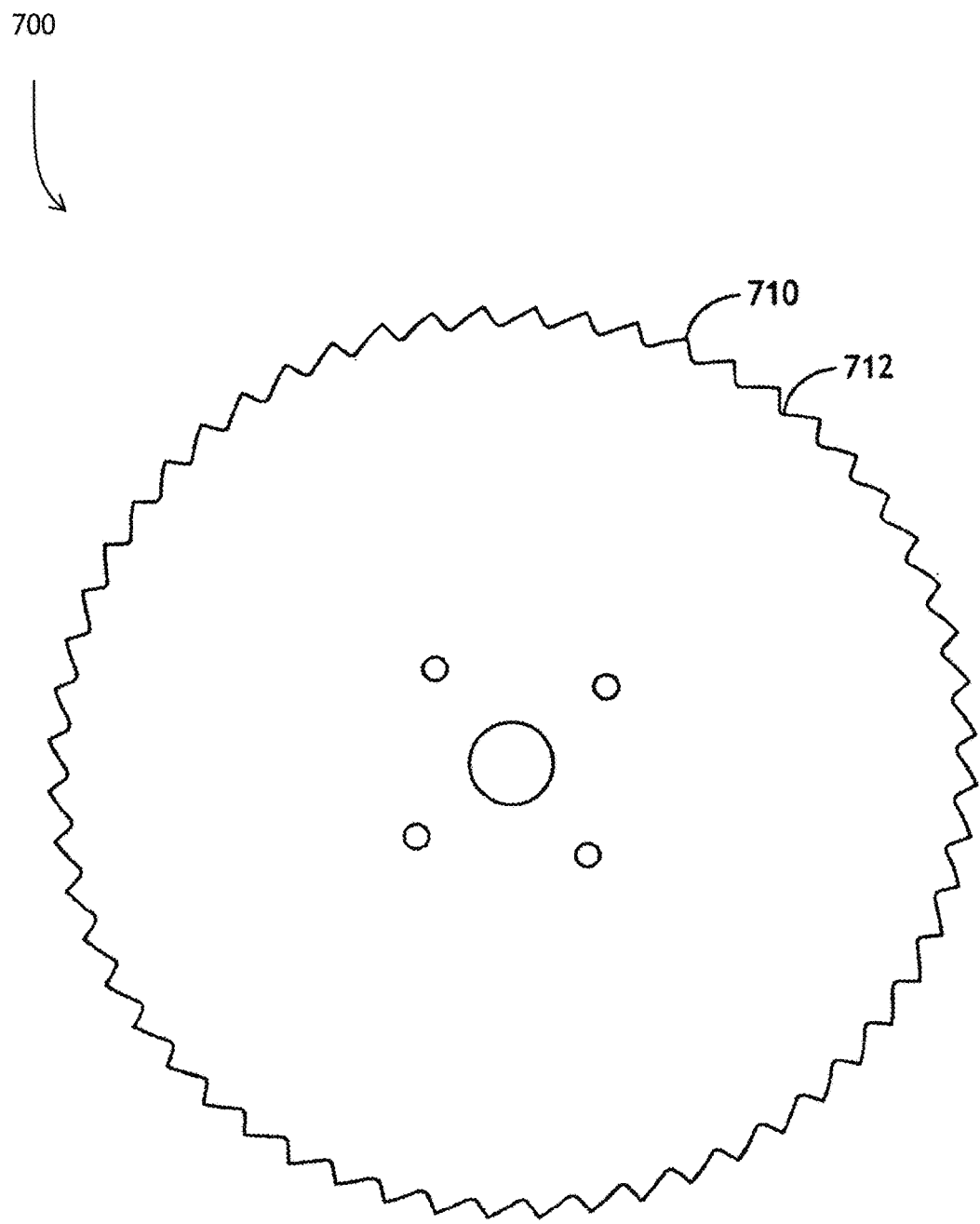
FIG. 7 is a diagram of a 56 tooth embodiment showing a rounded gullet exemplary of an embodiment of the present invention.

Referring to FIG. 7, a diagram of a 56 tooth embodiment showing a rounded gullet exemplary of an embodiment of the present invention is shown. In addition, a shorter tooth 710 with a rounded tooth gullet 712 may enable a sharpened tooth gullet 712 for increased cutting edge 136 surface area.

Figure 8:
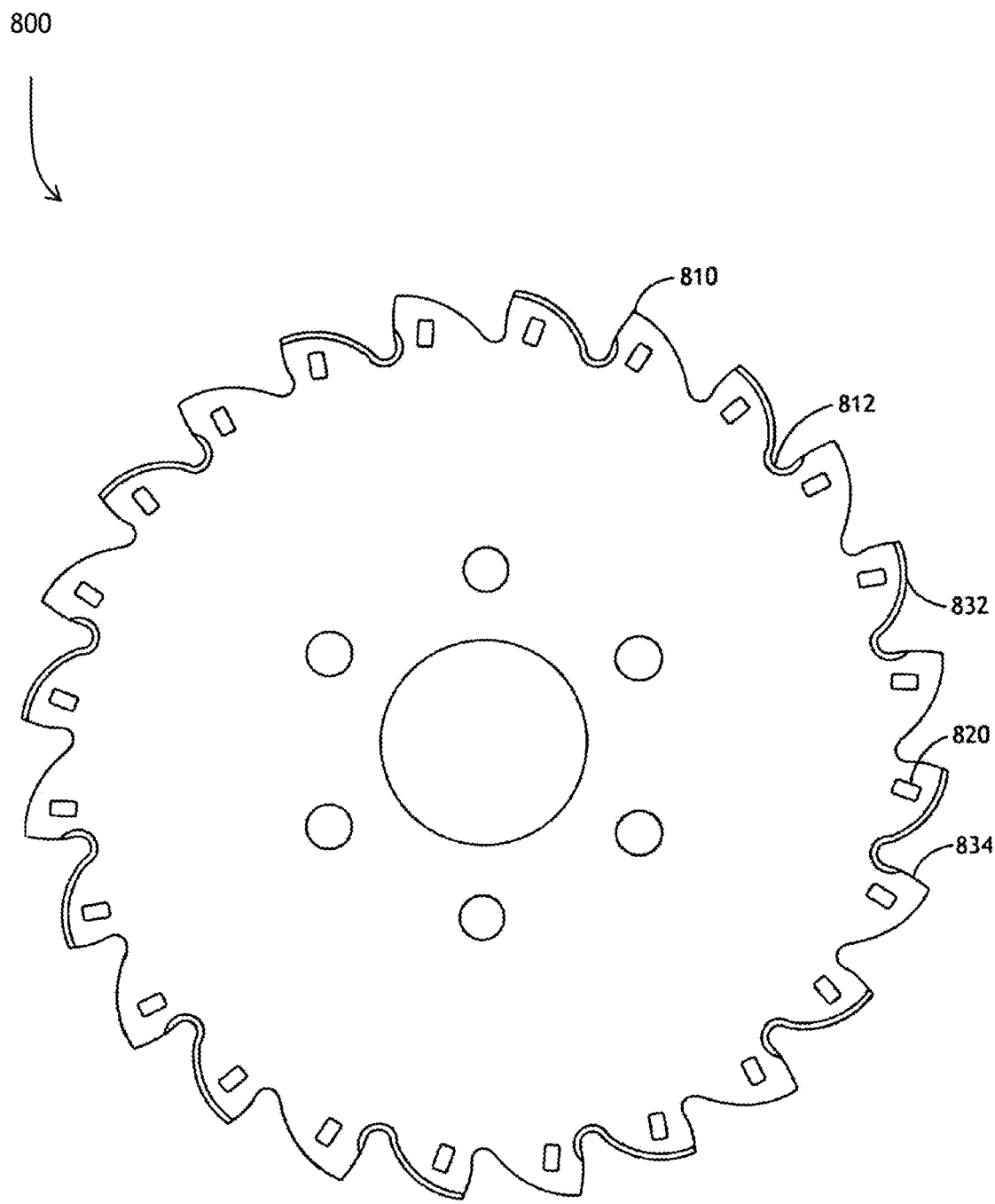
FIG. 8 is a diagram of an exemplary 24 tooth coulter blade with associated inserts in accordance with an embodiment of the present invention.

Referring to FIG. 8, a diagram of an exemplary 24 tooth coulter blade with associated inserts in accordance with an embodiment of the present invention is shown. In embodiments, the sabre tooth cutting edge 136 of each tooth 810 may remain unsharpened for optimal performance in specific types of soil. Alternatively, a coulter blade 140 designed for minimum till in heavy soil may be configured with teeth 810 optimally shaped for desired tillage and aeration. Additionally, a system 800 designed for low Cation-Exchange Capacity (CEC) soil and medium tillage may be optimally configured with teeth 810 shaped for the desired tillage. Additionally, a coulter blade 140 designed for full till/void creation for fertilizer injection may possess tooth 810 qualities and insert 820 size for optimal performance.

Blade Rotation as to the linear distance traveled: The STI series blade rotates up to 96% of linear distance traveled at hub depth or shallow depth. The STI series blade is driven by tooth 810 geometry and inserts 820. The backside of the tooth, shown as a vertical blunt edge at 834, tooth fillet or gullet 812, and the opposing tooth bevel pattern, acts to alternate soil contact pressures utilizing a forward driving force. This configuration and resultant forward driving force also keep the blade in a straight linear motion rather than a side driven motion which would disadvantageously cause massive contact and friction. The configuration of the subject blade also acts to lessen sidewall compaction or pressure, thereby lessening blade friction and allowing easier rotation. See FIG. 1, 130-132-134. Bevel tooth angle or multiple tooth fillets and or seriation also may be provided.

As well, a plurality of inserts may be installed in the blade, applied or multiple stamped protrusions to yield inserts 820. These unique novel structural features of the subject STI series blade result in the least amount of contact—least amount of time, so that the subject blade predominately only has soil contact on the outer circumference, thereby lessening friction by soil contact.

In embodiments, a cutting edge 136 of a sharpened tooth may possess a concave cutting surface as each tooth is sharpened. In embodiments, a tooth 810 as well as the tooth gullet 812 may be sharpened in an optimal configuration for the anticipated type of stubble. Additionally, the cutting surface of each may be optimally shaped in a sabre or curved shape 832 creating a friction cut as opposed to a pressure cut.

In FIG. 8, travel of the coulter blade 140 may be from left to right where the curved sabre side 832 of each tooth 810 is able to cut surface stubble at an optimum angle as the system 800 is operated at the optimum depth.

A curved cutting edge 832 on each tooth may allow efficient cut of GMO refuge stubble material. Preferably, each tooth 810 is sized to maintain a cutting surface proximal to the cutting surface of the adjacent tooth. For example, a first tooth may cut a two-inch surface of the soil while the adjacent tooth will cut the next two inches of soil with no gap in cut surface of the soil. Each tooth back 834 may be specifically shaped and adjusted to help pull the coulter blade 140 into the soil and drive the rotation of the coulter blade 140 and minimize coulter blade slippage.

Figure 9:
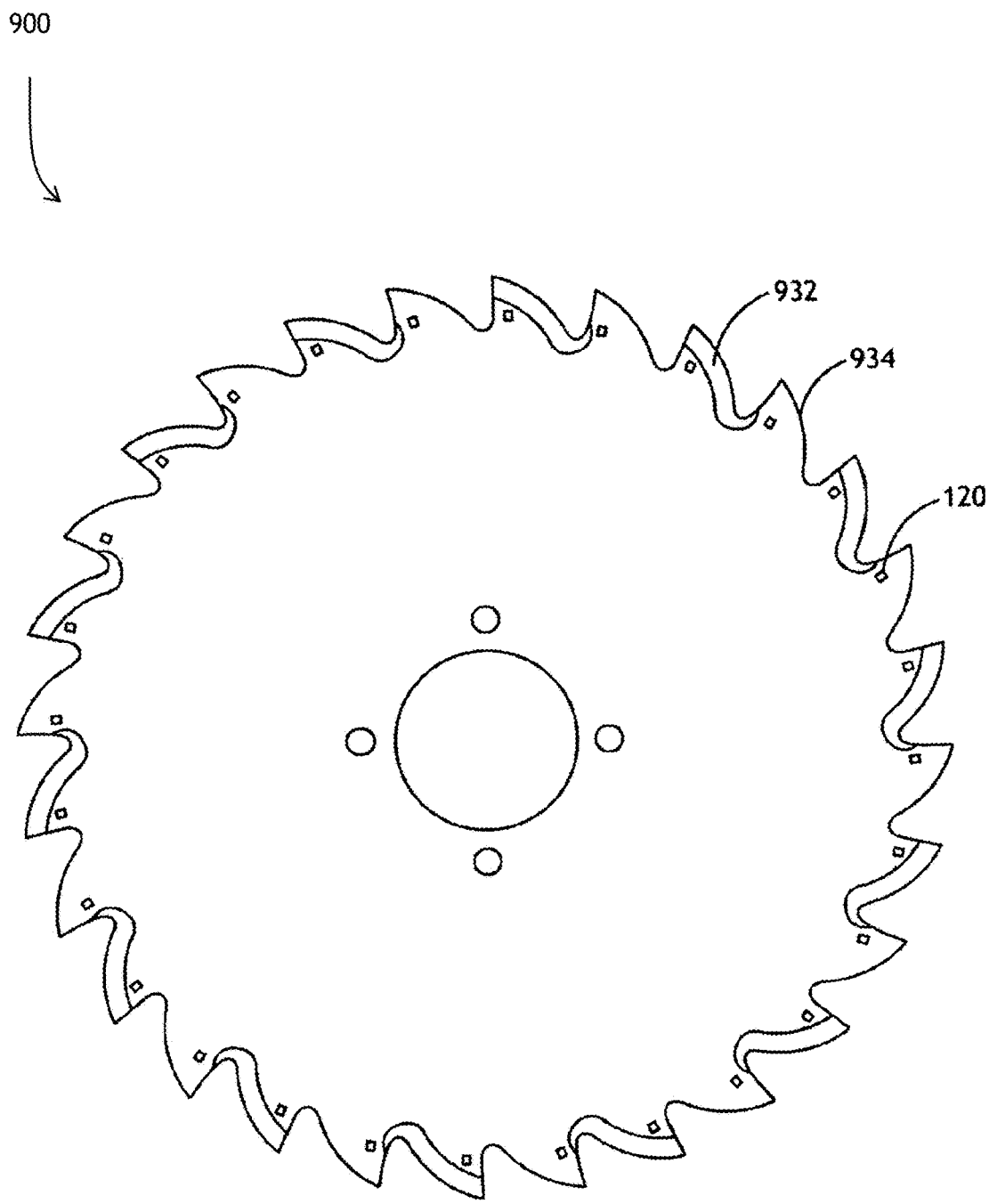
FIG. 9 is a diagram of a blade with associated 28 teeth and 28 inserts in accordance with an embodiment of the present invention.

Referring to FIG. 9, a diagram of a blade with associated 28 teeth and 28 inserts in accordance with an embodiment of the present invention is shown. Preferably, adjacent teeth are sharpened on alternating sides 932, 934 to eliminate sidewall force as the teeth interact with the soil. As each tooth enters and cuts the soil, skilled artisans will recognize the angle of sharpening will create a lateral force away from the sharpened surface. Embodiments of the present invention may offset this lateral force with and opposite lateral force of the adjacent tooth.

Figure 10:
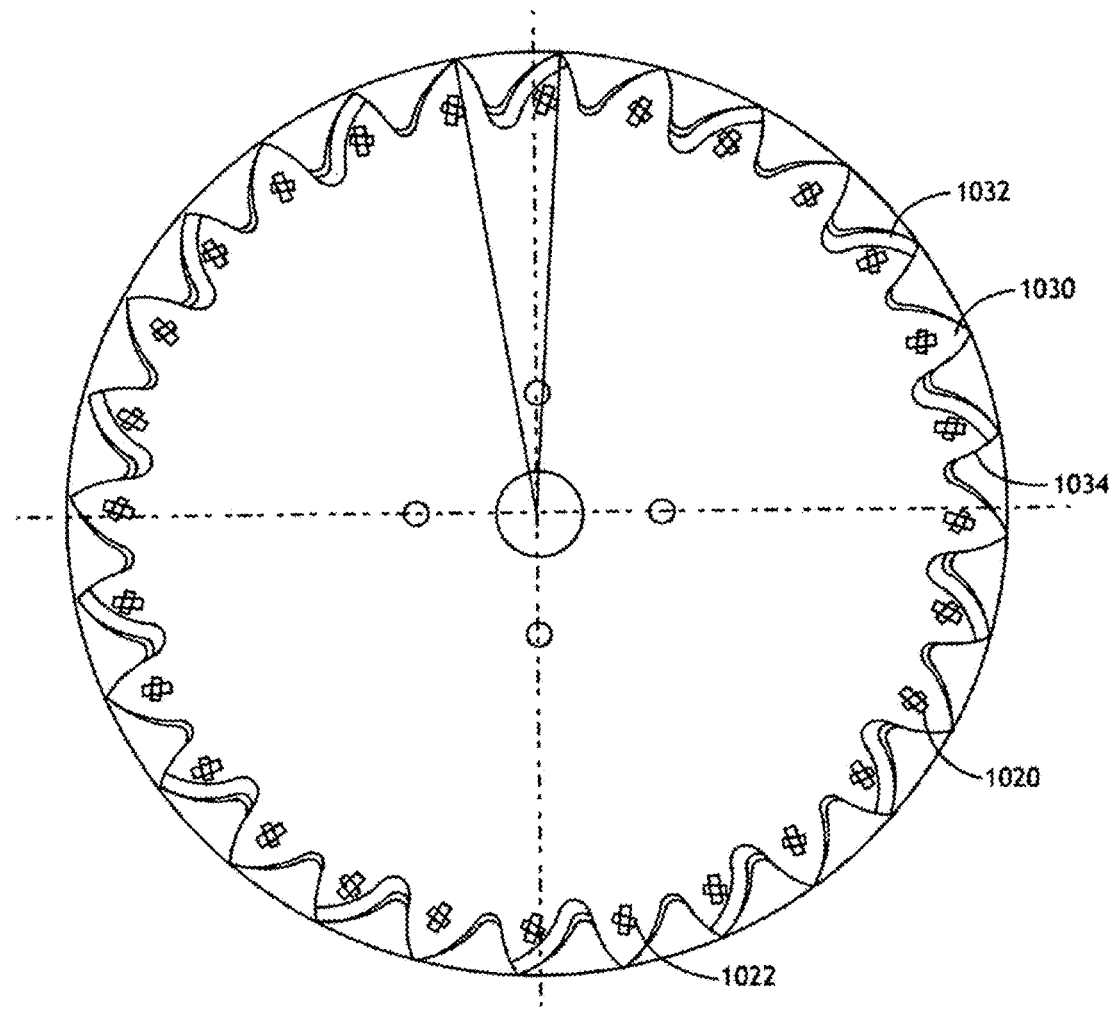
FIG. 10 is a diagram of a blade with associated 28 teeth and 28 angled inserts in accordance with an embodiment of the present invention.

Referring to FIG. 10, a diagram of a blade with associated 28 teeth and 28 angled inserts in accordance with an embodiment of the present invention is shown. Teeth 1030 are shown having specifically designed angled inserts 1020, 1022. Insert angle may be specifically designed for the type of soil and for a desired angle of insert soil penetration. For example, as system 1000 moves from right to left and tooth back 1034 pulls the coulter blade 140 through the soil, insert 1022 may penetrate the soil at nearly a 90-degree angle and exit the soil at approximately 30-degree angle relative to the soil surface. Should system be fitted with insert 1020, insert 1020 may penetrate the soil at approximately a 30-degree angle but exit the soil at a 45-degree angle. This variable angle may increase the desired subsoil removed to the surface as well as increase the fracturing effect of the inserts as they interact with the soil.

Figure 11:
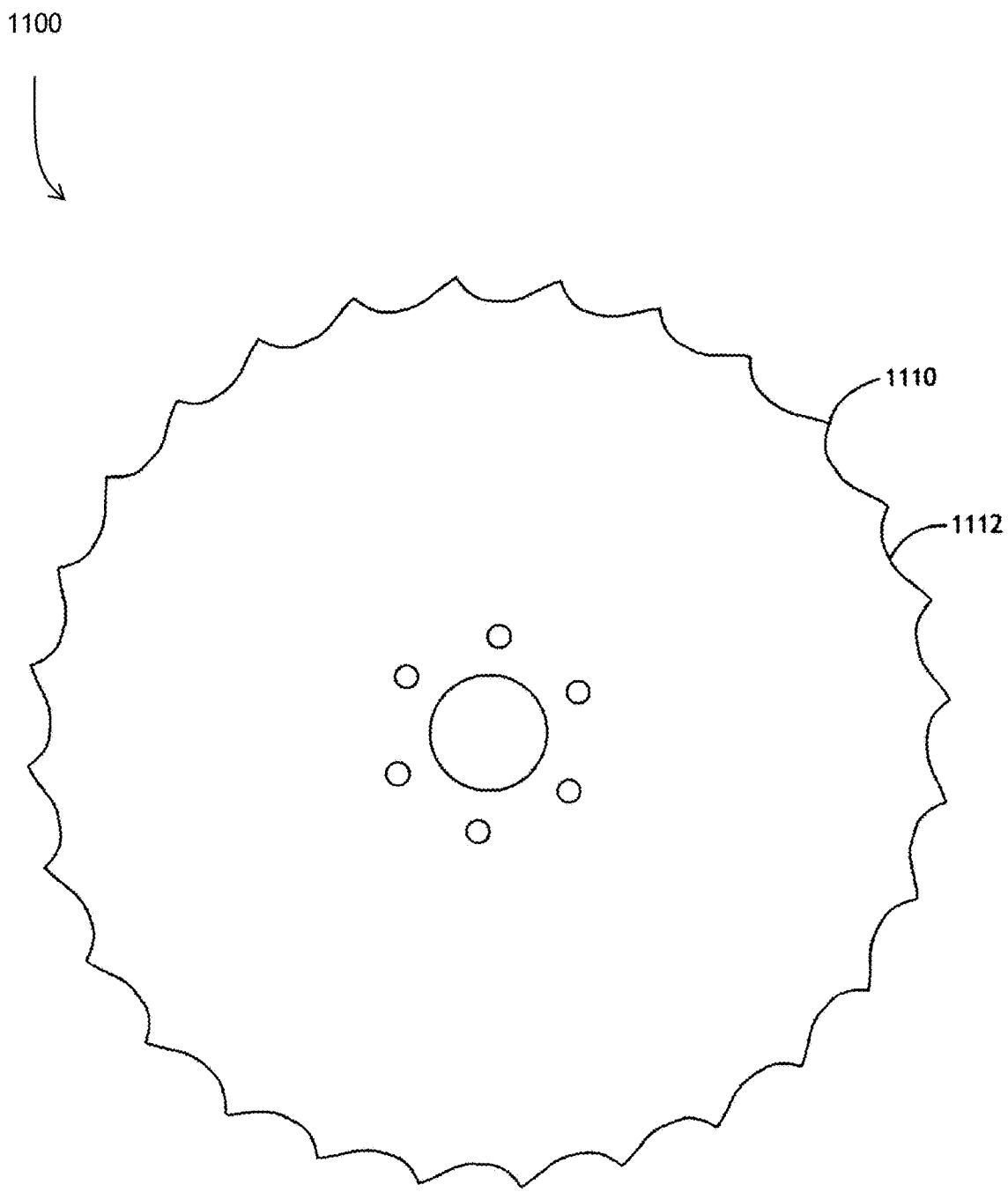
FIG. 11 is a diagram of an exemplary coulter blade with associated 28 teeth of shorter gullet depth in accordance with an embodiment of the present invention.

Referring to FIG. 11, a diagram of an exemplary coulter blade with associated 28 teeth of shorter gullet depth in accordance with an embodiment of the present invention is shown. Shortened teeth 1110 and shallow tooth gullet 1112 may decrease possible tooth breakage as coulter blade 140 may interact with soil of hardened or rocky nature. Smaller, shorter backside teeth can be used for shallow depth applications.

Figure 12:
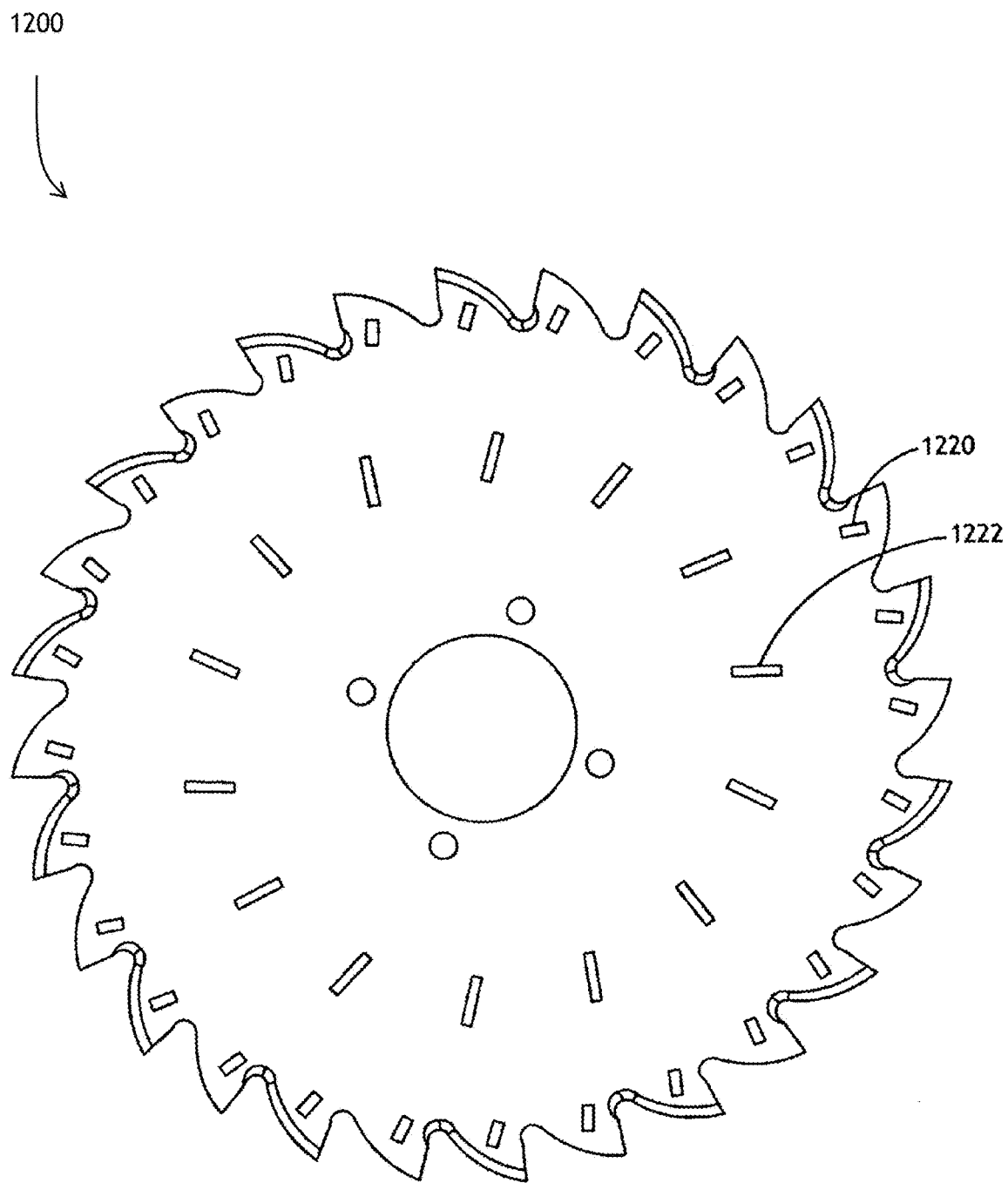
FIG. 12 is a diagram of an exemplary coulter blade with 28 teeth and associated outer and inner inserts in accordance with an embodiment of the present invention.

Referring to FIG. 12, a diagram of an exemplary coulter blade with 28 teeth and associated outer and inner inserts in accordance with an embodiment of the present invention is shown.

Insert Location

Referring to FIGS. 12 and 39, it is further contemplated herein; variable insert 1220 location may offer desired tillage and aeration qualities capable of the variable tooth coulter blade 140. An insert 1220 positioned distally from the hub of the coulter blade 140 may provide a greater tillage effect for creating a void capable of receiving an additional element, for example, a planting device placing seeds into the void and a fertilizing device filling the void with a fertilizer. An additional plurality of inserts 1222 may be located at a second radius from the blade hub 150 to allow an operator more flexibility in soil aeration. For example, an inner circle of inserts 1222 may allow for surface soil aeration, mulching and tillage while the outer row of inserts 1220 may allow for subsoil aeration. It is contemplated herein; multiple circles of inserts may function within the scope of the present invention, each circle providing separate function at the desired depth of operation.

For example, at an exemplary depth where proximal inserts 1222 are embedded in the soil, both the proximal insert 1222 and the distal insert 1220 are interacting with the soil. However, if an operator were to reduce the depth, the entirety of the distal insert 1220 impacts the soil while only a portion of the proximal insert 1222 impacts the soil.

Referring to FIG. 13a-13E, diagrams of exemplary coulter blades with variable tooth number, tooth size, insert number and size, and gullet depth in accordance with embodiments of the present invention are shown. Inserts 120 may be of variable size and shape. Further, inserts 120 may be placed at a plurality of locations within the coulter blade 140 to optimally impact the type of soil anticipated.

It is contemplated a plurality of designs of coulter blades 140 having a variety of number of teeth and inserts 120 may be incorporated within the scope of the present invention. Without limitation, each embodiment shown in FIGS. 13A, 13B, 13C, 13D, and 13E may be one example of many contemplated herein. FIG. 13A shows an exemplary 16 tooth design, each tooth having an optimum tooth cutting edge to cover the circumference of the coulter blade 140. FIG. 13B shows a 20 tooth design with additional surface area available for cutting. FIG. 13C shows a 24 tooth design with 24 inserts 120 capable of impacting a greater quantity of soil. FIG. 13D shows a 28 tooth design with as many inserts 120. FIG. 13E shows a 32 tooth and insert 120 design of the present invention. Alternatively, in FIG. 13E, inserts 120 may be exemplarily placed at every other tooth allowing for 32 teeth and 16 inserts 120.

Skilled artisans will realize with more teeth may come additional surface area for cutting various sizes of stubble. However, more teeth also may contribute to tooth breakage leading to a balance between tooth number and the type of soil anticipated by the operator.

Insert Angle

Figure 14:
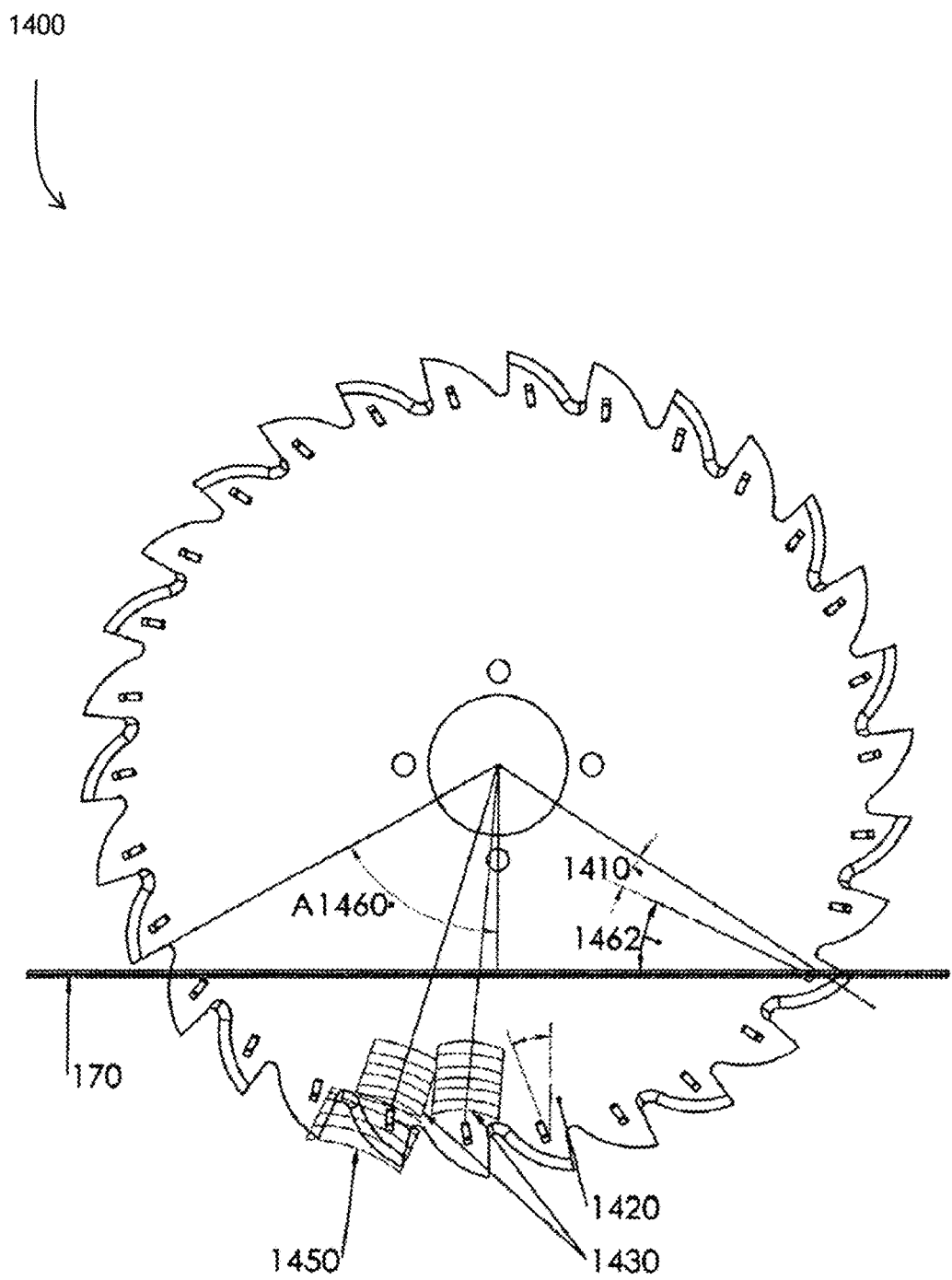
FIG. 14 is a diagram of an exemplary 32 tooth embodiment indicating insert rotational motion as the insert traverses the soil in accordance with an embodiment of the present invention.

Referring to FIG. 14, a diagram of an exemplary 32 tooth embodiment indicating insert rotational motion as the insert traverses the soil in accordance with an embodiment of the present invention is shown. The angle b 1462 of insert 120 placement may also be manipulated for optimal performance. As exemplarily indicated, inserts 120 are positioned at angle b 1462 approximately 30 degrees from the surface. As the coulter blade 140 moves from right to left here, inserts 120 may vertically transverse into the soil to the maximum depth vertically beneath the blade hub 150. As the coulter blade 140 moves left, the insert 120 decreases in depth and exits the soil. During this down then up translation, insert 120 is also undergoing rotation about the blade hub 150 equal to double the angle of impact at 1430. With a 30-degree penetration angle and a 120-degree exit angle, the soil touched by insert 120 is impacted and fractured based on the rotation.

With an alteration of the angle of the insert 120, the operation of the insert 120 in contact with the soil is altered. For example, an insert 120 angled to penetrate the soil at a 90-degree angle of penetration may aerate differently than an insert 120 placed to enter the soil at a 45-degree angle of penetration. A slight change in insert angle b 1462 may greatly influence the amount of soil brought to the surface after coulter blade 140 interaction. In embodiments, an insert 120 may penetrate the surface of the soil at a relatively flat 0 degrees from horizontal and exit the surface of the soil after approximately 135 degrees of rotation.

For example, an operator with a CEC of 20 may have a large amount of surface stubble where the operator desires more dark soil on the surface located in a northern climate. In this case, the angle b 1462 of the insert 120 may be optimally positioned for greater soil movement to the surface. For example, an insert 120 with an impact angle b 1462 of 30 degrees may enter the soil 170 at 30 degrees and rotate to 120 degrees before fully exiting the soil. This rotation of the insert 120 as well as the change in depth (from zero to the desired depth (here an exemplary four inches)) of the insert.

It may or may not be necessary to alter the size and shape of the insert 120 as the angle change of the insert 120 may be sufficient to transfer the desired amount of soil to the surface. For example, a curved insert may be able to act in a shoveling manner to enter the soil at 90 degrees and exit the soil at a nearly level orientation to maximize the soil brought to the surface.

In another embodiment, the operator in heavy gumbo with tight soil may desire simply more tillage. In this case, the insert 120 may be widened to create more surface area for the insert 120 to interact with the soil.

It is contemplated herein, a prescription insert 120 designed for a specific type of soil may enable an operator the flexibility to attain the desired till and aeration. A first operator tilling a first specific type of soil may desire a first size, shape, and angle of insert 120 while a second operator tilling a second specific type of soil may desire a second size, shape, and angle of insert 120.

Referring to FIG. 15A-15D, diagrams of insert effect on the soil at various blade depths in accordance with embodiments of the present invention are shown. The angle of soil 170 entry of each tooth 110 and insert 120 may be altered by the soil depth at which the coulter blade 140 is operated. For example, at an exemplary depth of 3.25 inches in FIG. 15A, an insert 120 may enter the soil at an angle of approximately 45 degrees from horizontal and exit the soil after approximately 90 degrees of travel. Conversely, at a greater depth as shown in FIG. 15B, an insert 120 may impact the soil at approximately 40 degrees from horizontal and exit the soil after 110 degrees of rotation. Similarly, for FIG. 15C, insert 120 enters the soil at 20 degrees and exits after 120 degrees of rotation. Similarly, for FIG. 15D, insert 120 enters the soil at 0 degrees and exits after 135 degrees of rotation. This difference may allow an operator to accurately determine an amount of soil to impact, aerate, and bring to the surface.

Referring to FIG. 16A-16D, diagrams of sidewall pressure the insert effect on the soil at various blade depths in accordance with embodiments of the present invention are shown. An additional goal of the invention may include a coulter blade 140 able to cut and aerate the soil with minimal lateral pressure on the soil as the coulter blade 140 interacts with the soil. This undesirable lateral pressure or sidewall push (a lateral force on the soil as the blade interacts) may cause a smearing or troweling action as a result of blade soil interaction creating a compacted soil barrier impenetrable by a future root system. Each tooth on the variable tooth coulter blade 140 may be sharpened only on one side, while the adjacent tooth is sharpened on the opposite side. This alternate sharpening may eliminate overall coulter blade 140 sidewall push by opposite and counteracting lateral pressure of each tooth as the tooth interacts with the soil.

An additional goal of the present invention may include a minimum amount of friction along the sidewall of the coulter blade 140. Any amount of friction along the sidewall of the coulter blade 140 causes an increase amount of force required to pull the coulter blade 140 through the soil. As an object enters the soil, the surrounding soil tends to grip or hold on to the object. Soils with a higher CEC have a greater ability to grasp the object. As the coulter blade 140 depth increased, area 1602 may be the only sidewall interacting with the soil. As depth in increased, areas 1604 and 1606 become engaged with the soil thus increasing the need for sidewall pressure reduction. Embodiments of the present invention create a contact area limited to the portion of the coulter blade 140 more distal from the hub where the sidewall of the coulter blade 140 closer to the hub remains free from soil contact.

Alternatively, a coulter blade 140 of the present invention may be shaped in a concave design to enable side movement of soil as well as cutting of stubble, mulching and tillage on the surface. For example, a plurality of concave coulter blade 140s may act to cut the stubble on the surface of the field as well as slightly move the soil laterally after soil aeration.

Further, it is contemplated embodiments of the present invention may include a coulter blade 140 for interacting with the side walls of a trench to back fill the void above the trench contents. For example, a trench dug for tile requires backfill after the tile/cable has been laid. Embodiments of the present invention interact with the soil on the sides of the trench as a closing wheel to fill the void above the tile. This backfill creates the archway above the tile preventing the tile from being crushed from additional weight.

Referring to FIGS. 17A and 17B, diagrams of exemplary inserts in accordance with an embodiment of the present invention are shown. An additional goal of the present invention may include aeration of the soil with which the variable tooth coulter blade 140 makes contact. Variable size, angle, and number of inserts 1720, 1722 aerate the soil with which the coulter blade 140 comes into contact. The inserts 120 dig as low as the operator desires and aerate the sub compacted soil sufficiently to aid in follow on root penetration. Securably mounted along lines 1730 of coulter blade insert opening alignment, the lateral extension of each insert 1720, 1722 may impact the soil.

As each insert 1720, 1722 interacts with the soil, the insert 1720, 1722 will also aerate soil adjacent to the soil directly touched by the insert 1720, 1722. This adjacent aeration effect allows for the operator to create the desired tillage by manipulation of the speed of the vehicle and depth of the coulter blade 140. The greater the speed of the vehicle, the greater the adjacent aeration effect. Preferably a minimum speed may be in the range of two to five miles per hour while a maximum speed may be in the range of eight to ten miles per hour. It is contemplated herein; speeds less than two or greater than ten miles per hour may also be optimal for coulter blades 140 described within the scope of the present invention.

Insert Width

The width of the insert 1720, 1722 may determine an amount of soil desired to be altered. For example, a wider insert 1720 extending laterally from the blade 140 may contact a greater amount of soil causing the greater amount of soil to be fractured and aerated. Conversely, a narrower insert 1722 may preclude insert breakage should the coulter blade 140 contact a rock.

Insert Size and Shape

The shape and size of the insert 1720, 1722 may determine the amount of aeration of the soil as well as resistance to breakage in certain types of soil. For example, in rocky soil, a more robust insert 1722 may resist breakage as a result of impact with a rock. For example, in heavy soil, an insert 1720, 1722 of square shape may optimally interact with the heavy soil. In light soil, an insert 120 of tapered or swept shape may allow for less contact with the soil while optimally aerating the soil.

Figure 18:
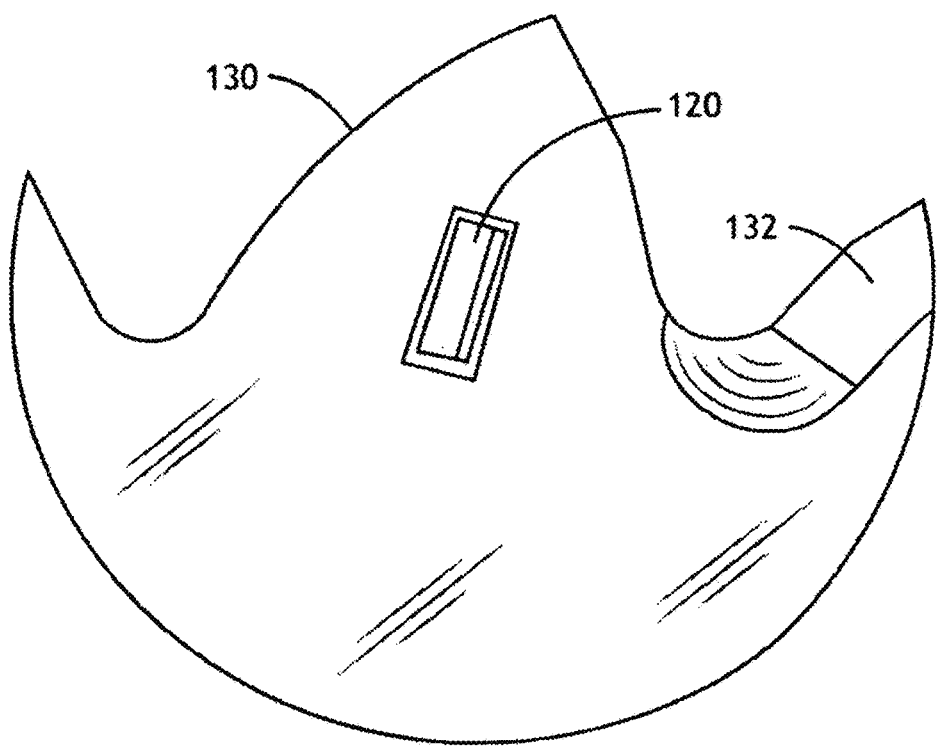
FIG. 18 is a detailed diagram of exemplary insert location and size in accordance with an embodiment of the present invention.

Referring to FIG. 18, a detailed diagram of exemplary insert location and size in accordance with an embodiment of the present invention is shown. The angle of the insert 120 may determine penetration as well as aeration of the soil. Insert 120 positioned near the blade circumference within tooth 130 may provide greater aeration than would an insert more proximal to the blade hub.

Figure 19B:
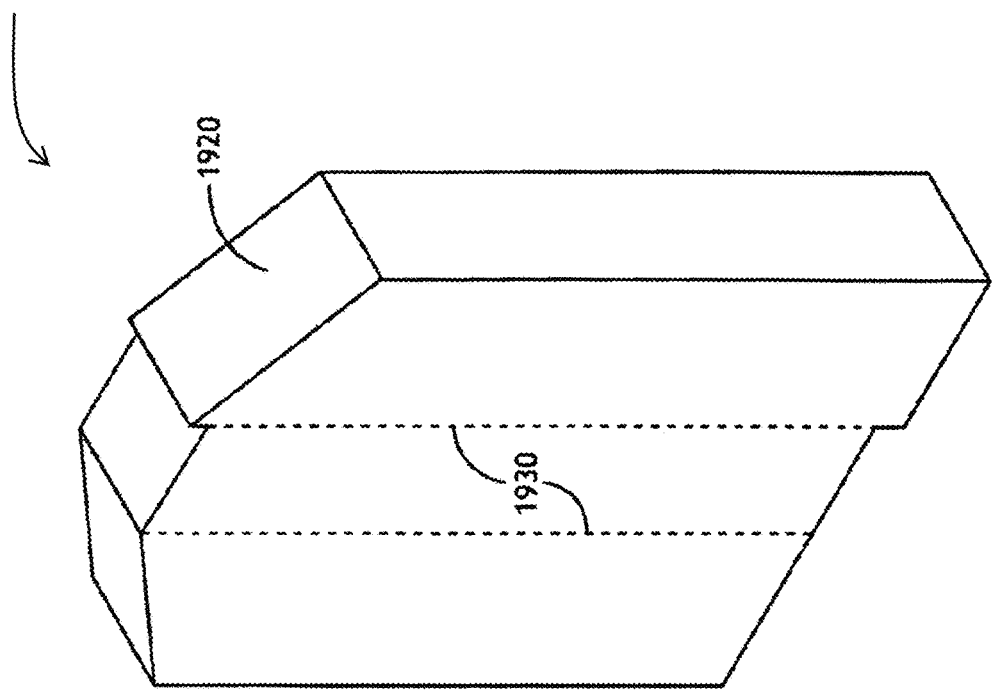
FIGS. 19A and 19B are diagrams of one insert exemplary of an embodiment of the present invention.
Figure 19A:
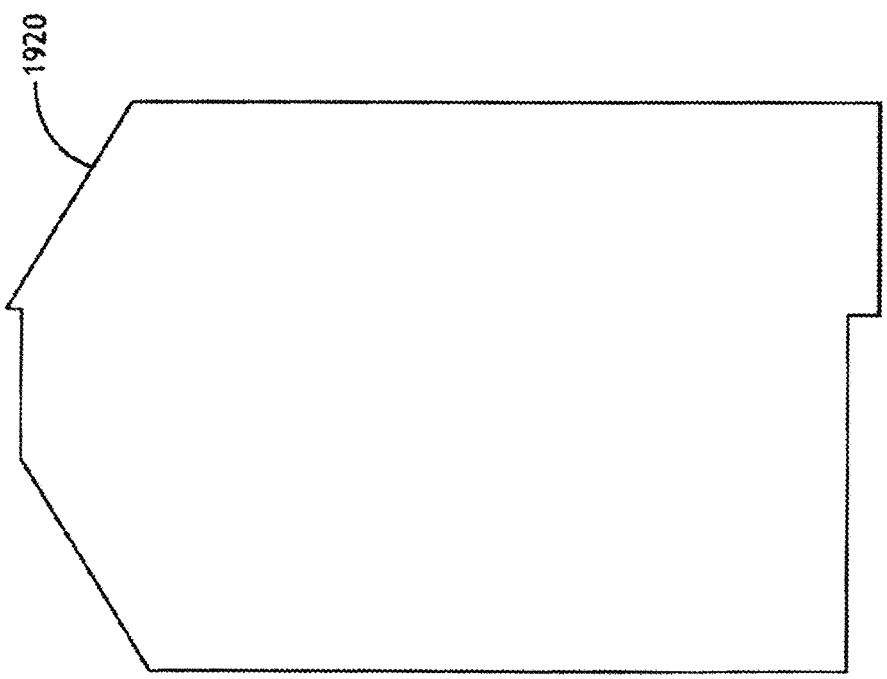

Referring to FIGS. 19A and 19B, diagrams of one insert exemplary of an embodiment of the present invention are shown. One embodiment of insert 1920 may include an insert mountable within coulter blade insert opening from one lateral side. Mounted along alignment lines 1930, insert 1920 may be more easily mounted with a weld required on one side. It is contemplated herein; equal surface areas on insert 1920 lateral extensions may enable equal forces on the insert 1920. For example, flanged side of insert 1920 may extend laterally a lesser amount than non-flanged side of insert 1920 to enable equal pressure on both lateral extensions.

Referring to FIGS. 20A and 20B, diagrams of one insert exemplary of an embodiment of the present invention are shown. An additional embodiment of insert 2020 may enable a greater amount of insert soil interaction.

Referring to FIG. 21, there is shown a flowchart for a method for altering surface stubble while simultaneously mulching, tilling and aerating the soil exemplary of an embodiment of the present invention. Method 2100 may begin at step 2102 with embedding a discoidal coulter blade within the soil, the discoidal coulter blade configured with a blade hub and a blade circumference, the discoidal coulter blade having a plane parallel to each diameter line of the discoidal coulter blade, the blade hub configured for detachably mounting the discoidal coulter blade to an implement. Method 2100 continues with step 2104 with translating the discoidal coulter blade through the soil at a depth via the implement and, at step 2106 with cutting the surface stubble and soil via a plurality of teeth configured proximal to and integral with the blade circumference, each one of the plurality of teeth having a cutting edge and a back edge, the back edge longitudinally opposite the cutting edge, the cutting edge and the back edge linear with the plane, the cutting edge configured to cut the surface stubble and the soil, the back edge configured for driving the discoidal coulter blade rotationally parallel to the plane as the soil acts on the back edge. Method 2100 may conclude with step 2108 with aerating the soil via a plurality of inserts sized to securably mount within a plurality of evenly spaced insert openings, the insert openings configured in a circular pattern at a first radius from the blade hub, the first radius being less than the blade circumference, each of the plurality of evenly spaced insert openings having an insert angle, the plurality of evenly spaced insert openings at the insert angle, each one of the plurality of inserts configured to securably mount within one of the plurality of evenly spaced insert openings, each one of the plurality of inserts sized to fill an associated one of the plurality of evenly spaced insert openings, each one of the plurality of inserts is configured to extend, from the discoidal coulter blade, a lateral distance normal to the plane, the plurality of inserts configured to alter the soil as a portion of the insert, which extends the lateral distance, rotationally and translationally interacts with the soil.

FIGS. 28A-I are diagrams of exemplary inserts in accordance with an embodiment of the present invention, particularly showing a bubble blade insert. Bubble blade 28140 exemplary of the present invention may include a single tooth cutting edge 28136. A plurality of inserts 28120 are shown interwebbed with one another, and function and operate as discussed hereinabove.

FIGS. 29A-I are diagrams of exemplary inserts in accordance with an embodiment of the present invention, particularly showing a notch blade insert. Notch blade 29140 exemplary of the present invention may include a plurality of teeth 29110 each having a tooth cutting edge 29136. Between each tooth 29110, a gullet 29112 may retain specific qualities for tooth effectiveness. A plurality of inserts 29120 are shown, which function and operate as discussed hereinabove.

FIGS. 30A-I are diagrams of exemplary inserts in accordance with an embodiment of the present invention, particularly showing a razor blade insert. Razor blade 30140 exemplary of the present invention may include a plurality of teeth 30110 each having a tooth cutting edge 30136. Between each tooth 30110, a gullet 30112 may retain specific qualities for tooth effectiveness. A plurality of inserts 30120 are shown, which function and operate as discussed hereinabove.

FIGS. 31A-I are diagrams of exemplary inserts in accordance with an embodiment of the present invention, particularly showing a ripple blade insert. Ripple blade 31140 exemplary of the present invention may include a plurality of teeth 31110 each having a tooth cutting edge 31136. Between each tooth 31110, a gullet 31112 may retain specific qualities for tooth effectiveness. A plurality of inserts 31120 are shown, which function and operate as discussed hereinabove.

FIGS. 32A-I are diagrams of exemplary inserts in accordance with an embodiment of the present invention, particularly showing a Sameri blade insert. Sameri blade insert 32140 exemplary of the present invention may include a plurality of teeth 32110 each having a tooth cutting edge 32136. Between each tooth 32110, a gullet 32112 may retain specific qualities for tooth effectiveness. A plurality of inserts 32120 are shown, which function and operate as discussed hereinabove.

FIGS. 33A-I are diagrams of exemplary inserts in accordance with an embodiment of the present invention, particularly showing a straight blade insert. Straight blade 33140 exemplary of the present invention may include a single tooth cutting edge 33136. A plurality of inserts 33120 are shown, which function and operate as discussed hereinabove.

FIGS. 34A-I are diagrams of exemplary inserts in accordance with an embodiment of the present invention, particularly showing a turbo blade insert. Turbo blade 34140 exemplary of the present invention may include a plurality of teeth 34110 with a gullet 34112 and a plurality of inserts 34120, which function and operate as discussed hereinabove.

FIGS. 35A-I are diagrams of exemplary inserts in accordance with an embodiment of the present invention, particularly showing a vortec blade insert. Blade 35140 exemplary of the present invention may include a plurality of teeth 35110 with a gullet 35112 and a plurality of inserts 35120, which function and operate as discussed hereinabove.

FIGS. 36A-I are diagrams of exemplary inserts in accordance with an embodiment of the present invention, particularly showing a wavy blade insert. Blade 36140 exemplary of the present invention may include a plurality of teeth 36110 with a gullet 36112 and a plurality of inserts 36120, which function and operate as discussed hereinabove.

FIGS. 37A-F are diagrams of exemplary fillets, True V Extended Fillet and True V Mate Taper, in accordance with an embodiment of the present invention.

FIGS. 38A-1 are diagrams of exemplary serrated cutting edges, serrate 1 (FIG. 38A-38C), serrate 2 (38D-38F), and serrate 3 (38G-38I), in accordance with an embodiment of the present invention.

FIGS. 39A-I are diagrams of exemplary inserts in accordance with an embodiment of the present invention, particularly showing multiple insert blade.

FIGS. 40A-F are diagrams of exemplary inserts in accordance with an embodiment of the present invention, particularly showing an STIC curved/concave insert blade.

Figure 41:
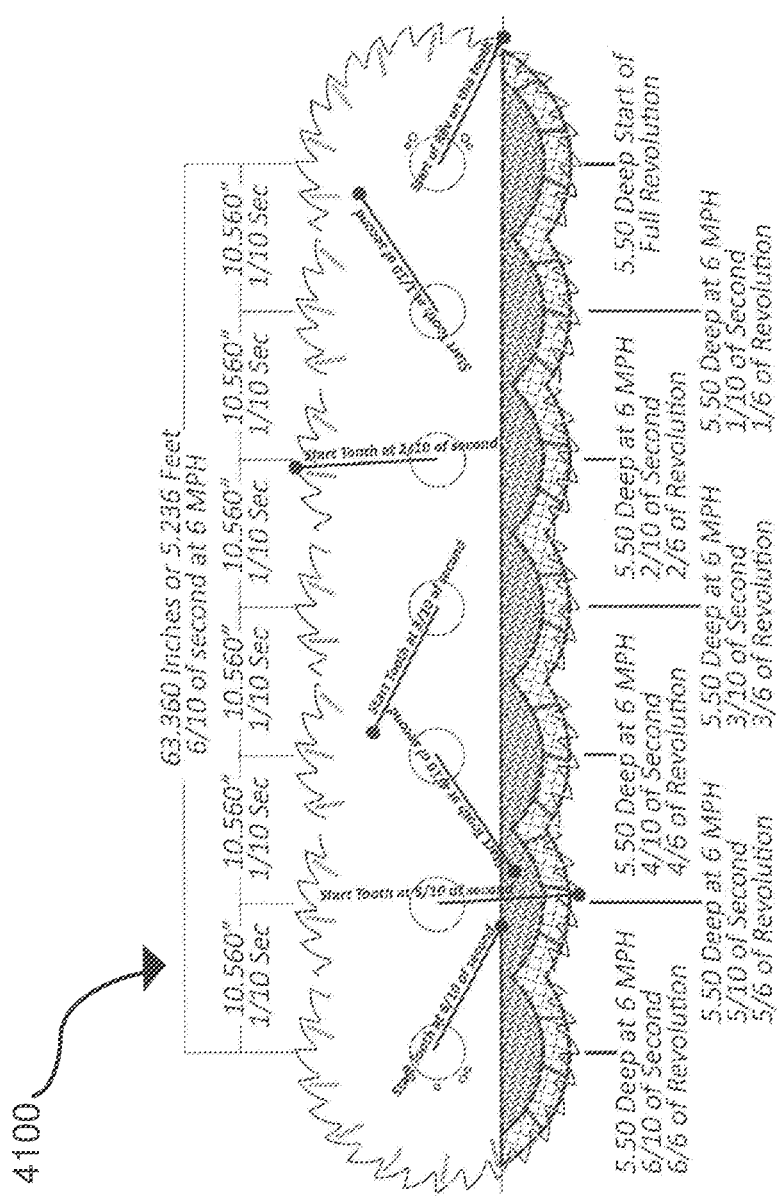
FIG. 41 is a diagram of an exemplary blade traveling at a speed of six miles per hour and associated snapshots every 1/10th second in accordance with an embodiment of the present invention.

FIG. 41 is a diagram of an exemplary blade traveling at a speed of six miles per hour and associated snapshots every ¹⁄₁₀th second in accordance with an embodiment of the present invention. An exemplary blade travels at a speed of six miles per hour and associated snapshots every ¹⁄₁₀th second in accordance with an embodiment of the present invention. Indicated rotation of the blade is preferably from right to left with the sabre shape of the blade impacting and cutting the stubble on the surface of the soil. As each insert enters the soil, the following insert enters and brings to the surface, the material fractured by the previous insert. The rotational action of the following insert thereby fractures and brings to the surface an amount of soil with which the preceding insert previously interacted. Additionally, soil proximal to the insert may also be fractured and brought to the surface due to energy transferred from the insert to the adjacent soil.

Figure 42:
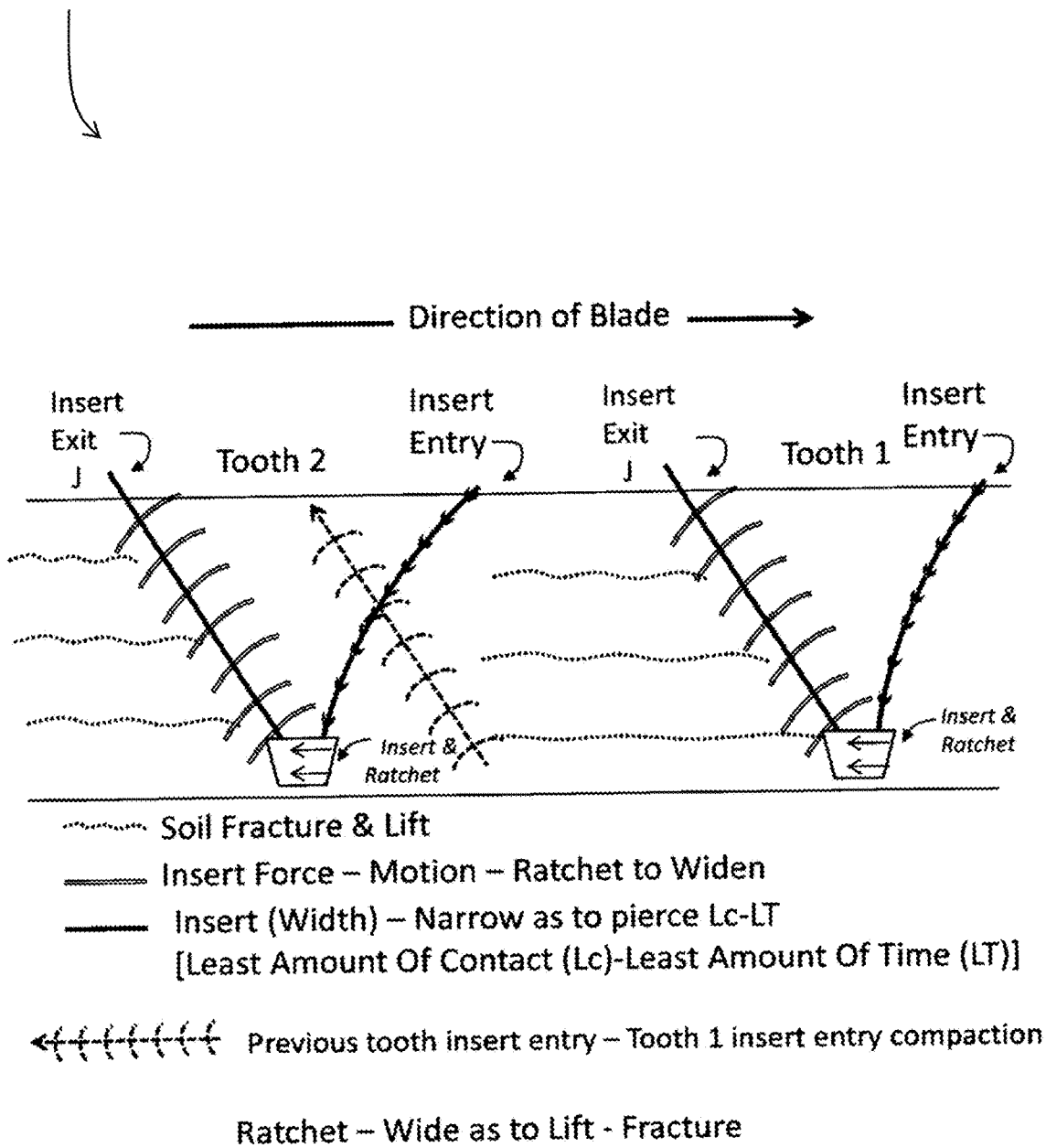
FIG. 42 is a diagram of an insert soil profile example in accordance with an embodiment of the present invention.

FIG. 42 is a diagram of an insert soil profile example in accordance with an embodiment of the present invention.

Figures 28A, 28B, 28C:
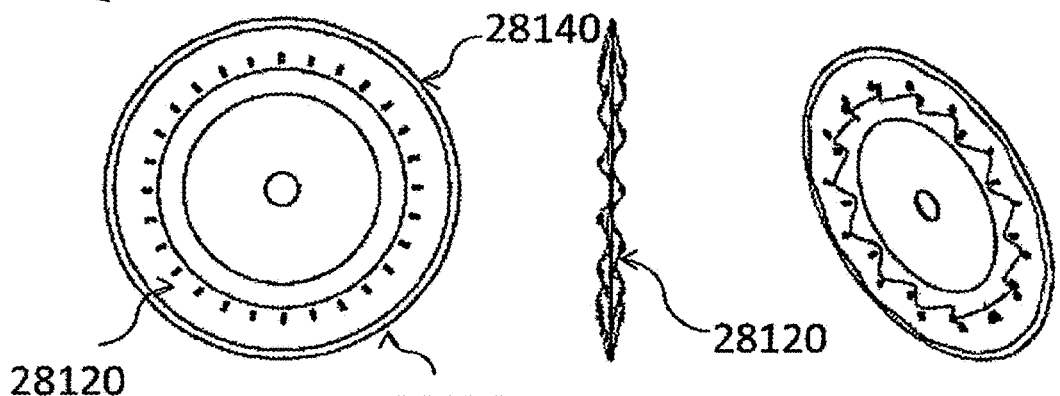
FIGS. 28A-I are diagrams of exemplary inserts in accordance with an embodiment of the present invention, particularly showing a bubble blade insert.
Figures 28D, 28E, 28F:
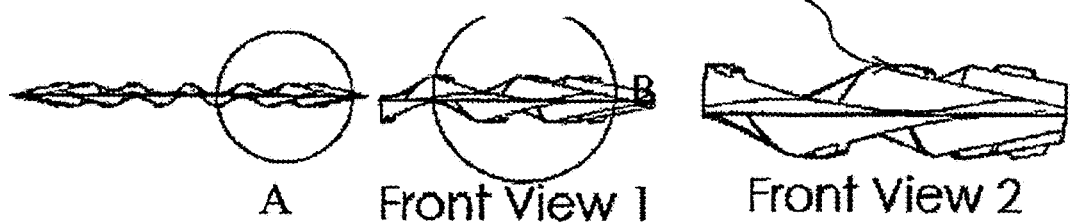
Figures 28G, 28H, 28I:
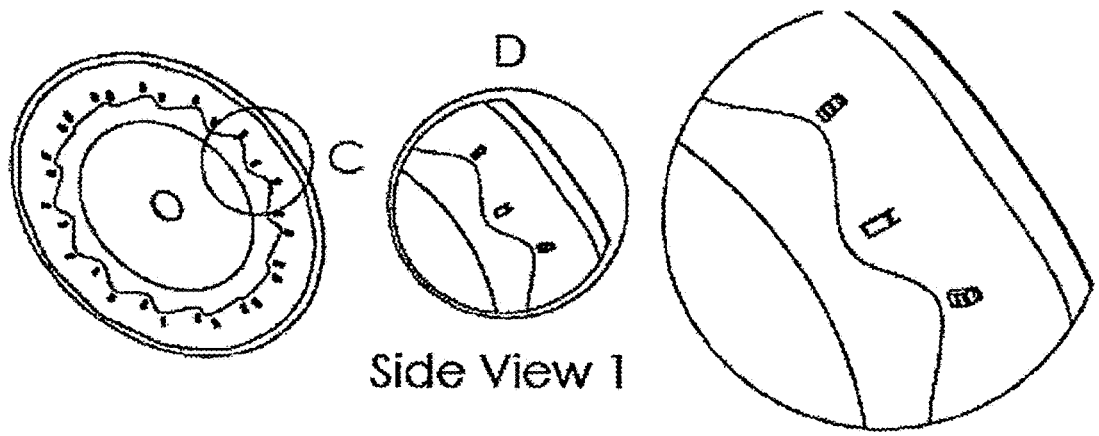
Figures 31A, 31B, 31C:
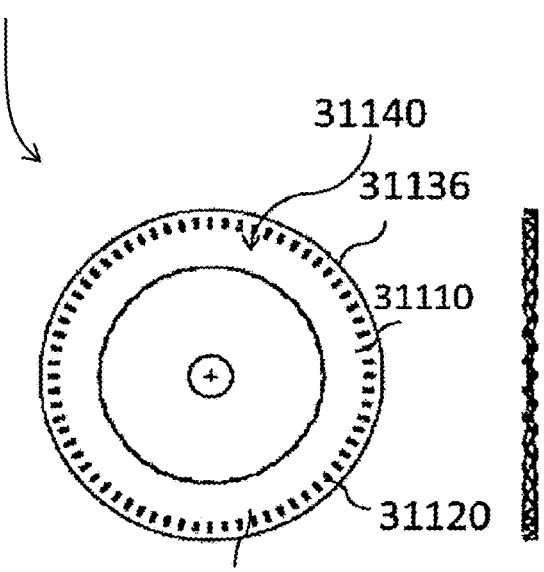
FIGS. 31A-I are diagrams of exemplary inserts in accordance with an embodiment of the present invention, particularly showing a ripple blade insert.
Figure 31D:
Figure 31E:
Figure 31F:
Figure 31G:
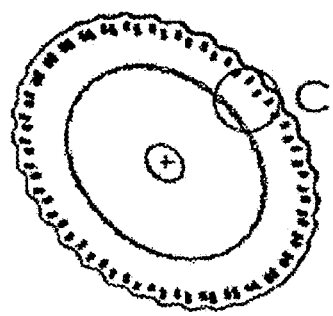
Figure 31H:
Figure 31I:
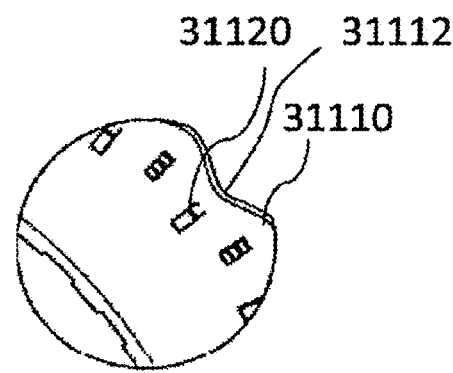
Figure 39A:
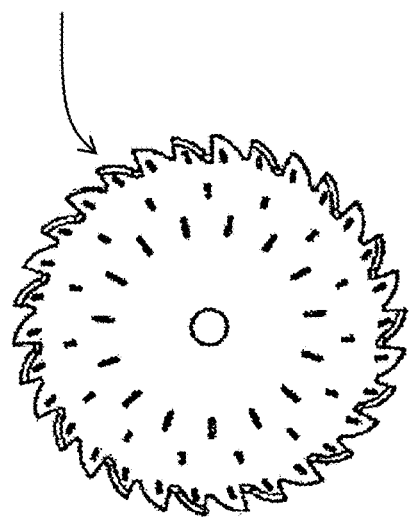
FIGS. 39A-I are diagrams of exemplary inserts in accordance with an embodiment of the present invention, particularly showing multiple insert blade.
Figure 39B:
Figure 39C:
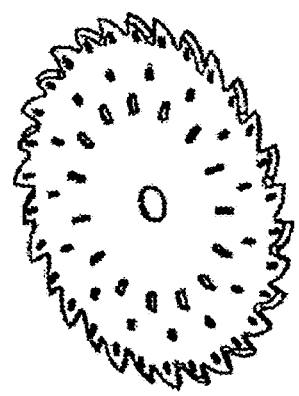
Figures 39D, 39E, 39F:
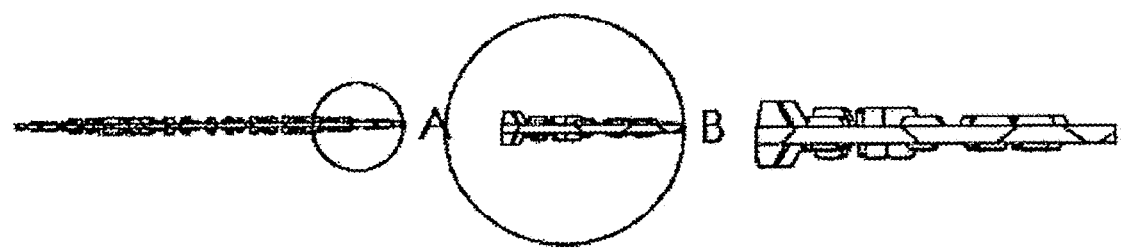
Figure 39G:
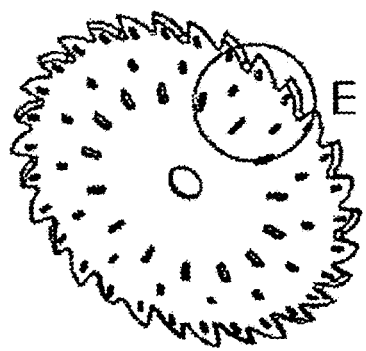
Figure 39H:
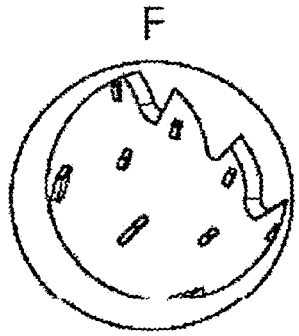
Figure 39I:
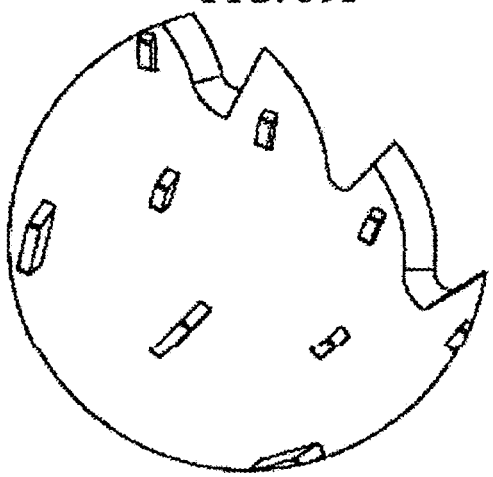
Figure 43A:
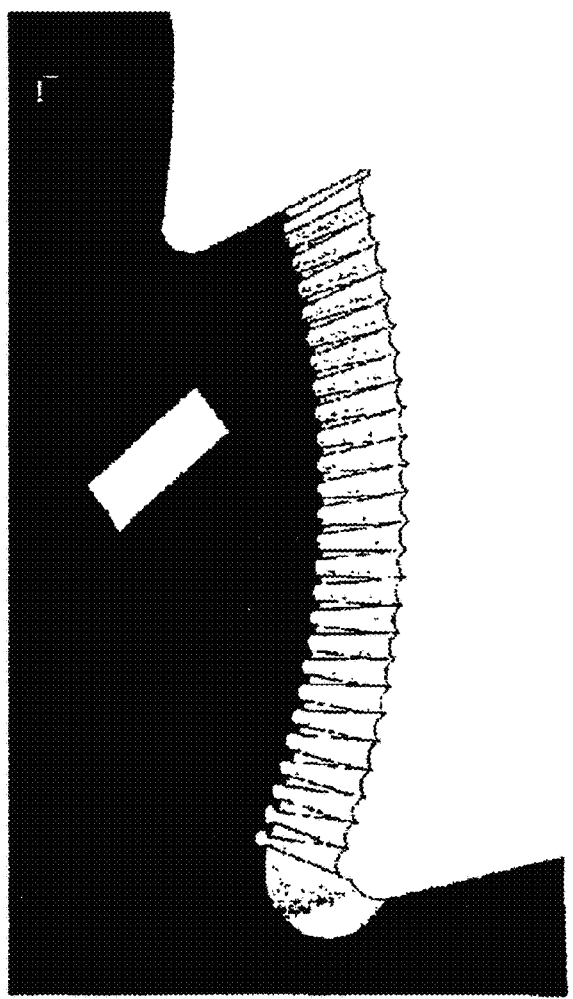
FIGS. 43A and 43B are exemplary images of serrated edge embodiments in accordance with an embodiment of the present invention.
Figure 43B:
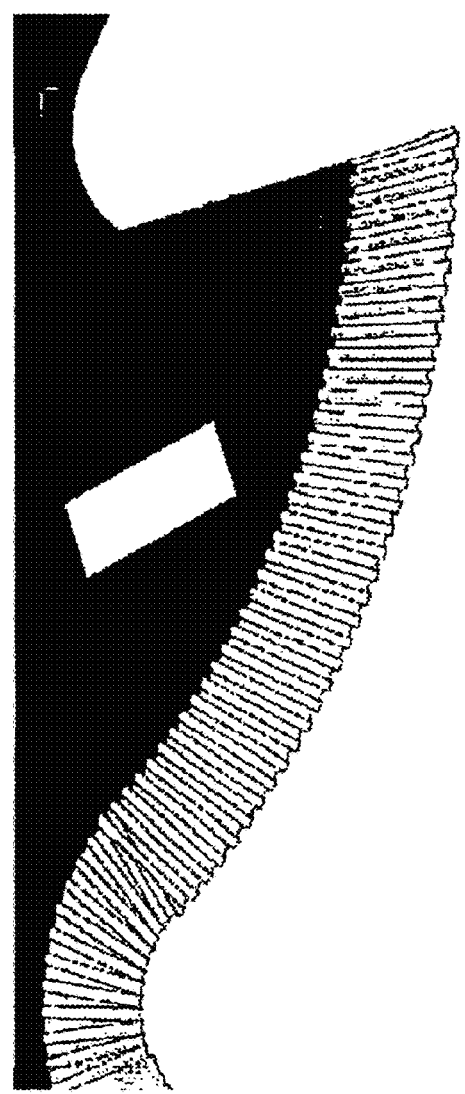

FIGS. 28A and 43B are exemplary images of serrated edge embodiments in accordance with an embodiment of the present invention.

Scissor and Shearing

Figure 44A:
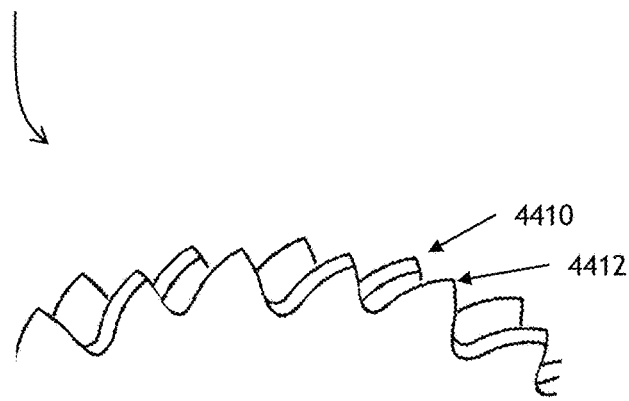
FIG. 44A depicts exemplary images of a pair of coulter blades of dissimilar size in accordance with one embodiment of the present invention.
Figure 59:
FIG. 59 is a diagram of characteristics of blades of dissimilar size exemplary of an embodiment of the present invention.

Referring to FIG. 44A, a pair of coulter blades of dissimilar size in accordance with one embodiment of the present invention is shown. In one embodiment, a pair of coulter blades of dissimilar size may be proximally mounted. In this manner, the smaller coulter blade may rotate at a faster rpm than would the larger coulter blade. In this manner, the teeth of the proximally mounted blades will maintain dissimilar relative position and cause a scissor motion to effectively cut surface residue. In one exemplary configuration, an outer blade 4410 may be approximately 15 inches in diameter while an inner blade 4420 may be approximately 14.75 inches in diameter. In another embodiment, each blade is the same size. Referring to FIG. 59, a diagram of characteristics of blades of dissimilar size exemplary of an embodiment of the present invention is shown. As the blades are mounted proximally, the teeth of each blade will rotate at dissimilar RPMs and act with a scissor effect to efficiently cut stubble material encountered by the dual blade configuration.

It is further contemplated herein, blades of a variety of sizes may operate effectively in concert to achieve a desired scissor effect.

Figure 44B:
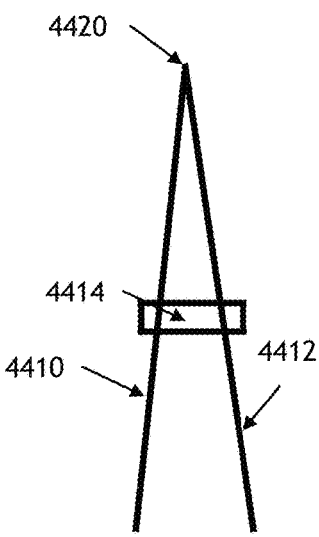
FIGS. 44B-44D are images of an alignment configuration of a pair of coulter blades exemplary of an embodiment of the present invention.
Figure 44C:
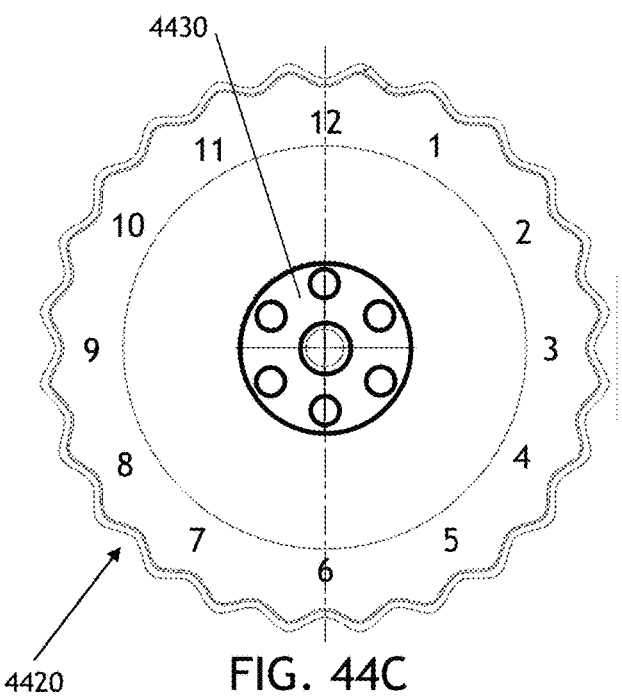
Figure 44D:
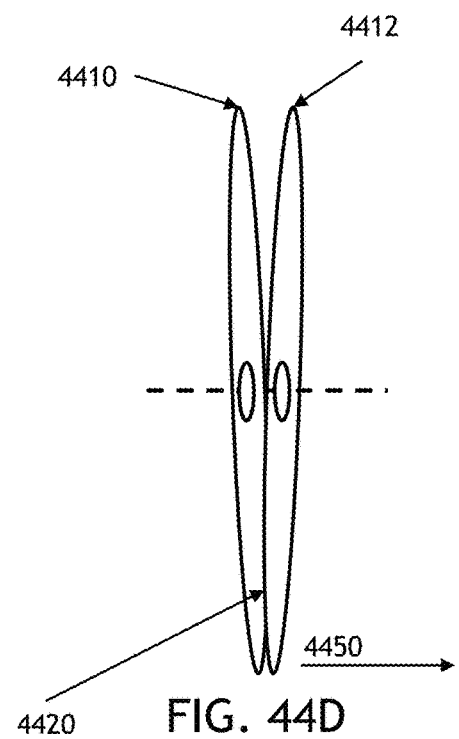

Referring to FIG. 44B through 44D, an alignment configuration of a pair of coulter blades exemplary of an embodiment of the present invention is shown. FIG. 44C is a lateral view, FIG. 44D is a longitudinal view, and FIG. 44B is a view from the 11 o'clock position referenced in FIG. 44C. Of note, an implement center 4450 may be the center of an implement (e.g., a corn planter). Each of the pair of coulter blades, the outer blade 4410 and the inner blade 4412, may be proximally mounted and also mounted with dissimilar planes of rotation. A blade mating point 4420 may be the point at which the plane of each blade intersects as properly mounted on the implement. In this manner, the blades form a cutting "V" with the blade mating point 4420 being the point at which the blade circumferences touch. On the opposite end of each blade, at approximately the 1:30 position in FIG. 44B, the blade circumferences are at their most distant laterally.

Blade Rigidity vs. Blade Flex

One goal of embodiments disclosed herein may include mounting a coulter blade which maintains rigidity while immersed within the soil.

In one embodiment of the present invention, a coulter blade of an exemplary thickness of approximately four millimeters may present a desirable blade rigidity to maintain blade shape as the blade is immersed in the soil. This desirable rigidity offers the operator a desirable furrow shape for increased root growth and increased yield. With a goal of zero flex between the blade bearing and the blade mating point 4420, embodiments herein may offer the operator a system eliminating variables that may increase blade flex and furrow degradation.

Bearings Substantial to Prevent Blade Flex

In one embodiment of the present invention, a coulter blade of substantial thickness is coupled to the implement via a bearing 4430 capable of resisting a radial force side pressure of the coulter blade 140 and eliminating blade flex. A coulter blade 140 may flex at any point between the bearing and the circumference. Also, should a bearing be unable to maintain the coulter blade at the proper angle to meet the opposite coulter blade at the blade mating point 4420, an undesirable distance may open between the blades at the blade mating point 4420. Substantial bearings 4430 may offer the operator a zero flex blade and a blade mating point which remains at a desired gap of near zero.

Double Bevel Blade Sharpening

Figure 45:
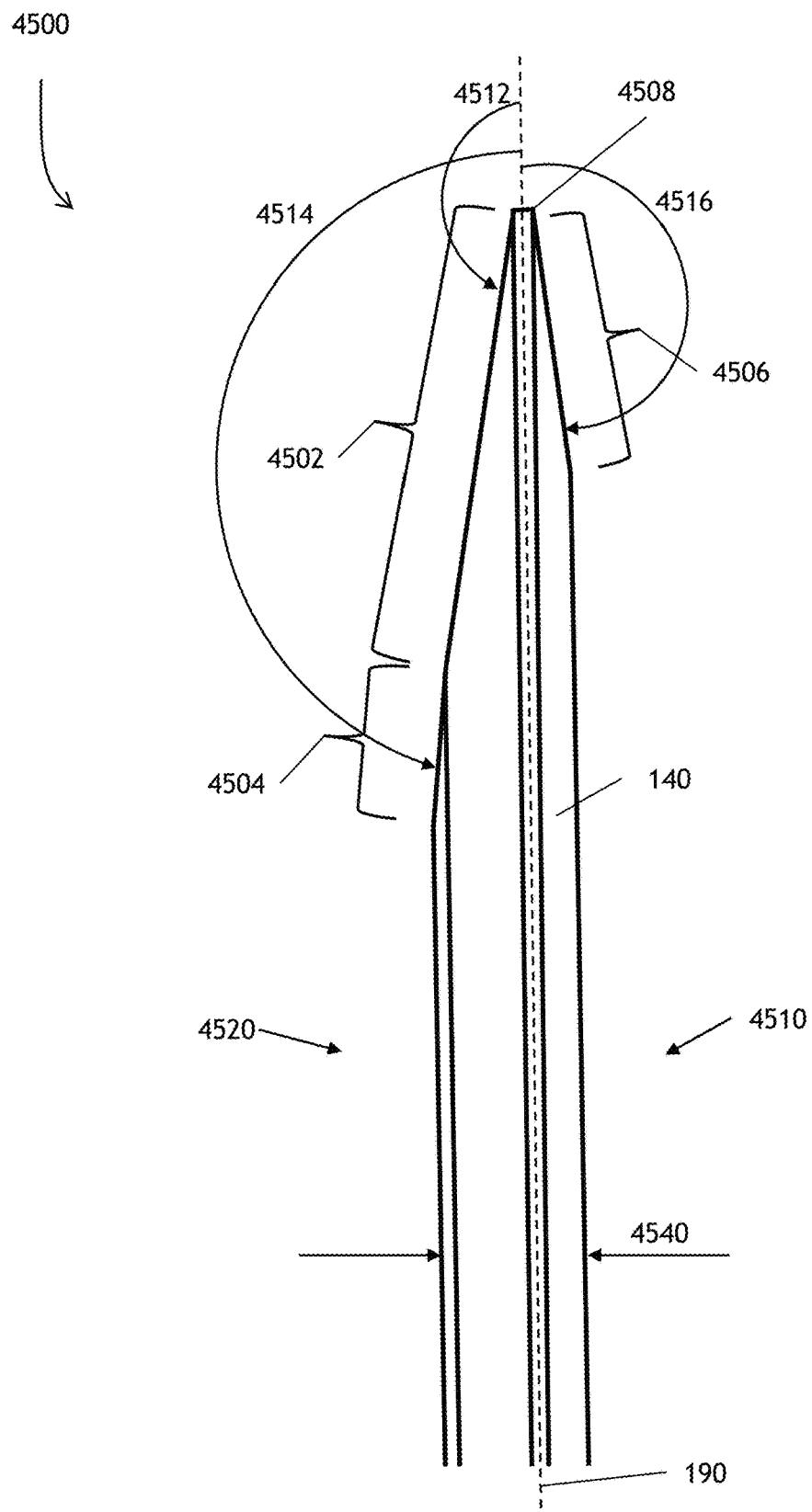
FIG. 45 is a diagram of a double bevel sharpened coulter blade exemplary of an embodiment of the present invention.

Referring to FIG. 45, a diagram 4500 of a double bevel sharpened coulter blade exemplary of an embodiment of the present invention is shown. Structurally, a coulter blade 140 sharpened with a double bevel may offer: a first bevel 4502 proximal with a blade sharpened point 4508, a second bevel 4504 between the first bevel and a blade outside 4520, an optional counter bevel 4506 between the blade sharpened point and a blade inside 4510. The first bevel 4502 being substantially longer than the second bevel 4504. An exemplary length of the first bevel 4502 is approximately three times a length of the second bevel 4504. The blade width 4540 may offer increased and/or decreased blade strength when desired.

The blade inside 4510 may be considered the side of the blade proximal with a desired implement attachment point 4414. The blade outside 4520 may be the side of the blade distal from the implement attachment point 4414 of the implement.

In operation, the double bevel sharpened coulter blade may offer a long sharpened lifespan to prevent undesirable premature stubbing and promote self sharpening. As the coulter blade 140 wears at the long first bevel 4502, it maintains a sharp edge at the blade sharpened point 4508. Blade thickness at the blade sharpened point 4508 is directly proportional with the DP required to operate the blade through the soil. In one example, the blade sharpened point 4508 may be sharpened to 0.05 mm to 1.5 mm. With blades sharpened to this metric, the coulter blade 140 self-sharpens as time (e.g., 20-40 hours) in soil increases.

Each coulter blade 150 may be sharpened similarly but mounted oppositely. Each blade maintains a blade inside 4510 and a blade outside 4520. The blade inside 4510 being the side proximal to an implement attachment point 4414 and proximal with the oppositely mounted blade of the pair. Each coulter blade may include a first bevel angle 4512, a second bevel angle 4514 and a counter bevel angle 4516. Operationally, an exemplary set of angles may include an approximate relationship from the plane 190 of motion to the first bevel an angle of 160 degrees, a second bevel angle of 175 degrees and a counter bevel of 160 degrees. Each of these bevel angles may be substantially modified for different soil types and variable furrow goals.

The first bevel 4502 and first bevel angle 4512 may operate to maintain a sharpened cutting edge over the life of the blade. The sharp cutting edge may allow the operator flexibility in operation to increase or decrease the size and angle of the first bevel 4502 to match desired soil types. The variable length and angle of the first bevel 4502 may offer the operator a desirable DP required to immerse the blade within the soil, a desirable forward force required to move the blade through the soil, a desirable ability to cut surface residue on the surface and a more accurate furrow in which to plant a seed. The first bevel length may extend from the circumference to any length between the blade hub and the blade circumference. For example, depending on a number of variables including blade diameter and blade width 4540, one desirable first bevel length may be an exemplary 6-20 mm to offer a balance to the operator for continued self-sharpening of the blade while maintaining impact resistance with a submerged obstacle.

In another example, an operator in very soft or moist soils may desire a long life blade without worry about submerged rock damage or impact with an underground obstacle. In this case, is it contemplated herein, a first bevel length may extend an exemplary 150 mm from the circumference to the end of the first bevel 4502. In this example, the operator may maintain a sharp blade for a longer period without concern for rock impact.

The second bevel 4504 and second bevel angle 4514 may also allow the operator flexibility in operation to increase or decrease the size and angle of the second bevel 4504 to accommodate variable soil types and moisture content. The second bevel 4504 may offer structural support to the first bevel 4502 as well as maintaining as sharp of a cutting edge as possible as the blade may wear.

For example, a second bevel 4504 of an exemplary 4-20 mm length may offer the operator a balance between in-soil resistance and an appropriate transition from the first bevel 4502 to the blade outside 4520.

The optional counter bevel 4506 and counter bevel angle 4516 may provide flexibility to an operator to vary each to a specific desired outcome. In single blade operations, the operator may determine a single blade may suffice for a desired outcome. In this case, a coulter blade 140 with no counter bevel 4506 may be appropriate.

Depending on a number of factors including the blade width 4540 and angle at which the blade is mounted on the implement, the counter bevel angle 4516 may be adjusted by a manufacturer to allow the oppositely mounted blades to accurately mate at the blade mating point 4420. For example, a blade width 4540 of 25 mm may require a counter bevel length much greater than that required for a blade of 4 mm in width. Variables including desired furrow width and depth, implement attachment angle, anticipated soil type and soil moisture content may determine a desired counter bevel length and angle.

Bevel length may also remain variable to account for different sharpening goals based on soil types, anticipated blade life, expected GMO material to be cut and expected seed type and placement. For example, an operator planting primarily in softer moist soils may opt for a sharper blade with a longer first bevel 4502 and a greater first bevel angle 4512. In this manner, an operator within a certain area of agriculture may tailor each variable (first bevel, second bevel, counter bevel, width, diameter and metal construction) of the coulter blade 140 for specific goals.

Counter Bevel Sharpening

Figure 46:
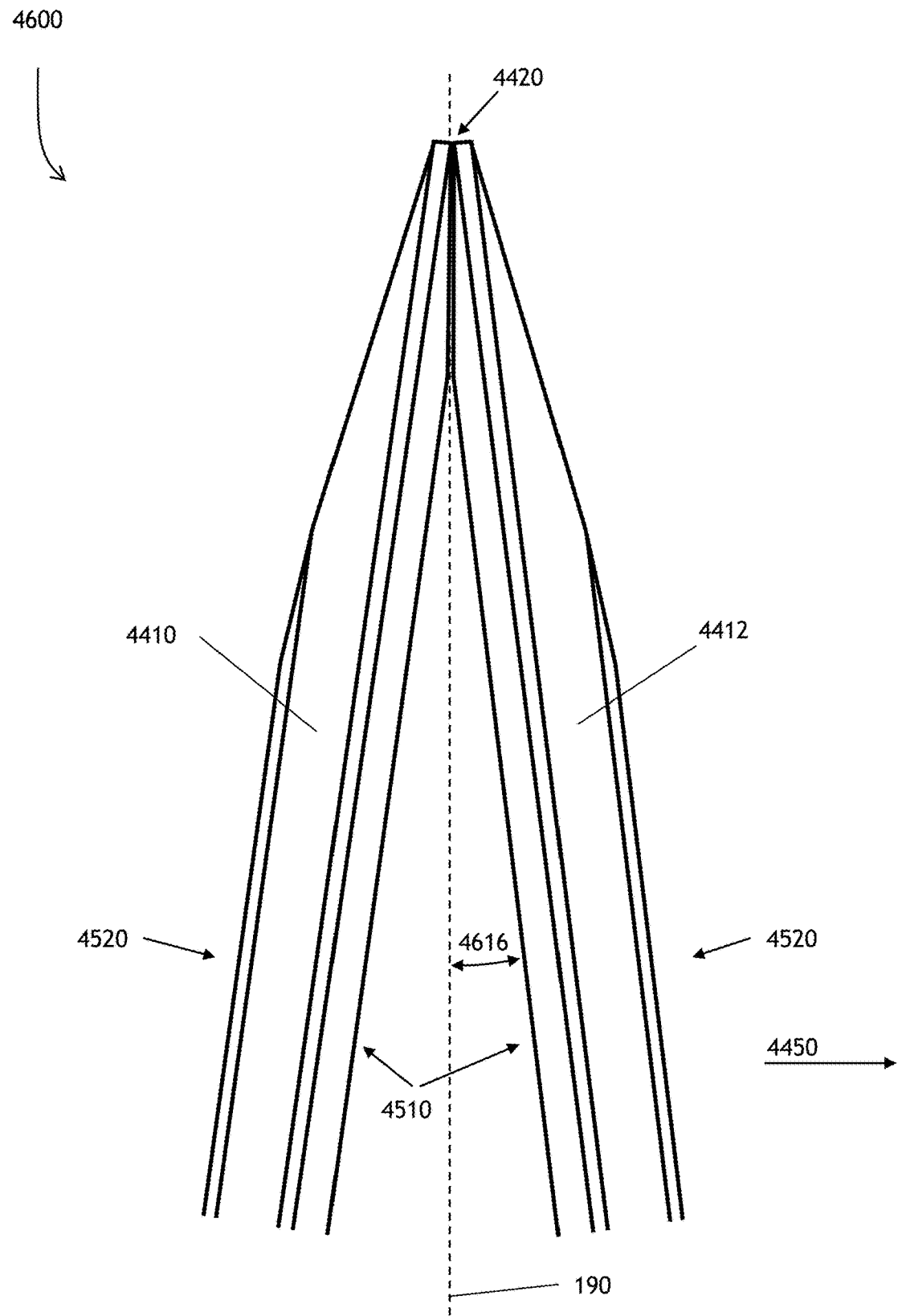
FIG. 46 is an image of an alignment configuration of a pair of coulter blades exemplary of an embodiment of the present invention.

Referring to FIG. 46, an image of an alignment configuration of a pair of coulter blades exemplary of an embodiment of the present invention is shown. As the blades meet at the blade mating point 4420, the counter bevel of each may mate at an angle causing minimum gap between the two blades. The counter bevel angle 4516 may be the same for each blade and approximately equal to a mating angle 4616 each blade's plane 190 may make with the longitudinal axes as each blade is mounted on the implement.

In some implementations, the mating angle 4616 may be an exemplary 0-25 degrees for optimal performance. For example, a potato planter may require a wide furrow requiring a furrow of a width of 4 inches. The mating angle 4616 may be variable from an exemplary 3-20 degrees based on desired performance. In a case of offset blades, a mating angle 4616 of an exemplary 4-10 degrees may be appropriate.

During operation, each blade may wear at the same rate allowing for the counter-bevel 4506 mating point 4420 to remain intact and at a constant angle. In this manner, the wearing blades still maintain continuous contact with each other maintaining a sharp blade mating point 4420. Should the blades wear at different rates, the operator may periodically adjust the blades to form a near zero gap at the blade mating point 4420. In the configuration with dissimilar sized blades mounted proximally, each counter bevel angle 4516 may be slightly dissimilar as well to ensure the near-zero desirable gap between the blades. In one example, a counter bevel 4506 length of 2-20 mm may be appropriate for the specific goals.

With sharpened inside bevels, the blade mating point may operate as a sharpened single edge. This combination of 1) a sharpened blade inside counter bevel 4506, 2) an accurately mounted pair of exemplary four mm blades joined at the blade mating point 4420, 3) the double bevel sharpening 4502 4504, and 4) substantial sized bearings 4430 to counter blade flex may offer the operator a system creating a properly shaped furrow, a desirable DP for proper depth, and eventual desirable crop yields.

Blade Types

Figure 47:
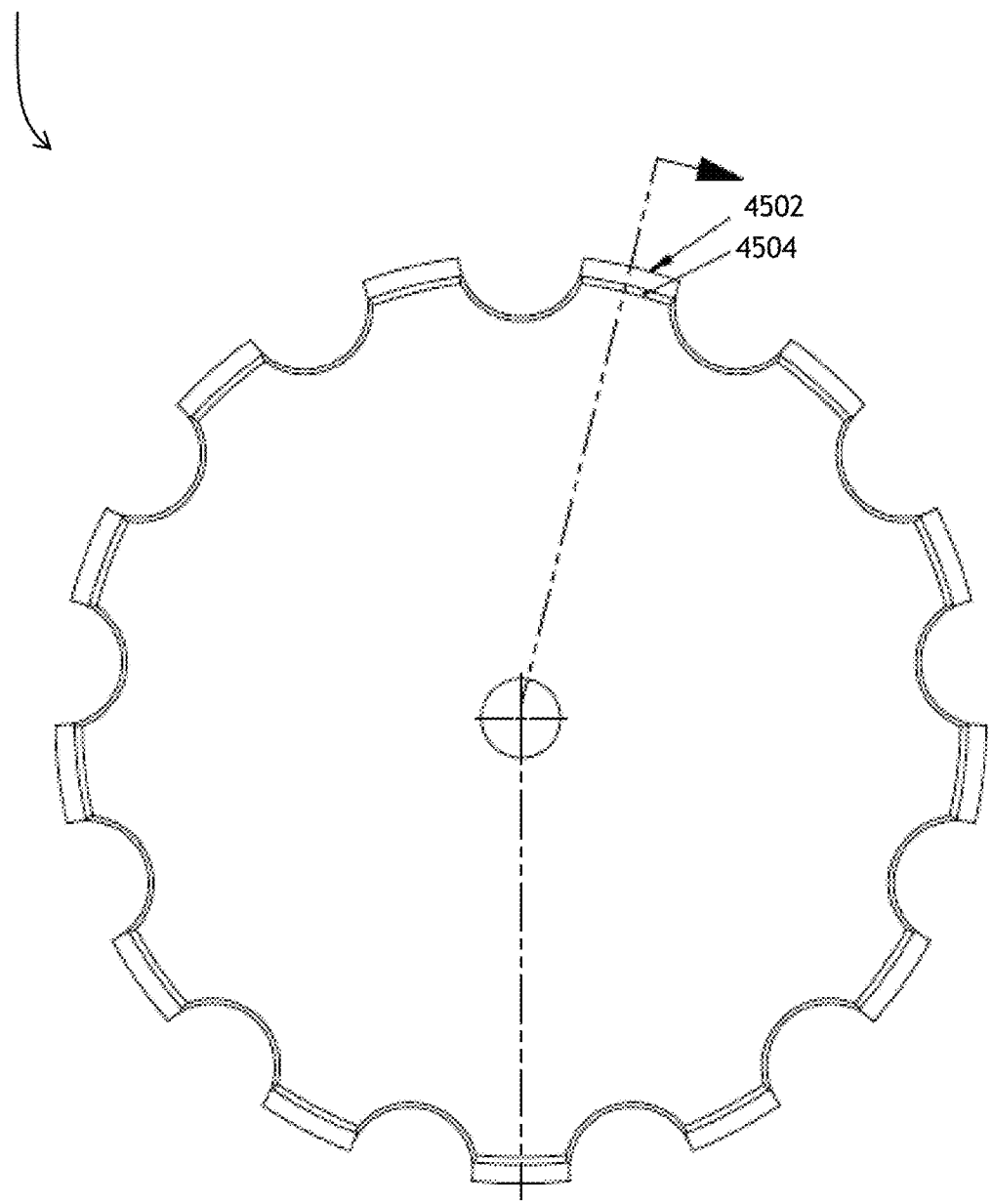
FIGS. 47 and 48A-48C are images of a notch coulter blade exemplary of an embodiment of the present invention.
Figure 48A:
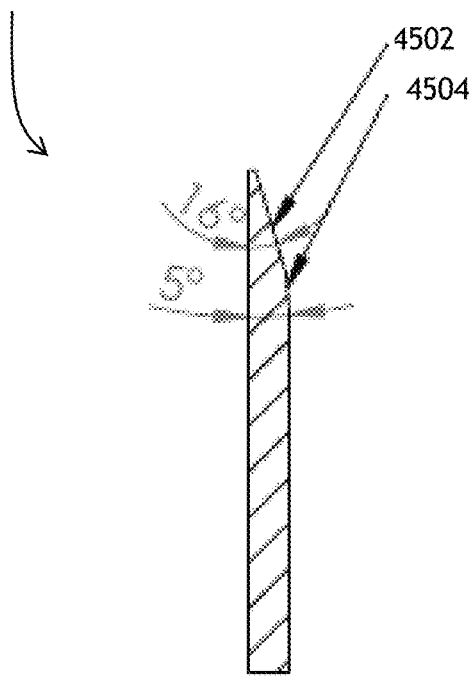
Figure 48B:
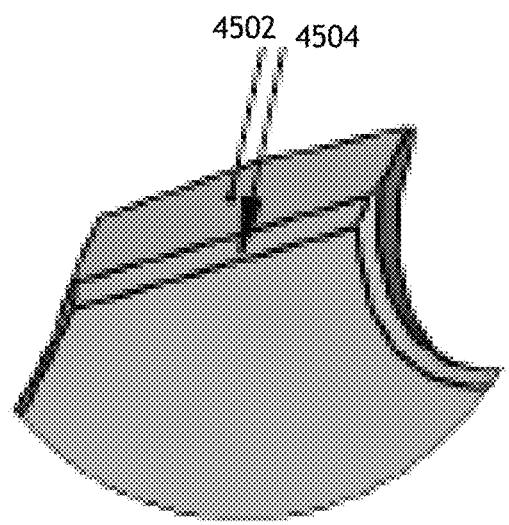
Figure 48C:
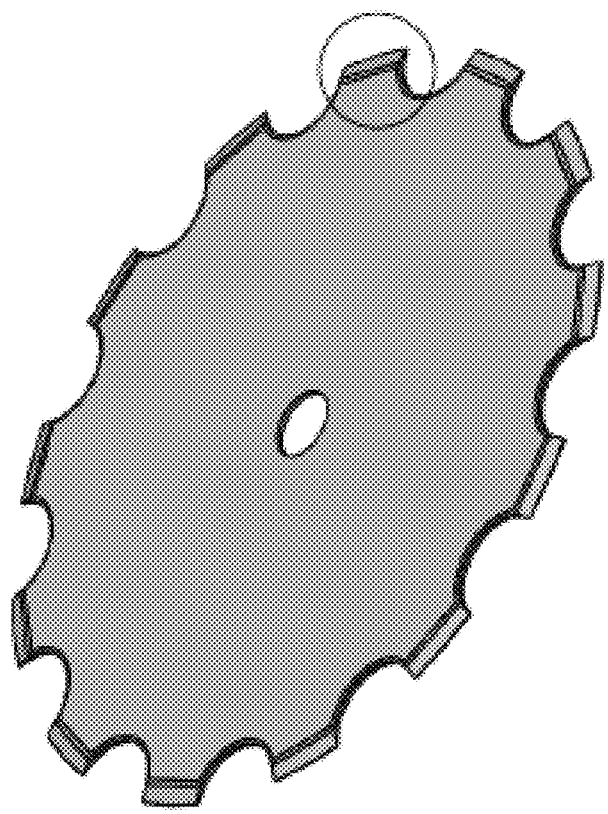

Referring to FIG. 47-48C, images of a notch coulter blade exemplary of an embodiment of the present invention is shown. An exemplary notch blade 4700 may offer an operator flexibility in stubble type and soil type. Of note, variable first bevel angles 4512 of 0-180 degrees may offer the operator flexibility in choosing the correct blade for operation. In addition, variable second bevel angles 4514 of 0-180 degrees may offer additional flexibility to the operator. In addition, counter bevel angles of 0-180 degrees may offer flexibility in blade mounting on the implement. Blade thickness of an exemplary 4 mm to 25 mm and variable steel compositions may offer the operator flexibility in specific soil types.

Figure 49:
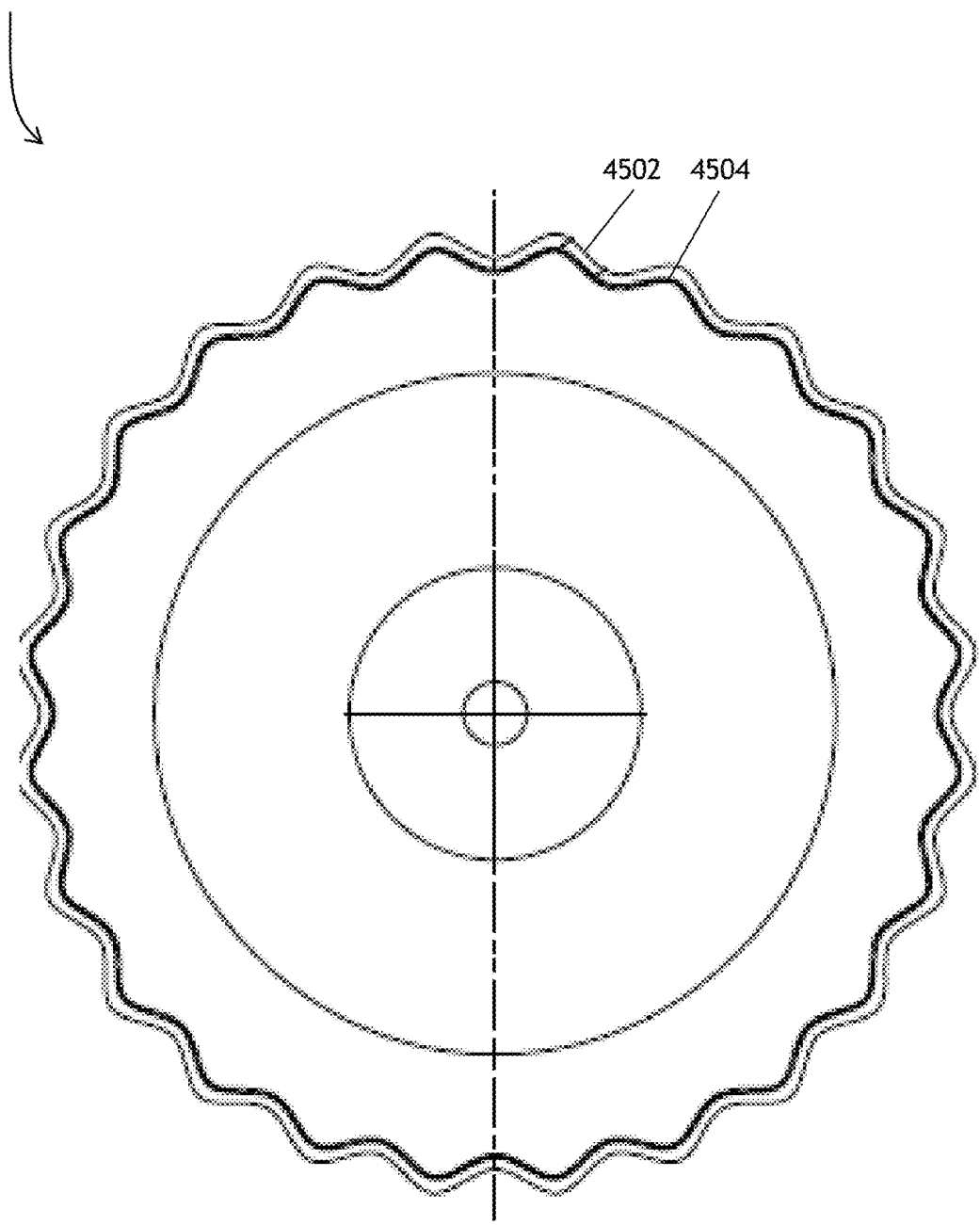
FIG. 49 is an image of a razor coulter blade exemplary of an embodiment of the present invention.

Referring to FIG. 49, an image of a razor coulter blade exemplary of an embodiment of the present invention is shown. An exemplary razor blade 4900 may offer an operator flexibility in stubble type and soil type.

Figure 50:
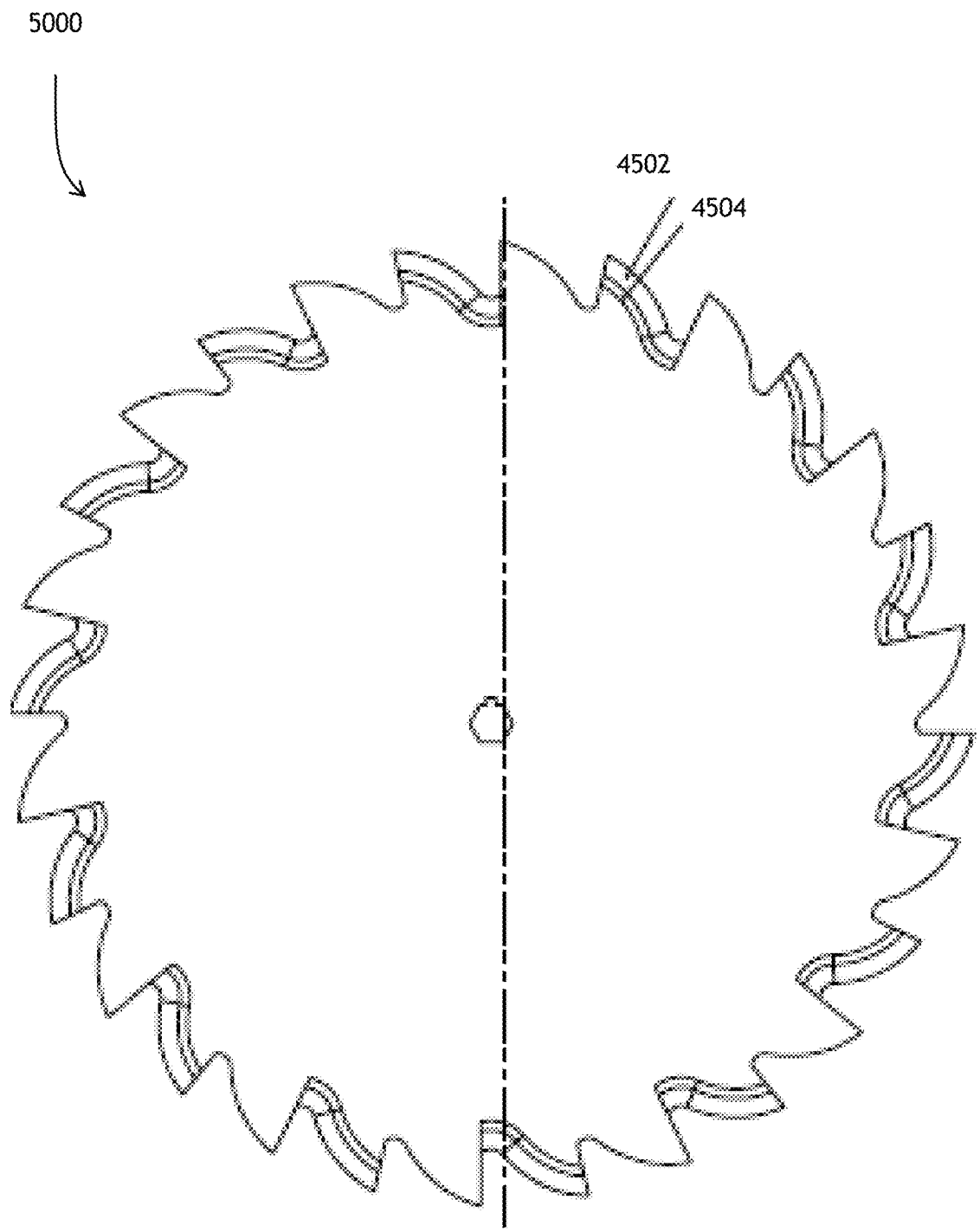
FIGS. 50 and 51A-51C are images of a coulter blade exemplary of an embodiment of the present invention.
Figure 51A:
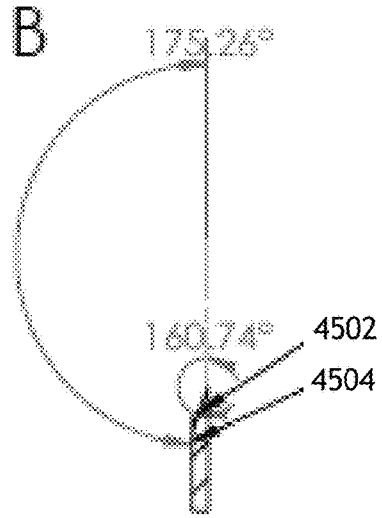
Figure 51B:
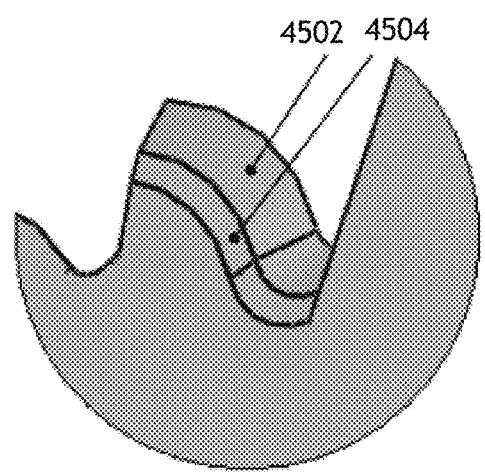
Figure 51C:
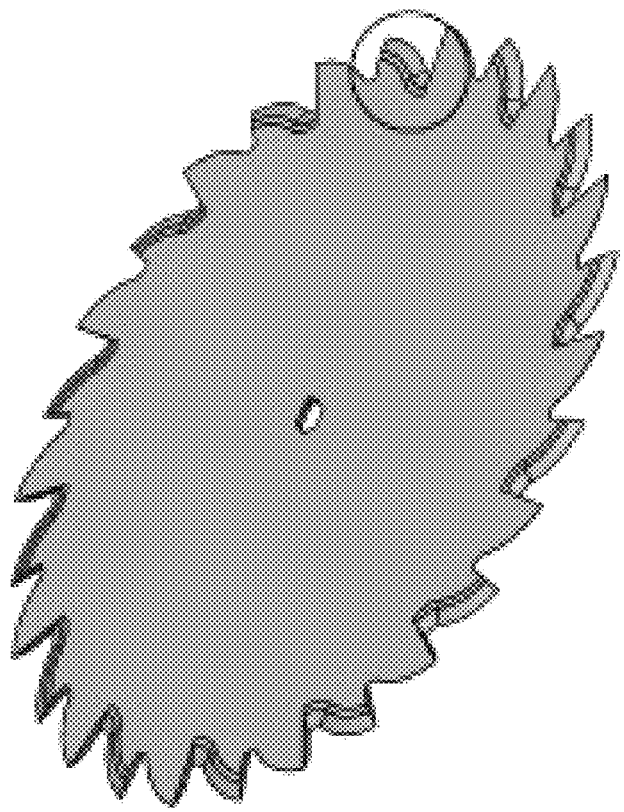

Referring to FIG. 50-51C, images of a coulter blade exemplary of an embodiment of the present invention is shown. An exemplary STI blade 5000 may offer an operator flexibility in stubble type and soil type.

Figure 52:
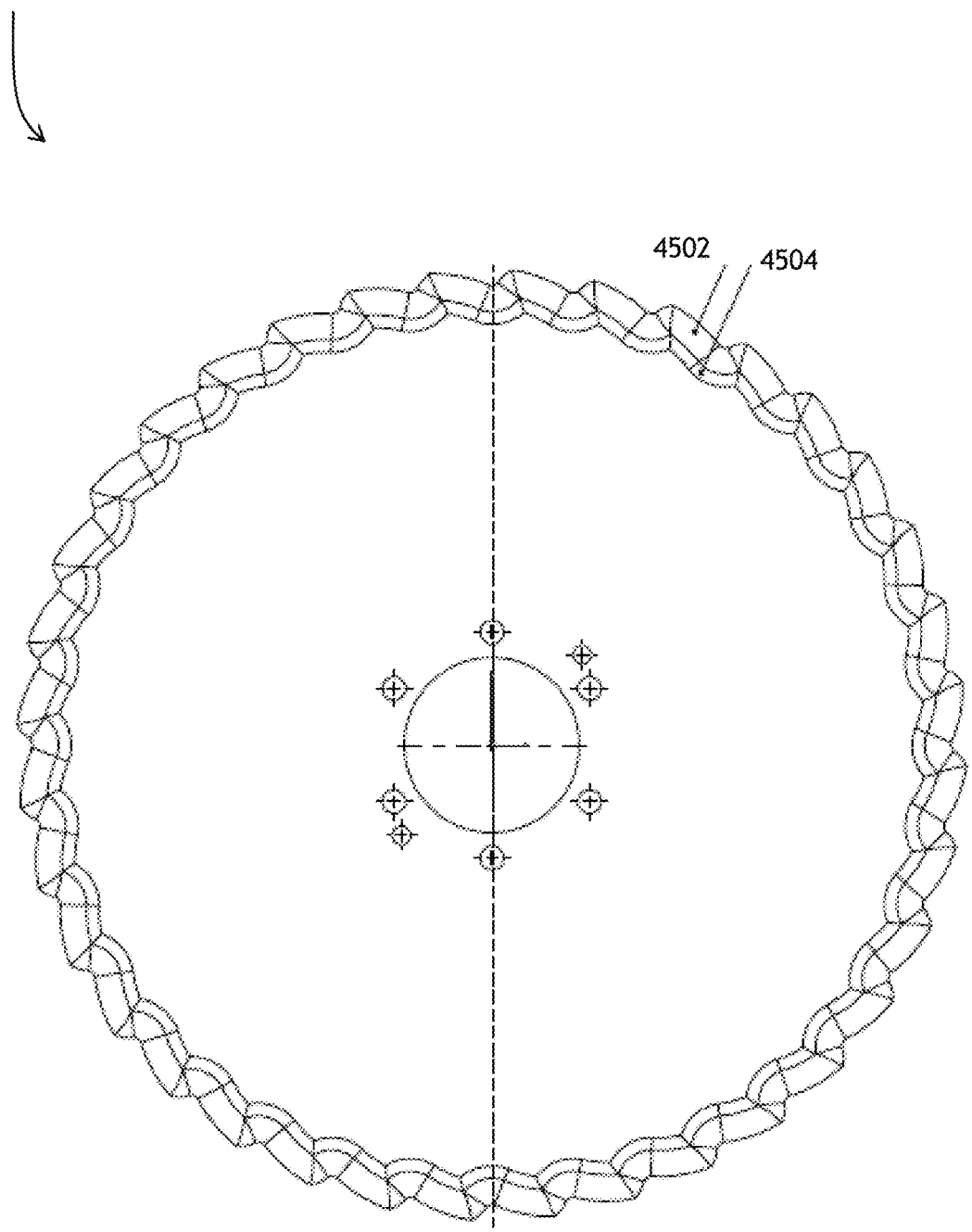
FIGS. 52 and 53A-53C are images of a coulter blade exemplary of an embodiment of the present invention.
Figure 53A:
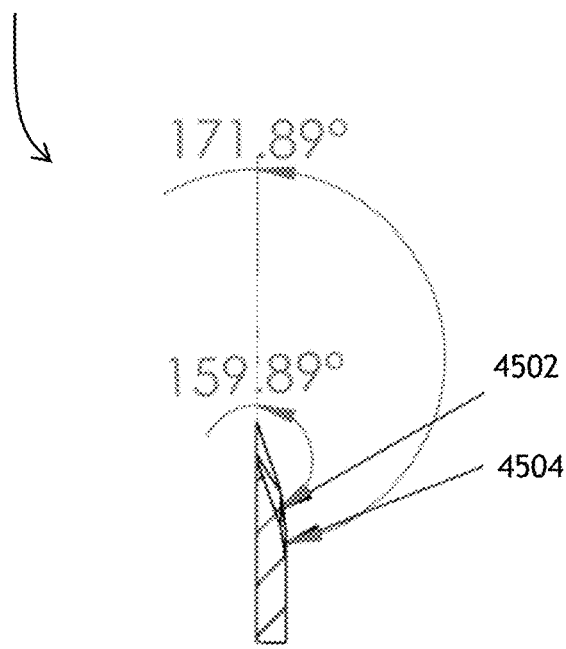
Figure 53B:
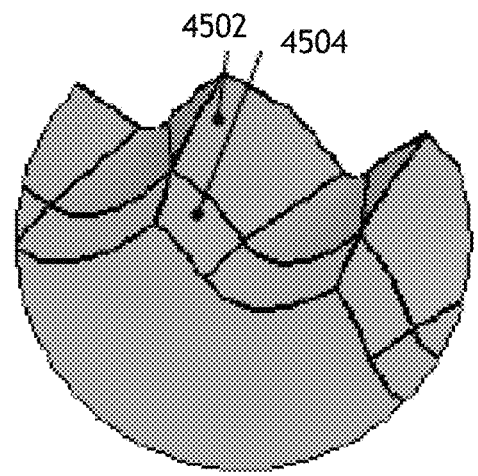
Figure 53C:
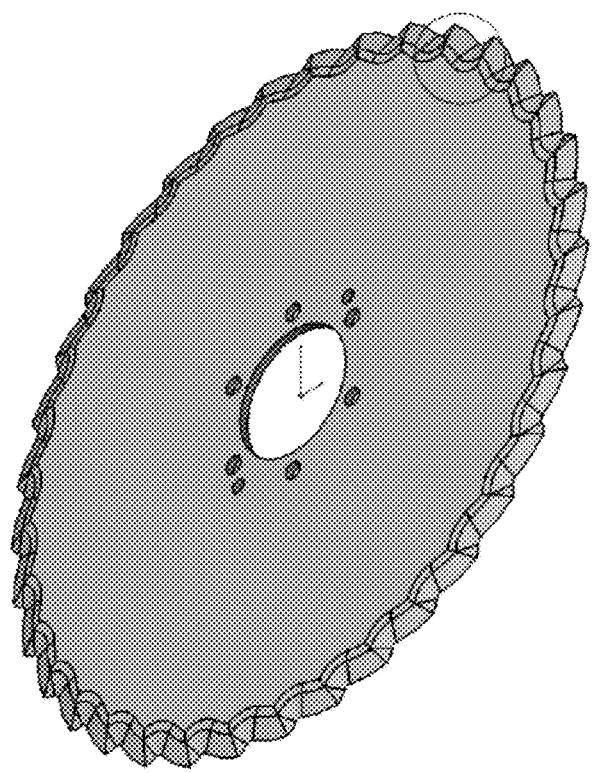

Referring to FIG. 52-53C, images of a coulter blade exemplary of an embodiment of the present invention is shown. An exemplary (Sabre Tooth Planter) STP blade 5200 may offer an operator flexibility in stubble type and soil type.

Figure 54:
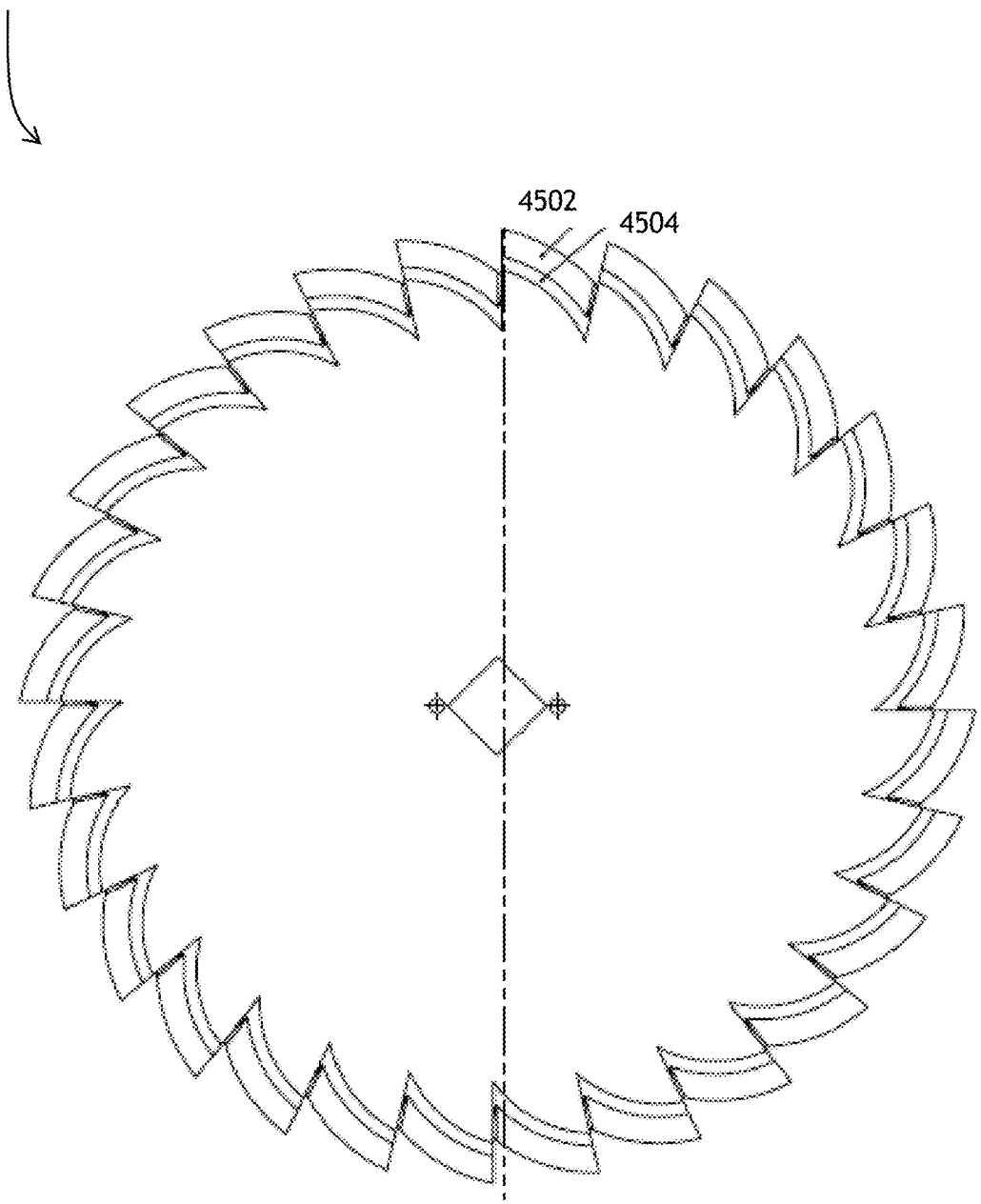
FIGS. 54 and 55A-55C are images of a notch coulter blade exemplary of an embodiment of the present invention.
Figure 55A:
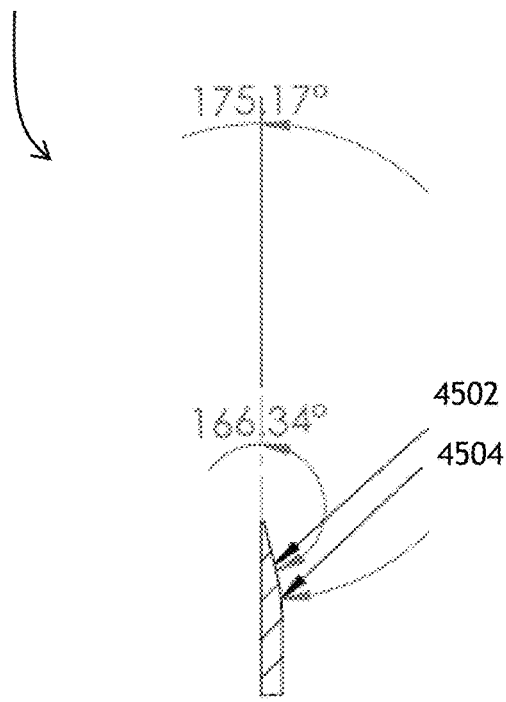
Figure 55B:
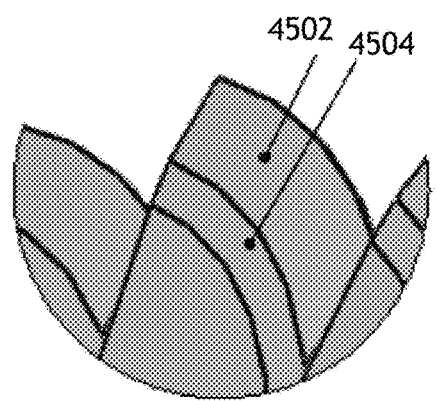
Figure 55C:
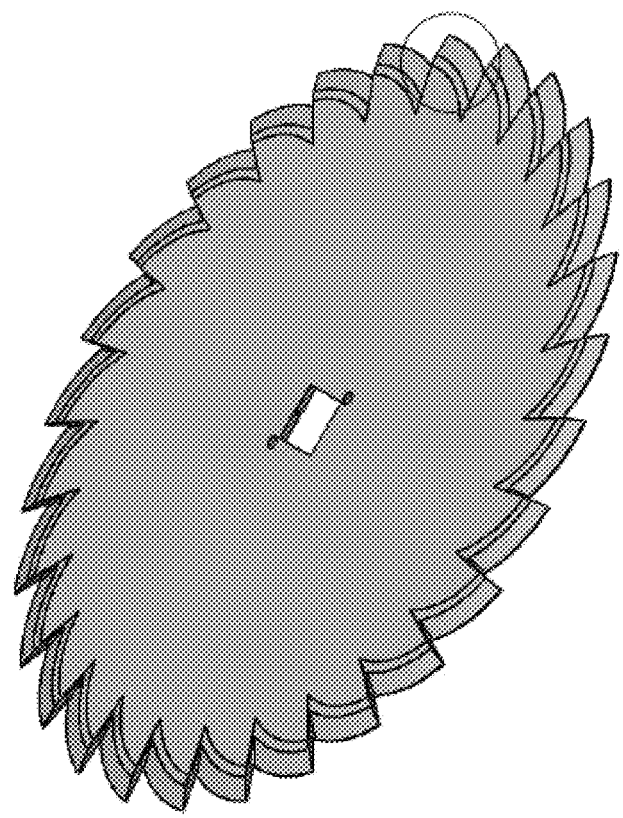

Referring to FIG. 54-55C, images of a notch coulter blade exemplary of an embodiment of the present invention is shown. An exemplary Alamo 2 blade 5400 may offer an operator flexibility in stubble type and soil type.

Figure 56:
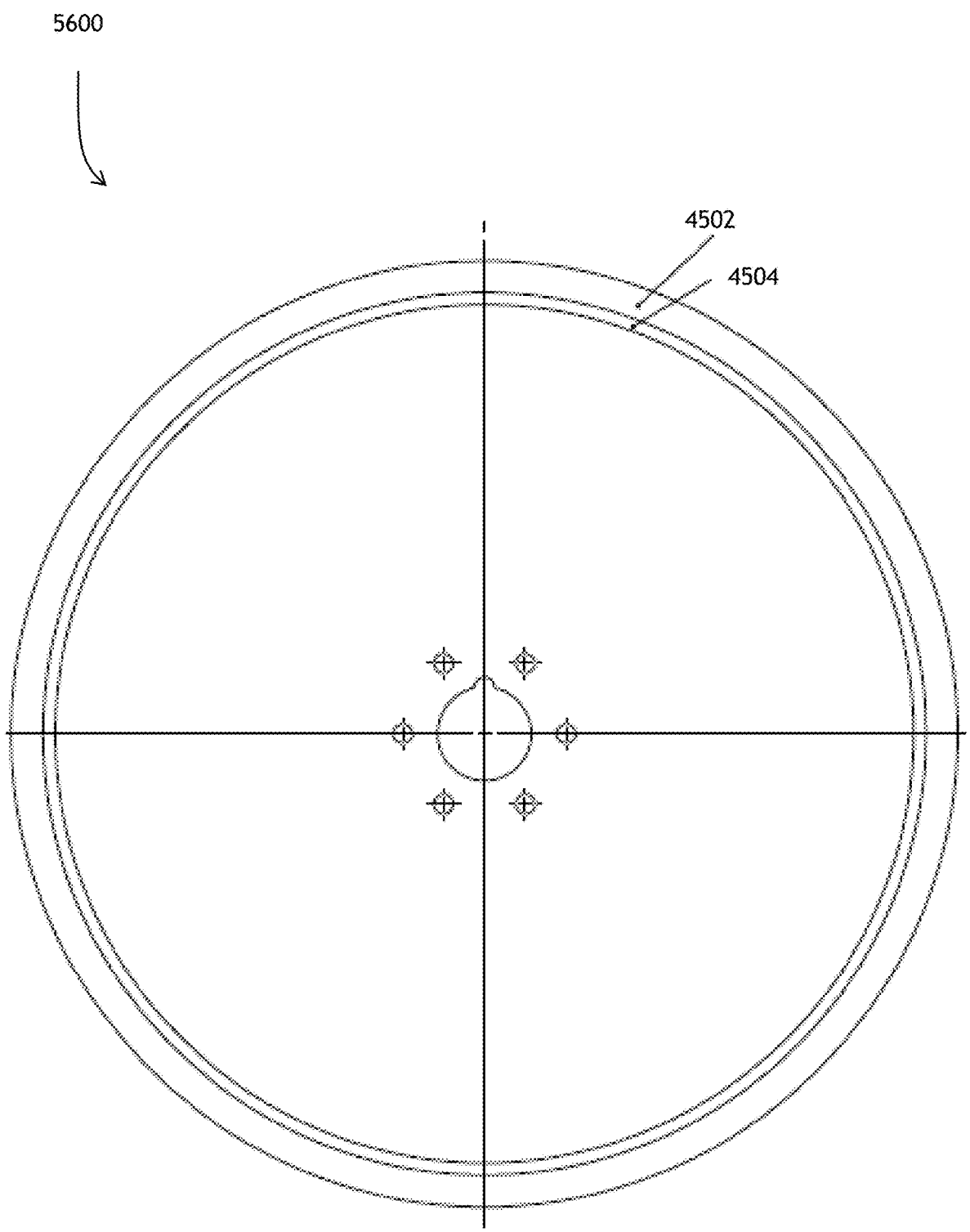

Referring to FIG. 56-57C, images of a notch coulter blade exemplary of an embodiment of the present invention is shown. An exemplary (Sabre Tooth V) STV blade 5600 may offer an operator flexibility in stubble type and soil type.

Figure 58A:
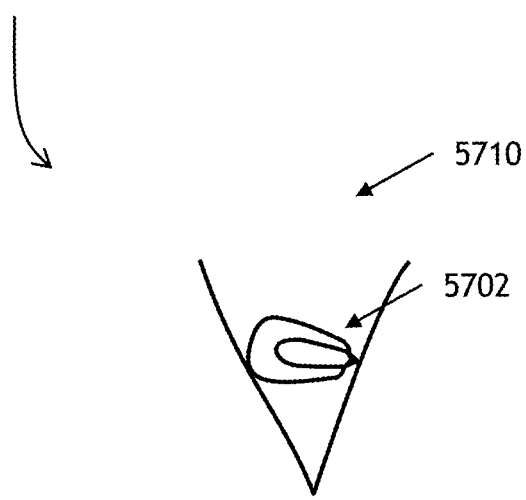
FIGS. 58A and 58B are images of a desirable seed furrow notch created by an embodiment of the present invention.
Figure 58B:
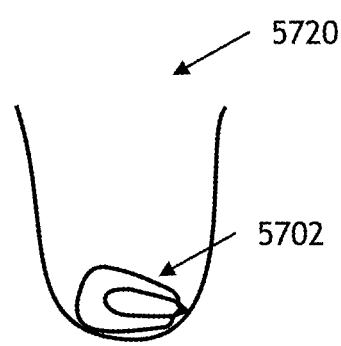

Referring to FIGS. 58A and 58B, images of a desirable seed furrow notch created by an embodiment of the present invention is shown. An additional goal of embodiments disclosed herein may include creation of the "U" shaped furrow found in FIG. 58B. The seed 5702 may fall to the base of the "U" and be surrounded with granulated soil for growth. Conversely, the "V" shaped furrow of FIG. 58A may cause the seed 5702 to remain at a point undesirably distant from the base of the furrow.

One goal of embodiments disclosed herein may include a system offering the least amount of soil contact, the least amount of soil engagement area and the least amount force over time. With use of rotation speed and percentage of rotation versus push slide, embodiments herein may keep the coulter blade 140 engaged within the soil and successfully cutting surface residue.

Embodiments herein may concentrate friction and force in forward motion using multiple tooth designs and angles to cut the substantial GMO residue and produce the desirable "U" shaped furrow. As the disclosed coulter blades remain within the soil, they flow and lift soil vs. push and compact. The disclosed embodiments may maximize soil-moisture capillary action and nutrient biological and chemical equilibrium to improve and maintain soil structure. The Sabre Tooth Planter (STP) blade disclosed herein may cut, turn, rotate, granulate, and flow, moist granulated soil around each seed within the furrow, eliminating hair pinning, slide, smear, side wall, surface and sub furrow compaction.

The STP blade may cut a "U" shaped furrow preventing seed lodging while flowing moist granulated soil on top of the placed seed. The granulated soil may create excellent soil to seed contact enhancing early root development, creating a root zone for deep vertical elongated roots while reducing rootless corn syndrome, uneven emergence, reducing planter device requirements and cost, reducing planter challenges.

CONCLUSION

Specific blocks, sections, devices, functions, processes and modules may have been set forth. However, a skilled technologist will realize that there are many ways to partition the system, and that there are many parts, components, processes, modules or functions that may be substituted for those listed above.

While the above-detailed description has shown, described and pointed out the fundamental novel features of the invention as applied to various embodiments, it will be understood that various omissions and substitutions and changes in the form and details of the system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiment is to be considered in all respects only as illustrative and not restrictive and the scope of the invention is, therefore, indicated by the appended claims rather than by the foregoing description. All changes which come within the meaning and range of equivalency of the claims are to be embraced within their scope.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B.

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

The invention claimed is:

1. A coulter blade for altering soil and surface stubble, comprising:
   a discoidal coulter blade configured with a blade hub, a blade width, and a blade circumference, the discoidal coulter blade having a plane parallel to each diameter line of the discoidal coulter blade, the blade hub configured for detachably mounting the discoidal coulter blade to an implement;
   the discoidal coulter blade further configured with a proximal side and a distal side, the proximal side being proximal to an implement attachment point, the distal side distal from the implement attachment point;
   the distal side of the discoidal coulter blade configured with a first bevel sharpened at a first bevel angle and a second bevel sharpened at a second bevel angle, the first bevel being proximal with the blade circumference and the second bevel being distal from the blade circumference, the first bevel angle, as measured from the plane at the blade circumference, being less than the second bevel angle;
   the proximal side of the discoidal coulter blade configured with a counter bevel sharpened at a counter bevel angle, the counter-bevel being proximal with the blade sharpened point;
   the first bevel having a first bevel length, the second bevel having a second bevel length, the counter-bevel having a counter bevel length;
   wherein the first bevel length is greater than the second bevel length and the counter-bevel length is less than the first bevel length.

2. The coulter blade for altering soil and surface stubble of claim 1, wherein a difference between the first bevel angle and the second bevel angle is less than 17 degrees.

3. The coulter blade for altering soil and surface stubble of claim 1, wherein the first bevel angle is 164+/−10 degrees and the second bevel is 174+/−10 degrees.

4. The coulter blade for altering soil and surface stubble of claim 1, wherein the first bevel length is substantially greater than the second bevel length.

5. The coulter blade for altering soil and surface stubble of claim 1, wherein the first bevel length is substantially one-fourth of the blade width.

6. The coulter blade for altering soil and surface stubble of claim 1, wherein the second bevel length is substantially one-fourth of the first bevel length.

7. The coulter blade for altering soil and surface stubble of claim 1, wherein the counter-bevel angle is within 10 degrees of an implement attachment angle.

8. The coulter blade for altering soil and surface stubble of claim 1, wherein a first discoidal coulter blade is mated with a second discoidal coulter blade at a blade mating point, each of the first and second discoidal coulter blades is mounted to the implement.

9. The coulter blade for altering soil and surface stubble of claim 8, wherein the circumference of the first discoidal coulter blade is dissimilar to the circumference of the second discoidal coulter blade.

10. The coulter blade for altering soil and surface stubble of claim 9, wherein the circumference of the first discoidal coulter blade is within 10 inches of the circumference of the second discoidal coulter blade.

11. The coulter blade for altering soil and surface stubble of claim 1, wherein the first bevel length is at least approximately three times longer than the second bevel length.

12. The coulter blade for altering soil and surface stubble of claim 1, wherein the discoidal coulter blade is further configured with a plurality of insert openings.

13. The coulter blade for altering soil and surface stubble of claim 1, wherein the discoidal coulter blade is further configured with a plurality of securably mountable inserts, each of the plurality of securably mountable inserts being configured to extend from the discoidal coulter blade a lateral distance normal to the plane on at least one of: the distal side of the discoidal coulter blade and both the distal side and proximal side of the discoidal coulter blade.

14. The coulter blade for altering soil and surface stubble of claim 1, wherein the discoidal coulter blade has a concave shape.

15. The coulter blade for altering soil and surface stubble of claim 1, wherein the discoidal coulter blade has a substantially flat shape.

16. A method for altering surface stubble and altering soil, comprising:
sharpening a discoidal coulter blade on a proximal side and on a distal side, the proximal side being proximal to an implement attachment point, the distal side being distal from the implement attachment point;
the discoidal coulter blade configured with a blade hub, a blade width, and a blade circumference, the discoidal coulter blade having a plane parallel to each diameter line of the discoidal coulter blade;
sharpening the distal side of the discoidal coulter blade with a first bevel, the first bevel being sharpened at a first bevel angle, the first bevel having a first bevel length;
sharpening the distal side of the discoidal coulter blade with a second bevel, the second bevel being sharpened at a second bevel angle, the second bevel having a second bevel length;
the first bevel proximal with the blade circumference and the second bevel distal from the blade circumference, the first bevel angle, as measured from the plane at the blade circumference, being less than the second bevel angle, the first bevel length being greater than the second bevel length;
sharpening the proximal side of the discoidal coulter blade with a counter bevel sharpened at a counter bevel angle, the counter-bevel proximal with the blade sharpened point;
detachably mounting at least two discoidal coulter blades to an implement via the implement attachment point, the at least two discoidal coulter blades configured to mate at a blade mating point, the blade mating point being substantially equal with each blade's counter bevel;
embedding the discoidal coulter blade within the soil; and
translating the discoidal coulter blade through the soil at a depth via the implement.

17. The method for altering surface stubble and altering soil of claim 16, wherein the blade circumference of the at least two discoidal coulter blades is dissimilar.

18. The method for altering surface stubble and altering soil of claim 16, wherein the first bevel length is substantially one-fourth of the blade width.

19. The method for altering surface stubble and altering soil of claim 16, wherein the second bevel length is substantially one-fourth of the first bevel length and counter bevel angle is within 10 degrees of an implement attachment angle.

20. A coulter blade for altering soil and surface stubble, comprising:
a discoidal coulter blade configured with a blade hub, a blade width, and a blade circumference, the discoidal coulter blade having a plane parallel to each diameter line of the discoidal coulter blade, the blade hub configured for detachably mounting the discoidal coulter blade to an implement;
the discoidal coulter blade further configured with a proximal side and a distal side, the proximal side proximal to an implement attachment point, the distal side being distal from the implement attachment point;
the distal side of the discoidal coulter blade configured with a first bevel sharpened at a first bevel angle and a second bevel sharpened at a second bevel angle, the first bevel being proximal with the blade circumference and the second bevel being distal from the blade circumference, the first bevel angle, as measured from the plane at the blade circumference, being less than the second bevel angle;
the first bevel having a first bevel length and the second bevel having a second bevel length;
wherein the first bevel length is greater than the second bevel.

* * * * *